(12) United States Patent
Novac et al.

(10) Patent No.: US 10,769,606 B2
(45) Date of Patent: Sep. 8, 2020

(54) PAYMENT REAL-TIME FUNDS AVAILABILITY

(71) Applicant: Early Warning Services, LLC, Scottsdale, AZ (US)

(72) Inventors: Gyorgyi Novac, Scottsdale, AZ (US); Chuck Hutchison, Phoenix, AZ (US); Lou Anne Alexander, Scottsdale, AZ (US); Austin McCormick, Scottsdale, AZ (US); Laura Weinflash, Scottsdale, AZ (US); Rajesh Kulkarni, Scottsdale, AZ (US)

(73) Assignee: EARLY WARNING SERVICES, LLC, Scottsdale, AZ (US)

( * ) Notice: Subject to any disclaimer, the term of this patent is extended or adjusted under 35 U.S.C. 154(b) by 878 days.

(21) Appl. No.: 15/131,916

(22) Filed: Apr. 18, 2016

(65) Prior Publication Data

US 2016/0300206 A1    Oct. 13, 2016

Related U.S. Application Data

(63) Continuation-in-part of application No. 14/665,861, filed on Mar. 23, 2015.
(Continued)

(51) Int. Cl.
  *G06Q 40/00* (2012.01)
  *G06Q 20/14* (2012.01)
  (Continued)

(52) U.S. Cl.
  CPC .......... *G06Q 20/14* (2013.01); *G06Q 20/023* (2013.01); *G06Q 20/042* (2013.01); *G06Q 20/24* (2013.01);
  (Continued)

(58) Field of Classification Search
  CPC combination set(s) only.
  See application file for complete search history.

(56) References Cited

U.S. PATENT DOCUMENTS

| | | |
|---|---|---|
| 2,011,032 A | 8/1935 | Blanchard |
| 5,229,764 A | 7/1993 | Matchett et al. |

(Continued)

FOREIGN PATENT DOCUMENTS

| | | |
|---|---|---|
| AU | 4034997 | 3/1998 |
| AU | 1757201 | 5/2001 |

(Continued)

OTHER PUBLICATIONS

Federal Financial Institutions Examination Council (Wholesale Payment System, https://ithandbook.ffiec.gov/media/274899/ffiec_itbooklet_wholesalepaymentsystems.pdf, Section 4, Jul. 2004) (Year: 2004).*

(Continued)

*Primary Examiner* — Bruce I Ebersman
*Assistant Examiner* — Mark H Gaw
(74) *Attorney, Agent, or Firm* — Bryan Cave Leighton Paisner LLP

(57) ABSTRACT

A method including receiving a first promise-to-pay message at a transaction system. The method also can include storing the first promise-to-pay message in the transaction system. The method additionally can include sending a second promise-to-pay message from the transaction system to a second financial institution. The method further can include receiving a first response at the transaction system from the second financial institution indicating a successful credit of the second account maintained by the second financial institution. The method additionally can include storing the first response in the transaction system. The method further can include sending a second response from (Continued)

the transaction system indicating the successful credit of the second account maintained by the second financial institution to inform at least the sender in real-time after the payment authorization time of the successful credit of the second account maintained by the second financial institution. Other embodiments are provided.

54 Claims, 21 Drawing Sheets

Related U.S. Application Data

(60) Provisional application No. 62/222,773, filed on Sep. 23, 2015.

(51) Int. Cl.
    *G06Q 20/40* (2012.01)
    *G06Q 20/24* (2012.01)
    *G06Q 20/02* (2012.01)
    *G06Q 20/26* (2012.01)
    *G06Q 20/04* (2012.01)

(52) U.S. Cl.
    CPC ........... *G06Q 20/26* (2013.01); *G06Q 20/401* (2013.01); *G06Q 20/405* (2013.01)

(56) References Cited

U.S. PATENT DOCUMENTS

| | | | |
|---|---|---|---|
| 5,265,007 A * | 11/1993 | Barnhard, Jr. | G06Q 20/02 235/379 |
| 5,282,249 A | 1/1994 | Cohen et al. | |
| 5,283,829 A | 2/1994 | Anderson | |
| 5,329,589 A | 7/1994 | Fraser et al. | |
| 5,383,113 A | 1/1995 | Kight et al. | |
| 5,453,601 A | 9/1995 | Rosen | |
| 5,455,407 A | 10/1995 | Rosen | |
| 5,465,206 A | 11/1995 | Hilt et al. | |
| 5,481,609 A | 1/1996 | Cohen et al. | |
| 5,619,657 A | 4/1997 | Sudama et al. | |
| 5,642,419 A | 6/1997 | Rosen | |
| 5,649,117 A | 7/1997 | Landry | |
| 5,652,786 A | 7/1997 | Rogers | |
| 5,671,280 A | 9/1997 | Rosen | |
| 5,677,955 A | 10/1997 | Doggett et al. | |
| 5,699,528 A | 12/1997 | Hogan | |
| 5,703,344 A | 12/1997 | Bezy et al. | |
| 5,729,594 A | 3/1998 | Klingman | |
| 5,745,886 A | 4/1998 | Rosen | |
| 5,781,723 A | 7/1998 | Yee et al. | |
| 5,790,677 A | 8/1998 | Fox et al. | |
| 5,826,241 A | 10/1998 | Stein et al. | |
| 5,832,460 A | 11/1998 | Bednar et al. | |
| 5,848,161 A | 12/1998 | Luneau et al. | |
| 5,848,400 A * | 12/1998 | Chang | G06Q 20/04 705/35 |
| 5,870,473 A | 2/1999 | Boesch et al. | |
| 5,873,072 A | 2/1999 | Kight et al. | |
| 5,878,141 A | 3/1999 | Daly et al. | |
| 5,884,288 A | 3/1999 | Chang et al. | |
| 5,889,863 A | 3/1999 | Weber | |
| 5,903,721 A | 5/1999 | Sixtus | |
| 5,913,203 A | 6/1999 | Wong et al. | |
| 5,915,023 A | 6/1999 | Bernstein | |
| 5,920,847 A * | 7/1999 | Kolling | G06Q 20/02 705/40 |
| 5,920,848 A | 7/1999 | Schutzer et al. | |
| 5,946,669 A | 8/1999 | Polk | |
| 5,956,700 A | 9/1999 | Landry | |
| 5,970,475 A | 10/1999 | Barnes et al. | |
| 5,978,840 A | 11/1999 | Nguyen et al. | |
| 5,983,208 A | 11/1999 | Haller et al. | |
| 5,987,132 A | 11/1999 | Rowney | |
| 5,987,140 A | 11/1999 | Rowney et al. | |
| 5,996,076 A | 11/1999 | Rowney et al. | |
| 5,999,625 A | 12/1999 | Bellare et al. | |
| 6,002,767 A | 12/1999 | Kramer | |
| 6,016,484 A | 1/2000 | Williams et al. | |
| 6,029,150 A | 2/2000 | Kravitz | |
| 6,032,133 A | 2/2000 | Hilt et al. | |
| 6,035,285 A | 3/2000 | Schlect et al. | |
| 6,039,250 A | 3/2000 | Ito et al. | |
| 6,044,362 A | 3/2000 | Neely | |
| 6,049,786 A | 4/2000 | Smorodinsky | |
| 6,058,380 A | 5/2000 | Anderson et al. | |
| 6,061,665 A | 5/2000 | Bahreman | |
| 6,070,150 A | 5/2000 | Remington et al. | |
| 6,072,870 A | 6/2000 | Nguyen et al. | |
| 6,078,907 A | 6/2000 | Lamm | |
| 6,081,790 A | 6/2000 | Rosen | |
| 6,085,168 A | 7/2000 | Mori et al. | |
| 6,112,181 A | 8/2000 | Shear et al. | |
| 6,119,101 A | 9/2000 | Peckover | |
| 6,119,106 A | 9/2000 | Mersky et al. | |
| 6,119,107 A | 9/2000 | Polk | |
| 6,125,352 A | 9/2000 | Franklin et al. | |
| 6,128,603 A | 10/2000 | Dent et al. | |
| 6,138,107 A | 10/2000 | Elgamal | |
| 6,145,738 A | 11/2000 | Stinson et al. | |
| 6,167,378 A | 12/2000 | Webber, Jr. | |
| 6,173,272 B1 | 1/2001 | Thomas et al. | |
| 6,236,981 B1 | 5/2001 | Hill | |
| 6,246,996 B1 | 6/2001 | Stein et al. | |
| 6,260,024 B1 | 7/2001 | Shkedy | |
| 6,285,991 B1 | 9/2001 | Powar | |
| 6,289,322 B1 | 9/2001 | Kitchen et al. | |
| 6,292,211 B1 | 9/2001 | Pena | |
| 6,292,789 B1 | 9/2001 | Schutzer | |
| 6,304,857 B1 | 10/2001 | Heindel et al. | |
| 6,304,860 B1 | 10/2001 | Martin, Jr. et al. | |
| 6,311,170 B1 | 10/2001 | Embrey | |
| 6,317,745 B1 | 11/2001 | Thomas et al. | |
| 6,334,116 B1 | 12/2001 | Ganesan et al. | |
| 6,381,582 B1 | 4/2002 | Walker et al. | |
| 6,385,595 B1 | 5/2002 | Kolling | |
| 6,411,942 B1 | 6/2002 | Fujimoto | |
| 6,438,527 B1 | 8/2002 | Powar | |
| 6,446,051 B1 | 9/2002 | Gupta | |
| 6,488,203 B1 | 12/2002 | Stoutenburg et al. | |
| 6,502,747 B1 | 1/2003 | Stoutenburg et al. | |
| 6,578,015 B1 | 6/2003 | Haseltine et al. | |
| 6,587,550 B2 | 7/2003 | Council et al. | |
| 6,594,647 B1 | 7/2003 | Randle et al. | |
| 6,609,114 B1 | 8/2003 | Gressel et al. | |
| 6,647,376 B1 | 11/2003 | Farrar et al. | |
| 6,678,664 B1 | 1/2004 | Ganesan | |
| 6,839,687 B1 | 1/2005 | Dent et al. | |
| 6,847,708 B1 | 1/2005 | Abbasi et al. | |
| 6,868,391 B1 | 3/2005 | Hultgren | |
| 6,882,986 B1 | 4/2005 | Heinemann et al. | |
| 6,891,953 B1 | 5/2005 | DeMello et al. | |
| 6,968,319 B1 | 11/2005 | Remington et al. | |
| 6,996,542 B1 | 2/2006 | Landry | |
| 7,003,480 B2 | 2/2006 | Fox et al. | |
| 7,004,382 B2 | 2/2006 | Sandru | |
| 7,010,512 B1 | 3/2006 | Gillin et al. | |
| 7,031,939 B1 | 4/2006 | Gallagher et al. | |
| 7,035,821 B1 | 4/2006 | Smith, II et al. | |
| 7,039,951 B1 | 5/2006 | Chaudhari et al. | |
| 7,051,001 B1 | 5/2006 | Slater | |
| 7,089,208 B1 | 8/2006 | Levchin et al. | |
| 7,098,783 B2 | 8/2006 | Crichlow | |
| 7,103,261 B2 | 9/2006 | Grecia | |
| 7,120,606 B1 | 10/2006 | Ranzini et al. | |
| 7,120,608 B1 | 10/2006 | Gallagher et al. | |
| 7,133,835 B1 | 11/2006 | Fusz et al. | |
| 7,184,980 B2 | 2/2007 | Allen-Rouman et al. | |
| 7,191,151 B1 | 3/2007 | Nosek | |
| 7,200,551 B1 | 4/2007 | Senez | |
| 7,206,938 B2 | 4/2007 | Bender et al. | |
| 7,227,950 B2 | 6/2007 | Faith et al. | |
| 7,240,031 B1 | 7/2007 | Kight et al. | |

(56) References Cited

U.S. PATENT DOCUMENTS

| | | |
|---|---|---|
| 7,249,098 B2 | 7/2007 | Milberger et al. |
| 7,254,235 B2 | 8/2007 | Boudreault et al. |
| 7,287,009 B1 | 10/2007 | Liebermann |
| 7,296,004 B1 | 11/2007 | Garrison et al. |
| 7,302,411 B2 | 11/2007 | Ganesan et al. |
| 7,319,855 B1 | 1/2008 | Brune et al. |
| 7,321,874 B2 | 1/2008 | Dilip et al. |
| 7,321,875 B2 | 1/2008 | Dilip et al. |
| 7,333,953 B1 | 2/2008 | Banaugh et al. |
| 7,343,014 B2 | 3/2008 | Sovio et al. |
| 7,349,871 B2 | 3/2008 | Labrou et al. |
| 7,353,203 B1 | 4/2008 | Kriplani et al. |
| 7,366,695 B1 | 4/2008 | Allen-Rouman et al. |
| 7,370,014 B1 | 5/2008 | Vasavada et al. |
| 7,376,587 B1 | 5/2008 | Neofytides et al. |
| 7,383,223 B1 | 6/2008 | Dilip et al. |
| 7,383,226 B2 | 6/2008 | Kight et al. |
| 7,389,917 B2 | 6/2008 | Abraham et al. |
| 7,392,223 B1 | 6/2008 | Ganesan et al. |
| 7,395,241 B1 | 7/2008 | Cook et al. |
| 7,398,252 B2 | 7/2008 | Neofytides et al. |
| 7,426,492 B1 | 9/2008 | Bishop et al. |
| 7,450,010 B1 | 11/2008 | Gravelle et al. |
| 7,451,114 B1 | 11/2008 | Matsuda et al. |
| 7,475,039 B2 | 1/2009 | Remington et al. |
| 7,475,808 B1 | 1/2009 | Bishop et al. |
| 7,478,066 B2 | 1/2009 | Remington et al. |
| 7,499,887 B2 | 3/2009 | Boyle et al. |
| 7,505,937 B2 | 3/2009 | Dilip et al. |
| 7,519,560 B2 | 4/2009 | Lam et al. |
| 7,526,650 B1 | 4/2009 | Wimmer |
| 7,532,122 B2 | 5/2009 | Aull et al. |
| 7,536,722 B1 | 5/2009 | Saltz et al. |
| 7,596,701 B2 | 9/2009 | Varghese et al. |
| 7,603,311 B1 | 10/2009 | Yadav-Ranjan |
| 7,606,734 B2 | 10/2009 | Baig et al. |
| 7,606,787 B2 | 10/2009 | Keown et al. |
| 7,610,245 B2 | 10/2009 | Dent et al. |
| 7,613,653 B2 | 11/2009 | Milberger et al. |
| 7,620,602 B2 | 11/2009 | Jakstadt et al. |
| 7,644,037 B1 | 1/2010 | Ostrovsky |
| 7,653,591 B1 | 1/2010 | Dabney |
| 7,657,497 B2 | 2/2010 | Nandy |
| 7,677,438 B2 | 3/2010 | DeJean et al. |
| 7,685,067 B1 | 3/2010 | Britto et al. |
| 7,689,482 B2 | 3/2010 | Lam et al. |
| 7,693,791 B2 | 4/2010 | Hahn-Carlson et al. |
| 7,702,579 B2 | 4/2010 | Neely et al. |
| 7,707,082 B1 | 4/2010 | Lapstun et al. |
| 7,707,107 B2 | 4/2010 | Gebb et al. |
| 7,711,690 B1 | 5/2010 | Garrison et al. |
| 7,716,127 B2 | 5/2010 | Gebb et al. |
| 7,716,132 B1 | 5/2010 | Spies et al. |
| 7,720,754 B1 | 5/2010 | Gutierrez-Sheris |
| 7,720,756 B2 | 5/2010 | Kavounas |
| 7,734,543 B2 | 6/2010 | Braco |
| 7,752,130 B2 | 7/2010 | Byrd et al. |
| 7,756,785 B2 | 7/2010 | Gebb et al. |
| 7,756,786 B2 | 7/2010 | Trende et al. |
| 7,765,156 B2 | 7/2010 | Staniar et al. |
| 7,769,687 B2 | 8/2010 | Gebb et al. |
| 7,769,998 B2 | 8/2010 | Lynch et al. |
| 7,774,271 B1 | 8/2010 | Edwards et al. |
| 7,778,901 B2 | 8/2010 | Ganesan et al. |
| 7,783,567 B1 | 8/2010 | Kleiman et al. |
| 7,792,749 B2 | 9/2010 | Ganesan |
| 7,809,650 B2 | 10/2010 | Bruesewitz et al. |
| 7,840,520 B2 | 11/2010 | Nandy |
| 7,848,972 B1 | 12/2010 | Sharma |
| 7,856,384 B1 | 12/2010 | Kulasooriya et al. |
| 7,870,070 B2 | 1/2011 | Meier et al. |
| 7,873,573 B2 | 1/2011 | Realini |
| 7,877,325 B2 | 1/2011 | Bishop et al. |
| 7,885,869 B2 | 2/2011 | Uehara et al. |
| 7,899,744 B2 | 3/2011 | Bishop et al. |
| 7,904,385 B2 | 3/2011 | Bishop et al. |
| 7,908,214 B2 | 3/2011 | Bishop et al. |
| 7,925,585 B2 | 4/2011 | Bishop et al. |
| 7,937,312 B1 | 5/2011 | Woolston |
| 7,941,367 B2 | 5/2011 | Bishop et al. |
| 7,941,372 B2 | 5/2011 | Bishop et al. |
| 7,942,321 B2 | 5/2011 | Linton et al. |
| 7,945,491 B2 | 5/2011 | Sharma |
| 7,953,660 B2 | 5/2011 | Ganesan et al. |
| 7,958,030 B2 | 6/2011 | Kemper et al. |
| 7,958,049 B2 | 6/2011 | Jamison et al. |
| 7,962,406 B2 | 6/2011 | Bishop et al. |
| 7,962,407 B2 | 6/2011 | Bishop et al. |
| 7,962,408 B2 | 6/2011 | Bishop et al. |
| 7,970,706 B2 | 6/2011 | Keene |
| 7,979,348 B2 | 7/2011 | Thomas et al. |
| 7,979,349 B2 | 7/2011 | Bishop et al. |
| 7,996,307 B2 | 8/2011 | Bishop et al. |
| 7,996,310 B1 | 8/2011 | Edwards et al. |
| 8,001,612 B1 | 8/2011 | Wieder |
| 8,020,005 B2 | 9/2011 | Mani et al. |
| 8,041,606 B2 | 10/2011 | Mascavage, III et al. |
| 8,050,997 B1 | 11/2011 | Nosek et al. |
| 8,060,389 B2 | 11/2011 | Johnson |
| 8,069,115 B2 | 11/2011 | Schoenberg et al. |
| 8,073,772 B2 | 12/2011 | Bishop et al. |
| 8,073,773 B2 | 12/2011 | Kozee et al. |
| 8,086,497 B1 | 12/2011 | Oakes, III |
| 8,103,584 B2 | 1/2012 | Bishop et al. |
| 8,103,585 B2 | 1/2012 | Bishop et al. |
| 8,112,354 B2 | 2/2012 | Lalwani |
| 8,121,894 B2 | 2/2012 | Mason |
| 8,121,945 B2 | 2/2012 | Rackley et al. |
| 8,123,124 B2 | 2/2012 | Salazar et al. |
| 8,126,793 B2 | 2/2012 | Jones |
| 8,165,934 B2 | 4/2012 | Manista et al. |
| 8,165,958 B1 | 4/2012 | McLaughlin et al. |
| 8,180,706 B2 | 5/2012 | Bishop et al. |
| 8,190,514 B2 | 5/2012 | Bishop et al. |
| 8,195,565 B2 | 6/2012 | Bishop et al. |
| 8,229,850 B2 | 7/2012 | Dilip et al. |
| 8,234,212 B2 | 7/2012 | Bishop et al. |
| 8,244,609 B2 | 8/2012 | Prakash et al. |
| 8,249,965 B2 | 8/2012 | Tumminaro |
| 8,249,983 B2 | 8/2012 | Dilip et al. |
| 8,255,278 B1 | 8/2012 | Young et al. |
| 8,255,327 B2 | 8/2012 | Kemper et al. |
| 8,255,336 B2 | 8/2012 | Dilip et al. |
| 8,266,028 B2 | 9/2012 | Bulman et al. |
| 8,266,065 B2 | 9/2012 | Dilip et al. |
| 8,275,704 B2 | 9/2012 | Bishop et al. |
| 8,290,835 B2 | 10/2012 | Homer et al. |
| 8,290,862 B2 | 10/2012 | Sheehan et al. |
| 8,290,863 B2 | 10/2012 | Sheehan et al. |
| 8,311,913 B2 | 11/2012 | Marchetti et al. |
| 8,311,914 B2 | 11/2012 | Marchetti et al. |
| 8,311,937 B2 | 11/2012 | Marchetti et al. |
| 8,311,942 B1 | 11/2012 | Mason |
| 8,321,341 B2 | 11/2012 | Nandy |
| 8,310,346 B2 | 12/2012 | Burbridge et al. |
| 8,341,046 B2 | 12/2012 | Marchetti et al. |
| 8,342,407 B2 | 1/2013 | Williams et al. |
| 8,352,365 B1 | 1/2013 | Goldberg et al. |
| 8,370,639 B2 | 2/2013 | Azar et al. |
| 8,374,932 B2 | 2/2013 | Marchetti et al. |
| 8,380,177 B2 | 2/2013 | Laracey |
| 8,380,591 B1 | 2/2013 | Kazenas et al. |
| 8,380,622 B2 | 2/2013 | Bushman et al. |
| 8,401,939 B2 | 3/2013 | Lam et al. |
| 8,402,555 B2 | 3/2013 | Grecia |
| 8,407,124 B2 | 3/2013 | Uehara et al. |
| 8,407,141 B2 | 3/2013 | Mullen et al. |
| 8,417,628 B2 | 4/2013 | Poplawski et al. |
| 8,423,460 B2 | 4/2013 | Kay et al. |
| 8,433,629 B2 | 4/2013 | Murtaugh et al. |
| 8,458,086 B2 | 6/2013 | Bishop et al. |
| 8,458,774 B2 | 6/2013 | Ganesan |
| 8,467,766 B2 | 6/2013 | Rackley et al. |
| 8,484,104 B1 | 7/2013 | Hurlbutt et al. |

(56) References Cited

U.S. PATENT DOCUMENTS

| | | |
|---|---|---|
| 8,498,914 B2 | 7/2013 | Hazelhurst |
| 8,521,657 B2 | 8/2013 | Kuebert et al. |
| 8,527,413 B2 | 9/2013 | Heller |
| 8,532,021 B2 | 9/2013 | Tumminaro |
| 8,533,079 B2 | 9/2013 | Sharma |
| 8,533,860 B1 | 9/2013 | Grecia |
| 8,549,601 B2 | 10/2013 | Ganesan |
| 8,560,417 B2 | 10/2013 | Mullen et al. |
| 8,596,527 B2 | 12/2013 | Bishop et al. |
| 8,606,640 B2 | 12/2013 | Brody et al. |
| 8,615,457 B2 | 12/2013 | Mullen et al. |
| 8,634,559 B2 | 1/2014 | Brown et al. |
| 8,646,685 B2 | 2/2014 | Bishop et al. |
| 8,666,865 B2 | 3/2014 | Mullen et al. |
| 8,706,641 B2 | 4/2014 | Bruesewitz et al. |
| 8,713,325 B2 | 4/2014 | Ganesan |
| 8,719,905 B2 | 5/2014 | Ganesan |
| 8,738,526 B2 | 5/2014 | Nosek et al. |
| 8,745,699 B2 | 6/2014 | Ganesan |
| 8,751,347 B2 | 6/2014 | Mullen et al. |
| 8,768,838 B1 | 7/2014 | Hoffman |
| 8,769,784 B2 | 7/2014 | Ganesan et al. |
| 8,775,306 B2 | 7/2014 | Nosek et al. |
| 8,789,153 B2 | 7/2014 | Ganesan |
| 8,794,509 B2 | 8/2014 | Bishop et al. |
| 8,806,592 B2 | 8/2014 | Ganesan |
| 8,814,039 B2 | 8/2014 | Bishop et al. |
| 8,820,633 B2 | 9/2014 | Bishop et al. |
| 8,887,247 B2 | 11/2014 | Ganesan |
| 8,887,308 B2 | 11/2014 | Grecia |
| 8,893,237 B2 | 11/2014 | Ganesan |
| 8,938,787 B2 | 1/2015 | Turgeman |
| 9,392,008 B1 | 7/2016 | Michel et al. |
| D769,296 S | 10/2016 | Grecia |
| 9,626,664 B2 | 4/2017 | Bouey et al. |
| 9,691,056 B2 | 6/2017 | Bouey et al. |
| D826,955 S | 8/2018 | Grecia |
| 10,049,349 B1 | 8/2018 | Grassadonia et al. |
| D857,054 S | 8/2019 | Grecia |
| D857,712 S | 8/2019 | Grecia |
| 2002/0023054 A1 | 2/2002 | Gillespie |
| 2002/0029193 A1 | 3/2002 | Ranjan et al. |
| 2002/0052852 A1* | 5/2002 | Bozeman ............ G06Q 20/04 705/64 |
| 2002/0091635 A1 | 7/2002 | Dilip et al. |
| 2002/0128932 A1 | 9/2002 | Yung et al. |
| 2002/0143634 A1 | 10/2002 | Kumar et al. |
| 2002/0194119 A1 | 12/2002 | Wright et al. |
| 2002/0194503 A1 | 12/2002 | Faith et al. |
| 2003/0014316 A1 | 1/2003 | Jaalinoja et al. |
| 2003/0097331 A1 | 5/2003 | Cohen |
| 2003/0115151 A1 | 6/2003 | Wheeler et al. |
| 2003/0126094 A1 | 7/2003 | Fisher et al. |
| 2003/0130919 A1 | 7/2003 | Templeton et al. |
| 2003/0165328 A1 | 9/2003 | Grecia |
| 2003/0220875 A1 | 11/2003 | Lam et al. |
| 2003/0220876 A1 | 11/2003 | Burger et al. |
| 2003/0236728 A1 | 12/2003 | Sunderji et al. |
| 2004/0034594 A1 | 2/2004 | Thomas et al. |
| 2004/0089711 A1 | 5/2004 | Sandru |
| 2004/0158522 A1 | 8/2004 | Brown et al. |
| 2004/0230489 A1 | 11/2004 | Goldthwaite et al. |
| 2004/0259626 A1 | 12/2004 | Akram et al. |
| 2005/0008148 A1 | 1/2005 | Jacobson |
| 2005/0010523 A1 | 1/2005 | Myklebust et al. |
| 2005/0010786 A1 | 1/2005 | Michener et al. |
| 2005/0065891 A1 | 3/2005 | Lee et al. |
| 2005/0069135 A1 | 3/2005 | Brickell |
| 2005/0071283 A1* | 3/2005 | Randle ............ G06Q 20/04 705/75 |
| 2005/0125347 A1 | 6/2005 | Akialis et al. |
| 2005/0137948 A1 | 6/2005 | Kissner et al. |
| 2005/0144452 A1 | 6/2005 | Lynch et al. |
| 2005/0149455 A1 | 7/2005 | Bruesewitz et al. |
| 2005/0187873 A1 | 8/2005 | Labrou |
| 2005/0203959 A1 | 9/2005 | Muller et al. |
| 2005/0246292 A1 | 11/2005 | Sarcanin |
| 2005/0273842 A1 | 12/2005 | Wright et al. |
| 2005/0274793 A1 | 12/2005 | Cantini et al. |
| 2005/0289061 A1 | 12/2005 | Kulakowski |
| 2006/0000892 A1 | 1/2006 | Bonalle |
| 2006/0014532 A1 | 1/2006 | Seligmann |
| 2006/0022048 A1 | 2/2006 | Johnson |
| 2006/0080727 A1 | 4/2006 | Hammons et al. |
| 2006/0085357 A1 | 4/2006 | Pizarro |
| 2006/0116949 A1* | 6/2006 | Wehunt ............ G06Q 10/00 705/35 |
| 2006/0149632 A1 | 7/2006 | Bhatti et al. |
| 2006/0149635 A1 | 7/2006 | Bhatti et al. |
| 2006/0161772 A1 | 7/2006 | Talstra et al. |
| 2006/0165060 A1 | 7/2006 | Dua |
| 2006/0212401 A1 | 9/2006 | Ameerally et al. |
| 2006/0224470 A1 | 10/2006 | Ruano et al. |
| 2006/0258397 A1 | 11/2006 | Kaplan et al. |
| 2006/0280339 A1 | 12/2006 | Cho |
| 2006/0287004 A1 | 12/2006 | Fuqua |
| 2006/0287963 A1 | 12/2006 | Steeves et al. |
| 2007/0046456 A1 | 3/2007 | Edwards et al. |
| 2007/0061590 A1 | 3/2007 | Boye et al. |
| 2007/0106892 A1 | 5/2007 | Engberg |
| 2007/0108269 A1 | 5/2007 | Benco et al. |
| 2007/0136167 A1 | 6/2007 | Dilip et al. |
| 2007/0136168 A1 | 6/2007 | Dilip et al. |
| 2007/0136169 A1 | 6/2007 | Dilip et al. |
| 2007/0156726 A1 | 7/2007 | Levy |
| 2007/0168281 A1 | 7/2007 | Bishop et al. |
| 2007/0174189 A1 | 7/2007 | Bishop et al. |
| 2007/0179885 A1 | 8/2007 | Bird et al. |
| 2007/0198264 A1 | 8/2007 | Chang |
| 2007/0198405 A1 | 8/2007 | Bishop et al. |
| 2007/0198406 A1 | 8/2007 | Bishop et al. |
| 2007/0230371 A1 | 10/2007 | Tumminaro |
| 2007/0233615 A1 | 10/2007 | Tumminaro |
| 2007/0236330 A1 | 10/2007 | Cho et al. |
| 2007/0244811 A1 | 10/2007 | Tumminaro |
| 2007/0255620 A1 | 11/2007 | Tumminaro et al. |
| 2007/0255652 A1 | 11/2007 | Tumminaro et al. |
| 2007/0255653 A1 | 11/2007 | Tumminaro et al. |
| 2007/0255662 A1 | 11/2007 | Tumminaro |
| 2008/0010685 A1 | 1/2008 | Holtzman et al. |
| 2008/0015982 A1 | 1/2008 | Sokolic et al. |
| 2008/0015985 A1 | 1/2008 | Abhari et al. |
| 2008/0015994 A1 | 1/2008 | Bonalle et al. |
| 2008/0032741 A1 | 2/2008 | Tumminaro |
| 2008/0033880 A1 | 2/2008 | Fiebiger et al. |
| 2008/0040171 A1* | 2/2008 | Albers ............ G06F 9/4887 705/7.37 |
| 2008/0046362 A1 | 2/2008 | Easterly |
| 2008/0082454 A1 | 4/2008 | Dilip et al. |
| 2008/0082828 A1 | 4/2008 | Jennings et al. |
| 2008/0086403 A1 | 4/2008 | Dilip et al. |
| 2008/0086426 A1 | 4/2008 | Dilip et al. |
| 2008/0091596 A1 | 4/2008 | Labaton |
| 2008/0091606 A1 | 4/2008 | Grecia |
| 2008/0097873 A1 | 4/2008 | Cohen et al. |
| 2008/0109392 A1 | 5/2008 | Nandy |
| 2008/0127319 A1 | 5/2008 | Galloway et al. |
| 2008/0140564 A1 | 6/2008 | Tal et al. |
| 2008/0141033 A1 | 6/2008 | Ginter et al. |
| 2008/0147536 A1 | 6/2008 | Breen |
| 2008/0177661 A1 | 7/2008 | Mehra |
| 2008/0189209 A1 | 8/2008 | Loomis et al. |
| 2008/0208737 A1 | 8/2008 | Dilip et al. |
| 2008/0208742 A1 | 8/2008 | Arthur et al. |
| 2008/0208743 A1 | 8/2008 | Arthur et al. |
| 2008/0210751 A1 | 9/2008 | Kim |
| 2008/0210752 A1 | 9/2008 | March |
| 2008/0222048 A1 | 9/2008 | Higgins et al. |
| 2008/0222199 A1 | 9/2008 | Tiu et al. |
| 2008/0227471 A1 | 9/2008 | Dankar et al. |
| 2008/0238610 A1 | 10/2008 | Rosenberg |
| 2008/0242274 A1 | 10/2008 | Swanburg et al. |
| 2008/0244271 A1 | 10/2008 | Yu |
| 2008/0244277 A1 | 10/2008 | Orsini et al. |

(56) References Cited

U.S. PATENT DOCUMENTS

| | | |
|---|---|---|
| 2008/0249936 A1 | 10/2008 | Miller et al. |
| 2008/0255993 A1 | 10/2008 | Blinbaum |
| 2008/0294563 A1 | 11/2008 | Boutahar et al. |
| 2008/0306872 A1 | 12/2008 | Felsher |
| 2008/0313264 A1 | 12/2008 | Pestoni |
| 2008/0313714 A1 | 12/2008 | Fetterman et al. |
| 2008/0319887 A1 | 12/2008 | Pizzi et al. |
| 2009/0006861 A1 | 1/2009 | Bemmel |
| 2009/0006920 A1 | 1/2009 | Munson et al. |
| 2009/0018909 A1 | 1/2009 | Grecia |
| 2009/0030843 A1 | 1/2009 | Hoffman et al. |
| 2009/0043705 A1 | 2/2009 | Bishop et al. |
| 2009/0048885 A1 | 2/2009 | Bishop et al. |
| 2009/0048886 A1 | 2/2009 | Bishop et al. |
| 2009/0048887 A1 | 2/2009 | Bishop et al. |
| 2009/0048951 A1 | 2/2009 | Bishop et al. |
| 2009/0048952 A1 | 2/2009 | Bishop et al. |
| 2009/0048963 A1 | 2/2009 | Bishop et al. |
| 2009/0048966 A1 | 2/2009 | Bishop et al. |
| 2009/0048968 A1 | 2/2009 | Bishop et al. |
| 2009/0048969 A1 | 2/2009 | Bishop et al. |
| 2009/0048971 A1 | 2/2009 | Hathaway et al. |
| 2009/0068982 A1 | 3/2009 | Chen et al. |
| 2009/0070272 A1 | 3/2009 | Jain |
| 2009/0076956 A1 | 3/2009 | Bishop et al. |
| 2009/0076957 A1 | 3/2009 | Bishop et al. |
| 2009/0076958 A1 | 3/2009 | Bishop et al. |
| 2009/0083181 A1 | 3/2009 | Bishop et al. |
| 2009/0083541 A1 | 3/2009 | Levine |
| 2009/0089193 A1 | 4/2009 | Paintin |
| 2009/0089205 A1 | 4/2009 | Bayne |
| 2009/0089209 A1 | 4/2009 | Bixler et al. |
| 2009/0099961 A1 | 4/2009 | Ogilvy |
| 2009/0112658 A1 | 4/2009 | Mullen et al. |
| 2009/0112659 A1 | 4/2009 | Mullen et al. |
| 2009/0112660 A1 | 4/2009 | Mullen et al. |
| 2009/0112661 A1 | 4/2009 | Mullen et al. |
| 2009/0112662 A1 | 4/2009 | Mullen et al. |
| 2009/0112747 A1 | 4/2009 | Mullen et al. |
| 2009/0119190 A1 | 5/2009 | Realini |
| 2009/0119207 A1 | 5/2009 | Grecia |
| 2009/0119212 A1 | 5/2009 | Liu et al. |
| 2009/0125323 A1 | 5/2009 | Lakshmanan et al. |
| 2009/0125426 A1 | 5/2009 | Bishop et al. |
| 2009/0132392 A1 | 5/2009 | Davis et al. |
| 2009/0132423 A1 | 5/2009 | Liu |
| 2009/0138388 A1 | 5/2009 | Bishop et al. |
| 2009/0150269 A1 | 6/2009 | Bishop et al. |
| 2009/0150270 A1 | 6/2009 | Bishop et al. |
| 2009/0150271 A1 | 6/2009 | Bishop et al. |
| 2009/0150288 A1 | 6/2009 | Bishop et al. |
| 2009/0157518 A1 | 6/2009 | Bishop et al. |
| 2009/0157519 A1 | 6/2009 | Bishop et al. |
| 2009/0164324 A1 | 6/2009 | Bishop et al. |
| 2009/0164325 A1 | 6/2009 | Bishop et al. |
| 2009/0164326 A1 | 6/2009 | Bishop et al. |
| 2009/0164327 A1 | 6/2009 | Bishop et al. |
| 2009/0164328 A1 | 6/2009 | Bishop et al. |
| 2009/0164329 A1 | 6/2009 | Bishop et al. |
| 2009/0164330 A1 | 6/2009 | Bishop et al. |
| 2009/0164331 A1 | 6/2009 | Bishop et al. |
| 2009/0204457 A1 | 8/2009 | Buhrmann et al. |
| 2009/0204815 A1 | 8/2009 | Dennis et al. |
| 2009/0228365 A1 | 9/2009 | Tomchek et al. |
| 2009/0265241 A1 | 10/2009 | Bishop et al. |
| 2009/0265249 A1 | 10/2009 | Bishop et al. |
| 2009/0265250 A1 | 10/2009 | Bishop et al. |
| 2009/0265252 A1 | 10/2009 | Fletcher |
| 2009/0271277 A1 | 10/2009 | Bishop et al. |
| 2009/0271278 A1 | 10/2009 | Bishop et al. |
| 2009/0271303 A1 | 10/2009 | Wang et al. |
| 2009/0282259 A1 | 11/2009 | Skorik et al. |
| 2009/0287564 A1 | 11/2009 | Bishop et al. |
| 2009/0287565 A1 | 11/2009 | Bishop et al. |
| 2009/0287601 A1 | 11/2009 | Tumminaro et al. |
| 2009/0289106 A1 | 11/2009 | Bishop et al. |
| 2009/0299841 A1 | 12/2009 | Bishop et al. |
| 2009/0307072 A1 | 12/2009 | Morales-Lema |
| 2009/0319425 A1 | 12/2009 | Tumminaro et al. |
| 2009/0327133 A1 | 12/2009 | Aharoni et al. |
| 2010/0010906 A1 | 1/2010 | Grecia |
| 2010/0031022 A1 | 2/2010 | Kramer |
| 2010/0042537 A1 | 2/2010 | Smith et al. |
| 2010/0042539 A1 | 2/2010 | Dheer et al. |
| 2010/0057622 A1 | 3/2010 | Faith et al. |
| 2010/0063935 A1 | 3/2010 | Thomas et al. |
| 2010/0094765 A1 | 4/2010 | Nandy |
| 2010/0100480 A1 | 4/2010 | Altman et al. |
| 2010/0100899 A1 | 4/2010 | Bradbury et al. |
| 2010/0115610 A1 | 5/2010 | Tredoux et al. |
| 2010/0127822 A1 | 5/2010 | Devadas |
| 2010/0131415 A1 | 5/2010 | Sartipi |
| 2010/0161736 A1 | 6/2010 | Picknelly |
| 2010/0185868 A1 | 7/2010 | Grecia |
| 2010/0198729 A1 | 8/2010 | Kavounas |
| 2010/0269166 A1 | 10/2010 | Awad et al. |
| 2010/0293090 A1 | 11/2010 | Domenikos et al. |
| 2010/0306107 A1 | 12/2010 | Nahari |
| 2010/0320266 A1 | 12/2010 | White |
| 2011/0055078 A1 | 3/2011 | Nandy |
| 2011/0055083 A1 | 3/2011 | Grinhute |
| 2011/0066523 A1 | 3/2011 | Harrison |
| 2011/0066551 A1 | 3/2011 | Bruesewitz et al. |
| 2011/0078078 A1 | 3/2011 | Meier et al. |
| 2011/0099382 A1 | 4/2011 | Grecia |
| 2011/0110508 A1 | 5/2011 | LaFreniere et al. |
| 2011/0112945 A1 | 5/2011 | Cullen, III et al. |
| 2011/0112954 A1 | 5/2011 | Bruesewitz et al. |
| 2011/0131130 A1 | 6/2011 | Griffin et al. |
| 2011/0145149 A1 | 6/2011 | Valdes et al. |
| 2011/0173116 A1 | 7/2011 | Yan et al. |
| 2011/0191160 A1 | 8/2011 | Blackhurst et al. |
| 2011/0196782 A1 | 8/2011 | Allen et al. |
| 2011/0202407 A1 | 8/2011 | Buhrmann et al. |
| 2011/0202982 A1 | 8/2011 | Alexander et al. |
| 2011/0247058 A1 | 10/2011 | Kisters |
| 2011/0251869 A1 | 10/2011 | Shekhter |
| 2011/0251952 A1 | 10/2011 | Kelly et al. |
| 2011/0258111 A1 | 10/2011 | Raj et al. |
| 2011/0264543 A1 | 10/2011 | Taveau et al. |
| 2011/0264583 A1 | 10/2011 | Cooper et al. |
| 2011/0270749 A1 | 11/2011 | Bennett et al. |
| 2011/0276479 A1 | 11/2011 | Thomas |
| 2011/0282778 A1 | 11/2011 | Wright et al. |
| 2011/0288946 A1 | 11/2011 | Baiya et al. |
| 2011/0295746 A1 | 12/2011 | Thomas et al. |
| 2011/0313921 A1 | 12/2011 | Dheer et al. |
| 2011/0320347 A1 | 12/2011 | Tumminaro et al. |
| 2012/0005749 A1 | 1/2012 | Zoldi et al. |
| 2012/0016731 A1 | 1/2012 | Smith et al. |
| 2012/0018511 A1 | 1/2012 | Hammad |
| 2012/0041876 A1 | 2/2012 | Nosek et al. |
| 2012/0066121 A1 | 3/2012 | Shahbazi et al. |
| 2012/0109802 A1 | 5/2012 | Griffin et al. |
| 2012/0116953 A1 | 5/2012 | Klein et al. |
| 2012/0130898 A1 | 5/2012 | Snyder et al. |
| 2012/0151220 A1 | 6/2012 | Grecia |
| 2012/0173409 A1* | 7/2012 | Hu .................. G06Q 20/10 705/39 |
| 2012/0173417 A1 | 7/2012 | Lohman et al. |
| 2012/0203695 A1 | 8/2012 | Morgan et al. |
| 2012/0209766 A1 | 8/2012 | Kitchen et al. |
| 2012/0231814 A1 | 9/2012 | Calman et al. |
| 2012/0265687 A1 | 10/2012 | Dilip et al. |
| 2012/0278239 A1 | 11/2012 | Nosek et al. |
| 2012/0284154 A1 | 11/2012 | Creighton et al. |
| 2012/0284175 A1 | 11/2012 | Wilson et al. |
| 2012/0290453 A1 | 11/2012 | Manista et al. |
| 2013/0018791 A1 | 1/2013 | Mendocino et al. |
| 2013/0036000 A1 | 2/2013 | Giordano et al. |
| 2013/0054452 A1 | 2/2013 | Au et al. |
| 2013/0060708 A1 | 3/2013 | Oskolkov et al. |
| 2013/0073455 A1 | 3/2013 | McLaughlin et al. |
| 2013/0080368 A1 | 3/2013 | Nandy |

(56) References Cited

U.S. PATENT DOCUMENTS

| | | |
|---|---|---|
| 2013/0085936 A1 | 4/2013 | Law et al. |
| 2013/0103576 A1 | 4/2013 | Ackley |
| 2013/0110658 A1 | 5/2013 | Lyman et al. |
| 2013/0117178 A1 | 5/2013 | Mullen et al. |
| 2013/0124405 A1 | 5/2013 | Hamzeh |
| 2013/0124406 A1 | 5/2013 | Poplawski et al. |
| 2013/0138557 A1 | 5/2013 | Mullen et al. |
| 2013/0151384 A1 | 6/2013 | Mullen et al. |
| 2013/0197998 A1 | 8/2013 | Buhrmann et al. |
| 2013/0212010 A1 | 8/2013 | Mullen et al. |
| 2013/0226627 A1 | 8/2013 | Kubovcik et al. |
| 2013/0232071 A1 | 9/2013 | Dilip et al. |
| 2013/0238488 A1 | 9/2013 | Bouey et al. |
| 2013/0238489 A1 | 9/2013 | Bouey et al. |
| 2013/0238490 A1 | 9/2013 | Bouey et al. |
| 2013/0238491 A1 | 9/2013 | Bouey et al. |
| 2013/0238492 A1 | 9/2013 | Muthu et al. |
| 2013/0246280 A1 | 9/2013 | Kirsch |
| 2013/0262296 A1 | 10/2013 | Thomas et al. |
| 2013/0262311 A1 | 10/2013 | Buhrmann et al. |
| 2013/0282588 A1 | 10/2013 | Hruska |
| 2014/0006184 A1 | 1/2014 | Godsey |
| 2014/0040069 A1 | 2/2014 | Tomasofsky et al. |
| 2014/0046820 A1 | 2/2014 | Sunderji et al. |
| 2014/0058862 A1 | 2/2014 | Celkonas |
| 2014/0059693 A1 | 2/2014 | Stecher |
| 2014/0067677 A1 | 3/2014 | Ali et al. |
| 2014/0081783 A1 | 3/2014 | Paranjape et al. |
| 2014/0164246 A1 | 6/2014 | Thomas et al. |
| 2014/0187205 A1 | 7/2014 | Dankar et al. |
| 2014/0188697 A1 | 7/2014 | Bruesewitz et al. |
| 2014/0188728 A1 | 7/2014 | Dheer et al. |
| 2014/0244515 A1 | 8/2014 | Garfinkle et al. |
| 2014/0304778 A1 | 10/2014 | Grecia |
| 2014/0310142 A1 | 10/2014 | Mak |
| 2014/0337230 A1 | 11/2014 | Bacastow |
| 2014/0351137 A1 | 11/2014 | Chisholm |
| 2014/0365350 A1 | 12/2014 | Shvarts |
| 2014/0372308 A1 | 12/2014 | Sheets |
| 2015/0026061 A1 | 1/2015 | Siegel et al. |
| 2015/0046181 A1 | 2/2015 | Adjaoute |
| 2015/0046216 A1 | 2/2015 | Adjaoute |
| 2015/0046224 A1 | 2/2015 | Adjaoute |
| 2015/0066738 A1 | 3/2015 | Tian et al. |
| 2015/0073975 A1 | 3/2015 | Bornhofen et al. |
| 2015/0073977 A1 | 3/2015 | Ghosh et al. |
| 2015/0081324 A1 | 3/2015 | Adjaoute |
| 2015/0089568 A1 | 3/2015 | Sprague et al. |
| 2015/0112866 A1 | 4/2015 | Muthu et al. |
| 2015/0186994 A1 | 7/2015 | He |
| 2015/0193776 A1 | 7/2015 | Douglas et al. |
| 2016/0034932 A1 | 2/2016 | Sion et al. |
| 2016/0078443 A1 | 3/2016 | Tomasofsky et al. |
| 2016/0078444 A1 | 3/2016 | Tomasofsky et al. |
| 2016/0092872 A1 | 3/2016 | Prakash et al. |
| 2016/0104133 A1 | 4/2016 | Davis et al. |
| 2016/0188317 A1 | 6/2016 | Hilliar et al. |
| 2016/0203490 A1 | 7/2016 | Gupta et al. |
| 2016/0267280 A1 | 9/2016 | Mansour et al. |
| 2016/0283918 A1 | 9/2016 | Weinflash |
| 2016/0321625 A1 | 11/2016 | Gilliam, III et al. |
| 2017/0024719 A1 | 1/2017 | Finch et al. |
| 2017/0024744 A1 | 1/2017 | Finch et al. |
| 2017/0024828 A1 | 1/2017 | Michel et al. |
| 2017/0103399 A1 | 4/2017 | Napsky et al. |

FOREIGN PATENT DOCUMENTS

| | | |
|---|---|---|
| AU | 8870801 | 4/2002 |
| AU | 2002252137 | 9/2002 |
| BR | PI0710021 | 8/2011 |
| BR | PI0710089 | 8/2011 |
| CA | 2229012 | 3/1997 |
| CA | 2239875 | 6/1997 |
| CA | 2323500 | 9/1999 |
| CA | 2329348 | 11/1999 |
| CA | 2316090 | 2/2001 |
| CA | 2402353 | 9/2001 |
| CA | 2423048 | 3/2002 |
| CA | 2437949 | 8/2002 |
| CA | 2436319 | 2/2004 |
| CA | 2647602 | 3/2008 |
| CA | 2647636 | 3/2008 |
| CN | 101454794 | 6/2009 |
| CN | 101454795 | 6/2009 |
| EP | 820620 | 1/1998 |
| EP | 865010 | 9/1998 |
| EP | 998731 | 5/2000 |
| EP | 1107198 | 6/2001 |
| EP | 1184823 | 3/2002 |
| EP | 1208513 | 5/2002 |
| EP | 1400053 | 3/2004 |
| EP | 1416455 | 5/2004 |
| EP | 1504393 | 2/2005 |
| EP | 2008237 | 12/2008 |
| EP | 2013842 | 1/2009 |
| EP | 2266083 | 12/2010 |
| EP | 2304678 | 4/2011 |
| EP | 2344994 | 7/2011 |
| EP | 2387772 | 11/2011 |
| EP | 2407918 | 1/2012 |
| EP | 2407919 | 1/2012 |
| EP | 2438562 | 4/2012 |
| GB | 2297856 | 8/1996 |
| GB | 2384084 | 7/2003 |
| GB | 2454614 | 5/2009 |
| JP | 09282367 | 10/1997 |
| JP | H11265413 | 9/1999 |
| JP | 2000311209 | 11/2000 |
| JP | 2002049872 | 2/2002 |
| JP | 2002298041 | 10/2002 |
| JP | 2003308437 | 10/2003 |
| JP | 2004192437 | 7/2004 |
| JP | 2004532448 | 10/2004 |
| JP | 2005512173 | 4/2005 |
| JP | 2006285329 | 10/2006 |
| JP | 2007128192 | 5/2007 |
| JP | 2008102914 | 5/2008 |
| JP | 2008262601 | 10/2008 |
| JP | 2014132474 | 7/2014 |
| KR | 1020120075590 | 7/2012 |
| KR | 1020140099676 | 8/2014 |
| MX | 2008012503 | 12/2008 |
| MX | 2008012504 | 5/2009 |
| NL | 1018913 | 3/2003 |
| SE | 9703800 | 4/1999 |
| TW | 200919343 | 5/2009 |
| WO | 1997002539 | 1/1997 |
| WO | 1997016798 | 5/1997 |
| WO | 1999024891 | 5/1999 |
| WO | 1999034311 | 7/1999 |
| WO | 1999046720 | 9/1999 |
| WO | 2000055793 | 9/2000 |
| WO | 2000058876 | 10/2000 |
| WO | 200133522 | 5/2001 |
| WO | 2001055984 | 8/2001 |
| WO | 2001067364 | 9/2001 |
| WO | 200225534 | 3/2002 |
| WO | 2002025605 | 3/2002 |
| WO | 2002035429 | 5/2002 |
| WO | 2002069561 | 9/2002 |
| WO | 2002073483 | 9/2002 |
| WO | 2003091849 | 11/2003 |
| WO | 2005004026 | 1/2005 |
| WO | 2005057455 | 6/2005 |
| WO | 2007116368 | 10/2007 |
| WO | 2008011102 | 1/2008 |
| WO | 2008027620 | 3/2008 |
| WO | 2008027621 | 3/2008 |
| WO | 2008110791 | 9/2008 |
| WO | 2009058526 | 5/2009 |
| WO | 2009097215 | 8/2009 |
| WO | 2009114876 | 9/2009 |
| WO | 2009152184 | 12/2009 |

(56) References Cited

FOREIGN PATENT DOCUMENTS

| WO | 2009158420 | 12/2009 |
|---|---|---|
| WO | 2010082960 | 7/2010 |
| WO | 2010083113 | 7/2010 |
| WO | 2010138358 | 12/2010 |
| WO | 2010138359 | 12/2010 |
| WO | 2010138611 | 12/2010 |
| WO | 2010138613 | 12/2010 |
| WO | 2010138615 | 12/2010 |
| WO | 2010141662 | 12/2010 |
| WO | 2011008625 | 1/2011 |
| WO | 2011137082 | 11/2011 |
| WO | 2011163525 | 12/2011 |
| WO | 2012075187 | 6/2012 |
| WO | 2017011596 | 1/2017 |
| WO | 2017014815 | 1/2017 |

OTHER PUBLICATIONS

International Search Report for PCT/US2016/042163, dated Sep. 26, 2016.
International Search Report and Written Opinion for PCT/US2016/026000, dated Jul. 13, 2016.
International Search Report and Written Opinion for PCT/US11/33828, dated Jul. 12, 2011, 11 pages.
International Search Report and Written Opinion for PCT/US10/36231, dated Nov. 8, 2010, 8 pages.
International Search Report and Written Opinion for PCT/US10/36233, dated Jul. 28, 2010, 7 pages.
International Search Report and Written Opinion for PCT/US10/36229, dated Jul. 28, 2010, 12 pages.
International Search Report and Written Opinion for PCT/US10/35465, dated Jul. 13, 2010, 7 pages.
International Search Report for PCT/US09/48490, dated Jul. 31, 2009, 1 page.
"Greg's diary", Aug. 2009, available at http://www.lemis.com/grog/diary-aug2009.php?dirdate=20090807&imagesizes=11111111111111111113#Photo-19.
Trusted Computing Platform Alliance (TCPA), Main Specification Version 1. 1b, Published by the Trusted Computing Group, 2003, 332 pages.
Benson, Carol Coye, "Faster, Better, Cheaper—Like it or Not," http://paymentsviews.com/2013/03/13/faster-better-cheaper-like-it-or-not/, Mar. 13, 2013.
Fiserv, Inc., "Popmoney(R): Instant Payments—Now You Can Deliver Funds in Real Time," Feb. 6, 2014 [retrieved online from https://www.fiserv.com/resources/Popmoney_Instant_Payments_2_06_2014.pdf on Aug. 7, 2015].
Gayle C. Avery, Ellen Baker; Reframing the Infomated Household—Workplace; Information & Organization, 2002, vol. 12, Aug. 2001.
Mark Bernkopf; Electronic Cash and Monetary Policy; First Monday, vol. 1, No. 1-6, May 1996.
Electronic Payment Systems in European Countries; Country Synthesis Report; Böhle, Rader, Riehm, Institut far Technikfolgenabschatzung and Systemanalyse for the European Science and Technology Observatory Network (ESTO); Final Version, Sep. 1999.
Mark E. Budnitz; Electronic Money in the 1990s: A Net Benefit or Merely a Trade-Off?; 9 Ga. St. U. L. Rev. 747, 1992-1993.
Chida, Mambo, Shizuya; Digital Money—A Survey; Received Jun. 15, 2001; Revised Aug. 21, 2001; Interdisciplinary Information Sciences. vol. 7, No. 2, pp. 135-165 (2001).
Harold L. Frohman, William R. Ledder; Defense Transportation's EDI Program: A Security Risk Assessment; PL205LN5; Logistics Management Institute; May 1993.
Aryya Gangopadhyay; Managing Business with Electronic Commerce: Issues & Trends; Idea Group Publishing (2002).

Hans van der Heijden; Factors Affecting the Successful Introduction of Mobile Payment Systems; Vrije Universiteit Amsterdam; 15th Bled Electronic Commerce Conference eReality; Constructing the eEconomy; Bled, Solvenia, Jun. 17-19, 2002.
Lorin M. Hitt and Frances X. Frei; Do Better Customers Utilize Electronic Distribution Channels? The Case of PC Banking; Dec. 2001.
Eun Kim, Petra Schubert, Dorian Seltz and Bumtae Kim; The EBMG Reference Model on Electronic Markets: The Korean Case of JODAL (2007).
Glenbrook Partners; PayPal in the Air!—A look at PayPal Mobile; Payment News; Glenbrook eCommerce Market Analysis Reports (2006).
Sangjo Oh, Heejin Lee, Sherah Kurnia, Robert B. Johnston, Ben Lim; A Stakeholder Perspective on Successful Electronic Payment Systems Diffusion; Proceedings of the 39th Hawaii International Conference on Systems Sciences, 2006.
John R. Palumbo; Naval Postgraduate School, Monterey, California; Thesis, Financial Transaction Mechanisms for World Wide Web Applications, Mar. 1996.
Hua-Fu Pao; Naval Postgraduate School, Monterey, California; Thesis, Security Management of Electronic Data Interchange; Jun. 1993.
Tobern P. Pedersen; Electronic Payments of Small Amounts; Aarhus University (1998).
Eveline Franco Veloso; The Business Revolution through B2B Market Tone and its Impacts over the Financial System gong into 21st Century; The Institute of Brazilian Business and Management Issues; XII Minerva Program—Fall 2000, 2000.
Alladi Venkatesh and Nicholas Vitalari; Households and Technology: The Case of Home Computers—Some Conceptual and Theoretical Issues; originally appeared in M.L. Roberts and L. Wortzel (eds.) Marketing to the Changing Household, Ballinger Publishing, 1985, pp. 187-203.
A. Vilmos and S. Namouskos; SEMOPS: Design of a New Payment Service; International Workshop on Mobile Commerce Technologies & Applications (MCTA 2003), in proceedings of the 14th International Conference DEXA 2003, Sep. 1-5, 2003, Prague, Czech Republic.
Raja Mohn Rosli bin Raja Zulkifli; Building a World Class Infrastructure to Support E-Commerce in Malaysia; 1997 Telekom Malaysia, 1997.
International Trade Administration (export.gov), "Chapter 1: Methods of Payment in International Trade," https://2016.export.gov/tradefinanceguide/eg_main_043221.asp, Nov. 7, 2012 (Year: 2012).
Chang et al., "Smart Phone for Mobile Commerce," Computer Standards & Interfaces 31.4, pp. 740-747, 2009.
NACHA (Business-to-Business EIPP: Presentment Models and Payment Options, http://euro.ecom.cmu.edu/resources/elibrary/epay/B2BPaymentOptions.pdf, 2001), (Year: 2001).
NoPass, "No Password Login | Touch ID Fingerprint iPhone App," available at https://web.archive.org/web/20150328095715/http://www.nopassapp.com/, Mar. 28, 2015.
Constant Contact Tech Blog, "iOS Security: How Apple Protects Data on iOS Devices—Part 1," available at https://web.archive.org/web/20150403175348/https://techblog.constantcontact.com/software-development/ios-security/, Dec. 8, 2014.
NoPass, "Register," available at https://web.archive.org/web/20141222172212/http://www.nopassapp.com/register/, Dec. 22, 2014.
NoPass, "Login," available at https://web.archive.org/web/20141222170523/http://www.nopassapp.com/login/, Dec. 22, 2014.
Apple, "iOS Security," available at https://web.archive.org/web/20140226213513/http://images.apple.com/iphone/business/docs/iOS_Security_Feb14.pdf, Feb. 2014.
eBay Developers Program, "eBay Web Services XML API Guide," 2005.
Oldfield et al., "The Place of Risk Management in Financial Institutions," The Wharton School, Financial Institutional Center, University of Pennsylvania, 1995.

* cited by examiner

PAYMENT REAL-TIME FUNDS AVAILABILITY

CROSS-REFERENCE TO RELATED APPLICATIONS

This application is a continuation-in-part of U.S. patent application Ser. No. 14/665,861, filed Mar. 23, 2015. This application also claims the benefit of U.S. Provisional Application No. 62/222,773, filed Sep. 23, 2015. U.S. patent application Ser. No. 14/665,861 and U.S. Provisional Application No. 62/222,773 are incorporated herein by reference in their entirety.

TECHNICAL FIELD

This disclosure relates generally to financial transaction processing, and relates more particularly to payment real-time funds availability.

BACKGROUND

In conventional payment methods, after a biller sends a bill to a customer, the customer can initiate a payment to the biller through various different methods, such as through the customer's financial institution, a consolidated bill-pay provided, or the biller's financial institution, for example. These conventional methods, however, generally do not allow the biller to have immediate access to the payment funds in real-time after the customer has initiated the payment to the biller.

BRIEF DESCRIPTION OF THE DRAWINGS

To facilitate further description of the embodiments, the following drawings are provided in which.

Figure 1:
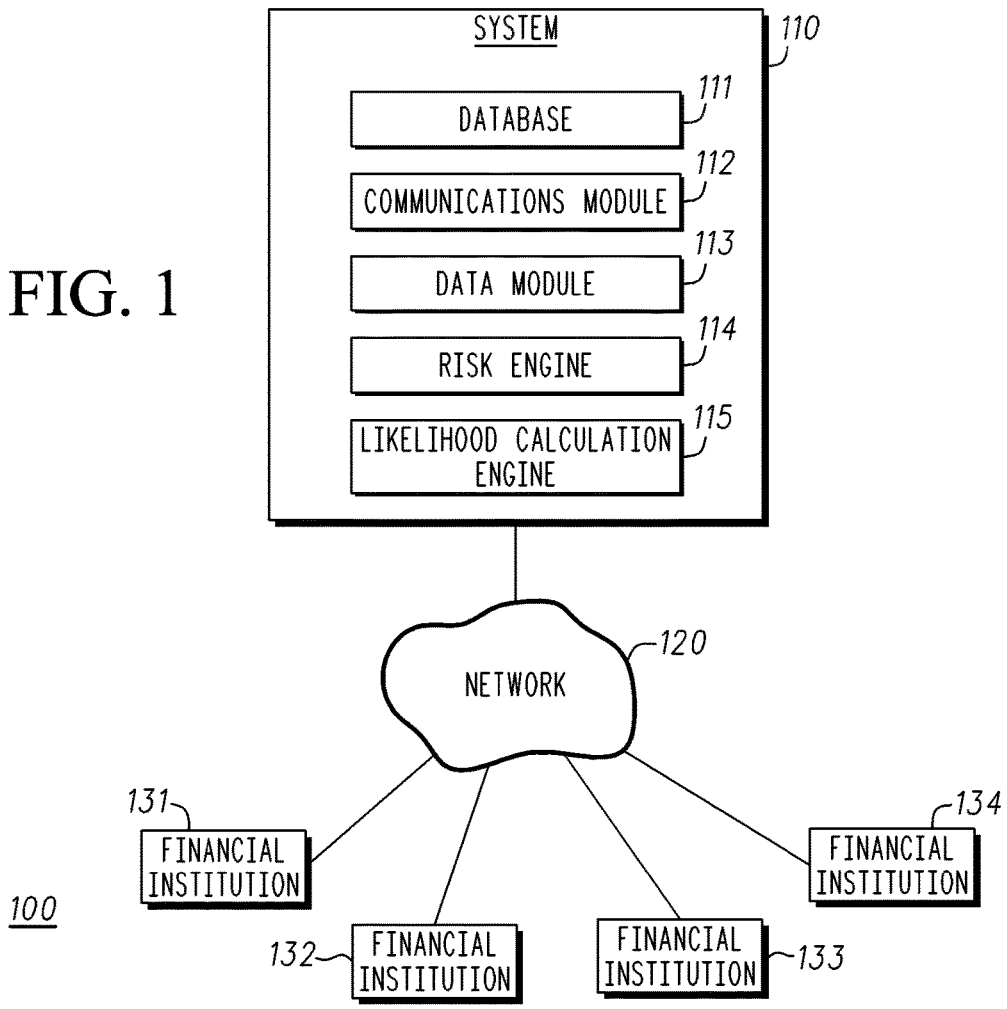
FIG. 1 illustrates a block diagram of a system that can be employed for real-time determination of funds availability for check and ACH items, according to an embodiment.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real-time" encompasses operations that occur in "near" real-time or somewhat delayed from a triggering event. In a number of embodiments, "real-time" can mean real-time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, five seconds, ten seconds, thirty seconds, one minute, or five minutes.

DESCRIPTION OF EXAMPLES OF EMBODIMENTS

Various embodiments include a method to facilitate determining an availability of funds for a payment item. The method can include providing a processing mechanism in data communication through a network with a first entity and a plurality of depository financial institutions. The plurality of depository financial institutions can include a second entity. The method also can include receiving a first inquiry at the processing mechanism through the network from the first entity. The first inquiry can be received from the first entity in real-time after the first entity receives the payment item. The method further can include storing the first inquiry received from the first entity. The method additionally can include sending a second inquiry from the processing mechanism through the network to the second entity in real-time after receiving the first inquiry. The second inquiry can be based at least in part on the first inquiry. The method further can include receiving a first response at the processing mechanism through the network from the second entity. The first response can be sent by the second entity in real-time in response to receiving the second inquiry. The method additionally can include storing the first response received from the second entity. The method further can include sending a second response from the processing mechanism through the network to the first entity in real-time after receiving the first response. The second response can be based at least in part on the first response. The second entity can be specified by the payment item as being responsible for paying the payment item. The first entity can be different from the second entity. The first and second responses each can include a payment likelihood indicator provided by the second entity that indicates a likelihood of the second entity to pay the payment item. The payment likelihood indicator can be based at least in part on a current status and a current available balance of an account maintained by the second entity that is specified by the payment item for payment of the payment item.

A number of embodiments include a system to facilitate determining an availability of funds for a payment item. The system can include one or more processing modules in data communication through a network with a first entity and a plurality of depository financial institutions. The plurality of depository financial institutions can include a second entity. The system also can include one or more non-transitory memory storage modules storing computing instructions configured to run on the one or more processing modules and perform one or more acts. The one or more acts can include receiving a first inquiry at the processing mechanism through the network from the first entity. The first inquiry can be received from the first entity in real-time after the first entity receives the payment item. The one or more acts also can include storing the first inquiry received from the first entity. The one or more acts additionally can include sending a second inquiry from the processing mechanism through the network to the second entity in real-time after receiving the first inquiry. The second inquiry can be based at least in part on the first inquiry. The one or more acts further can include receiving a first response at the processing mechanism through the network from the second entity. The first response can be sent by the second entity in real-time in response to receiving the second inquiry. The one or more acts additionally can include storing the first response received from the second entity. The one or more acts further can include sending a second response from the processing mechanism through the network to the first entity in real-time after receiving the first response. The second response can be based at least in part on the first response. The second entity can be specified by the payment item as being responsible for paying the payment item. The first entity can be different from the second entity. The first and second responses each can include a payment likelihood indicator provided by the second entity that indicates a likelihood of the second entity to pay the payment item. The payment likelihood indicator can be based at least in part on a current status and a current available balance of an account maintained by the second entity that is specified by the payment item for payment of the payment item.

Some embodiments can include a method to facilitate determining an availability of funds for a payment item. The method can be implemented via execution of computer instructions configured to run at one or more processing modules and configured to be stored at one or more non-transitory memory storage modules. The method can include receiving a first inquiry through a network from a first entity. The first inquiry can be received from the first entity in real-time after the first entity receives the payment item, the method also can include determining a routing decision of whether or not to route the first inquiry to a second entity. The second entity can be a depository financial institution that is specified by the payment item as responsible for paying the payment item. The routing decision can be based at least in part on a risk of non-payment of the payment item by the second entity. The method further can include, if the routing decision is to not route the first inquiry to the second entity, sending a first response through the network to the first entity in real-time after receiving the first inquiry. The method additionally can include, if the routing decision is to route the first inquiry to the second entity, sending a second inquiry through the network to the second entity in real-time after receiving the first inquiry. The second inquiry can be based at least in part on the first inquiry. The method further can include, if the routing decision is to route the first inquiry to the second entity, receiving a second response through the network from the second entity. The second response can be sent by the second entity in real-time in response to receiving the second inquiry. The method additionally can include, if the routing decision is to route the first inquiry to the second entity, storing the second response received from the second entity. The method further can include, if the routing decision is to route the first inquiry to the second entity, sending a third response through the network to the first entity in real-time after receiving the second response. The third response can be based at least in part on the second response. The first entity can be different from the second entity.

Many embodiments can include a system to facilitate determining an availability of funds for a payment item. The system can include one or more processing modules in data communication through a network with a first entity and a second entity. The system also can include one or more non-transitory memory storage modules storing computing instructions configured to run on the one or more processing modules and perform one or more acts. The one or more acts can include receiving a first inquiry through a network from a first entity. The first inquiry can be received from the first entity in real-time after the first entity receives the payment item, the one or more acts also can include determining a routing decision of whether or not to route the first inquiry to a second entity. The second entity can be a depository financial institution that is specified by the payment item as responsible for paying the payment item. The routing decision can be based at least in part on a risk of non-payment of the payment item by the second entity. The one or more acts further can include, if the routing decision is to not route the first inquiry to the second entity, sending a first response through the network to the first entity in real-time after receiving the first inquiry. The one or more acts additionally can include, if the routing decision is to route the first inquiry to the second entity, sending a second inquiry through the network to the second entity in real-time after receiving the first inquiry. The second inquiry can be based at least in part on the first inquiry. The one or more acts further can include, if the routing decision is to route the first inquiry to the second entity, receiving a second response through the network from the second entity. The second response can be sent by the second entity in real-time in response to receiving the second inquiry. The one or more acts additionally can include, if the routing decision is to route the first inquiry to the second entity, storing the second response received from the second entity. The one or more acts further can include, if the routing decision is to route the first inquiry to the second entity, sending a third response through the network to the first entity in real-time after receiving the second response. The third response can be based at least in part on the second response. The first entity can be different from the second entity.

Further embodiments can include a method to facilitate determining an availability of funds for a payment item. The method can be implemented via execution of computer instructions configured to run at one or more processing modules and configured to be stored at one or more non-transitory memory storage modules. The method can include receiving at least hourly updated account data comprising current statuses and current available balances of accounts maintained by one or more depository financial institutions. The method also can include receiving an inquiry through a network from a first entity. The inquiry can be received from the first entity in real-time after the first entity receives the payment item. The payment item can specify a second entity as responsible for paying the payment item. The payment item can specify an account maintained by the second entity for payment of the payment item. The one or more depository financial institutions can include the second entity. The method additionally can include determining a payment likelihood indicator based at least in part on a status and an available balance of the account as updated by the updated account data. The payment likelihood indicator can indicate a likelihood of the second entity to pay the payment item. The method further can include storing the payment likelihood indicator. The method additionally can include sending a response through the network to the first entity in real-time after receiving the inquiry. The response can include the payment likelihood indicator. The first entity can be different from the second entity.

In certain embodiments of the method, the payment item can include a check. The first entity can be a depository financial institution receiving the check for deposit. The second entity can be a depository financial institution against which the check has been drawn.

In certain embodiments of the method, the payment item can include an ACH item. The first entity can be an originating depository financial institution. The second entity can be a receiving depository financial institution. In some embodiments, the first entity can be a processor or a third party acting on behalf of the originating depository financial institution. In a number of embodiments, the second entity can be a processor or a third party acting on behalf of the receiving depository financial institution.

In certain embodiments of the method, the inquiry can include a routing number of the second entity that is specified by the payment item; an account number of the second entity that is specified by the payment item; a payment amount that is specified by the payment item; an identifier of the first entity; a transaction channel identifier that indicates the channel through which a transacting entity presented the payment item to the first entity; a payment distribution method identifier that indicates how the transacting entity requested to be paid for the payment item by the first entity; an account number of the first entity associated with the transacting entity; and if the payment item is a check, a serial number of the check.

In certain embodiments of the method, the payment likelihood indicator in the response can include an indication of whether or not the second entity guarantees payment of the payment item.

In certain embodiments of the method, the payment likelihood indicator in the response can include a score.

In certain embodiments of the method, the response further can include one or more reason indicators to explain the payment likelihood indicator.

In certain embodiments of the method, the response can be sent within 30 seconds of receiving the inquiry. The payment item can include one of a check or an ACH item.

Still further embodiments can include a system to facilitate determining an availability of funds for a payment item. The system can include one or more processing modules in data communication through a network with a first entity and one or more depository financial institutions. The one or more depository financial institutions can include a second entity. The system also can include one or more non-transitory memory storage modules storing computing instructions configured to run on the one or more processing modules and perform one or more acts. The one or more acts can include receiving at least hourly updated account data comprising current statuses and current available balances of accounts maintained by one or more depository financial institutions. The one or more acts also can include receiving an inquiry through a network from a first entity. The inquiry can be received from the first entity in real-time after the first entity receives the payment item. The payment item can specify a second entity as responsible for paying the payment item. The payment item can specify an account maintained by the second entity for payment of the payment item. The one or more depository financial institutions can include the second entity. The one or more acts additionally can include determining a payment likelihood indicator based at least in part on a status and an available balance of the account as updated by the updated account data. The payment likelihood indicator can indicate a likelihood of the second entity to pay the payment item. The one or more acts further can include storing the payment likelihood indicator. The one or more acts additionally can include sending a response through the network to the first entity in real-time after receiving the inquiry. The response can include the payment likelihood indicator. The first entity can be different from the second entity.

In certain embodiments of the system, the payment item can include a check. The first entity can be a depository financial institution receiving the check for deposit. The second entity can be a depository financial institution against which the check has been drawn.

In certain embodiments of the system, the payment item can include an ACH item. The first entity can be an originating depository financial institution. The second entity can be a receiving depository financial institution.

In certain embodiments of the system, the inquiry can include a routing number of the second entity that is specified by the payment item; an account number of the second entity that is specified by the payment item; a payment amount that is specified by the payment item; an identifier of the first entity; a transaction channel identifier that indicates the channel through which a transacting entity presented the payment item to the first entity; a payment distribution method identifier that indicates how the transacting entity requested to be paid for the payment item by the first entity; an account number of the first entity associated with the transacting entity; and if the payment item is a check, a serial number of the check.

In certain embodiments of the system, the payment likelihood indicator in the response can include an indication of whether or not the second entity guarantees payment of the payment item.

In certain embodiments of the system, the payment likelihood indicator in the response can include a score.

In certain embodiments of the system, the response further can include one or more reason indicators to explain the payment likelihood indicator.

In certain embodiments of the system, the response can be sent within 30 seconds of receiving the inquiry. The payment item can include one of a check or an ACH item.

In various embodiments, a system includes one or more processing modules and one or more non-transitory memory storage modules storing computing instructions configured to run on the one or more processing modules and perform certain acts. The acts can include receiving a first promise-to-pay message at a transaction system. The first promise-to-pay message can be based on a successful debit of a first account maintained by a first financial institution. The successful debit of the first account can be based on a bill payment authorization made by a sender at a payment authorization time. The first account can be held by the sender. The acts also can include storing the first promise-to-pay message in the transaction system. The acts additionally can include sending a second promise-to-pay message from the transaction system to a second financial institution. The second promise-to-pay message can be based on the first promise-to-pay message, such that the second financial institution credits a second account maintained by the second financial institution to make funds available in the second account in real-time after the payment authorization time. The sender can be financially liable for the second account. The acts further can include receiving a first response at the transaction system from the second financial institution indicating a successful credit of the second account maintained by the second financial institution. The acts additionally can include storing the first response in the transaction system. The acts further can include sending a second response from the transaction system indicating the successful credit of the second account maintained by the second financial institution to inform at least the sender in real-time after the payment authorization time of the successful credit of the second account maintained by the second financial institution. The first financial institution can be different from the second financial institution.

In a number of embodiments, a method can be implemented via execution of computer instructions configured to run at one or more processing modules and configured to be stored at one or more non-transitory memory storage modules. The method can include receiving a first promise-to-pay message at a transaction system. The first promise-to-pay message can be based on a successful debit of a first account maintained by a first financial institution. The successful debit of the first account can be based on a bill payment authorization made by a sender at a payment authorization time. The first account can be held by the sender. The method also can include storing the first promise-to-pay message in the transaction system. The method additionally can include sending a second promise-to-pay message from the transaction system to a second financial institution. The second promise-to-pay message can be based on the first promise-to-pay message, such that the second financial institution credits a second account maintained by the second financial institution to make funds available in the second account in real-time after the payment authorization time. The sender can be financially liable for the second account. The method further can include receiving a first response at the transaction system from the second financial institution indicating a successful credit of the second account maintained by the second financial institution. The method additionally can include storing the first response in the transaction system. The method further can include sending a second response from the transaction system indicating the successful credit of the second account maintained by the second financial institution to inform at least the sender in real-time after the payment authorization time of the successful credit of the second account maintained by the second financial institution. The first financial institution can be different from the second financial institution.

In various embodiments, a system includes one or more processing modules and one or more non-transitory memory storage modules storing computing instructions configured to run on the one or more processing modules and perform certain acts. The acts can include sending a debit message from a transaction system to a first financial institution to debit a first account maintained by the first financial institution based on a bill payment authorization made by a sender at a payment authorization time. The first account can be held by the sender. The acts also can include receiving a debit response at the transaction system from the first financial institution in real-time after the payment authorization time. The debit response can indicate a successful debit of the first account maintained by the first financial institution. The acts additionally can include storing the debit response in the transaction system. The acts further can include sending a first response to an application service provider indicating the successful debit of the first account maintained by the first financial institution, such that the application service provider sends a promise-to-pay message to a second financial institution to credit a second account maintained by the second financial institution to make funds available in the second account in real-time after the payment authorization time, and such that the application service provider informs the sender in real-time after the payment authorization time of a successful credit of the second account maintained by the second financial institution. The sender can be financially liable for the second account. The first financial institution can be different from the second financial institution. The application service provider can be the same entity as the second financial institution.

In a number of embodiments, a method can be implemented via execution of computer instructions configured to run at one or more processing modules and configured to be stored at one or more non-transitory memory storage modules. The method can include sending a debit message from a transaction system to a first financial institution to debit a first account maintained by the first financial institution based on a bill payment authorization made by a sender at a payment authorization time. The first account can be held by the sender. The method also can include receiving a debit response at the transaction system from the first financial institution in real-time after the payment authorization time. The debit response can indicate a successful debit of the first account maintained by the first financial institution. The method additionally can include storing the debit response in the transaction system. The method further can include sending a first response to an application service provider indicating the successful debit of the first account maintained by the first financial institution, such that the application service provider sends a promise-to-pay message to a second financial institution to credit a second account maintained by the second financial institution to make funds available in the second account in real-time after the payment authorization time, and such that the application service provider informs the sender in real-time after the payment authorization time of a successful credit of the second account maintained by the second financial institution. The sender can be financially liable for the second account. The first financial institution can be different from the second financial institution. The application service provider can be the same entity as the second financial institution.

In various embodiments, a system includes one or more processing modules and one or more non-transitory memory storage modules storing computing instructions configured to run on the one or more processing modules and perform certain acts. The acts can include receiving a debit message at a first financial institution to debit a first account maintained by the first financial institution based on a bill payment authorization for a payment amount made by a sender at a payment authorization time. The first account can be held by the sender. The acts also can include performing a successful debit for the payment amount from the first account maintained by the first financial institution in real-time after the payment authorization time. The acts additionally can include sending a debit response from the first financial institution in real-time after the payment authorization time. The debit response can indicate the successful debit of the first account maintained by the first financial institution, such that an application service provider sends a first promise-to-pay message for a second financial institution to credit a second account maintained by the second financial institution to make funds available in the second account in real-time after the payment authorization time, and such that the application service provider informs the sender in real-time after the payment authorization time of a successful credit of the second account maintained by the second financial institution. The sender can be financially liable for the second account. The first financial institution can be different from the second financial institution.

In a number of embodiments, a method can be implemented via execution of computer instructions configured to run at one or more processing modules and configured to be stored at one or more non-transitory memory storage modules. The method can include receiving a debit message at a first financial institution to debit a first account maintained by the first financial institution based on a bill payment authorization for a payment amount made by a sender at a payment authorization time. The first account can be held by the sender. The method also can include performing a successful debit for the payment amount from the first account maintained by the first financial institution in real-time after the payment authorization time. The method additionally can include sending a debit response from the first financial institution in real-time after the payment authorization time. The debit response can indicate the successful debit of the first account maintained by the first financial institution, such that an application service provider sends a first promise-to-pay message for a second financial institution to credit a second account maintained by the second financial institution to make funds available in the second account in real-time after the payment authorization time, and such that the application service provider informs the sender in real-time after the payment authorization time of a successful credit of the second account maintained by the second financial institution. The sender can be financially liable for the second account. The first financial institution can be different from the second financial institution.

In various embodiments, a system includes one or more processing modules and one or more non-transitory memory storage modules storing computing instructions configured to run on the one or more processing modules and perform certain acts. The acts can include providing a payment application to a sender from an application service provider. The acts also can include receiving a bill payment authorization from the sender through the payment application. The bill payment authorization can be made by the sender at a payment authorization time. The acts additionally can include sending a first debit message from the application service provider to debit a first account maintained by a first financial institution based on the bill payment authorization. The first account can be held by the sender. The acts further can include receiving a first debit response at the application service provider in real-time after the payment authorization time. The debit response can indicated a successful debit of the first account maintained by the first financial institution. The acts additionally can include generating a first promise-to-pay message for a second financial institution to credit a second account maintained by the second financial institution to make funds available in the second account in real-time after the payment authorization time. The sender can be financially liable for the second account. The first promise-to-pay message can be based on the successful debit of the first account maintained by the first financial institution. The acts further can include sending the first promise-to-pay message. The acts additionally can include receiving a first response at the application service provider indicating a successful credit of the second account maintained by the second financial institution. The acts further can include sending a notification to the sender from the application service provider in real-time after the payment authorization time of the successful credit of the second account maintained by the second financial institution. The first financial institution can be different from the second financial institution.

In a number of embodiments, a method can be implemented via execution of computer instructions configured to run at one or more processing modules and configured to be stored at one or more non-transitory memory storage modules. The method can include receiving a bill payment authorization from the sender through the payment application. The bill payment authorization can be made by the sender at a payment authorization time. The acts additionally can include sending a first debit message from the application service provider to debit a first account maintained by a first financial institution based on the bill payment authorization. The first account can be held by the sender. The acts further can include receiving a first debit response at the application service provider in real-time after the payment authorization time. The debit response can indicated a successful debit of the first account maintained by the first financial institution. The acts additionally can include generating a first promise-to-pay message for a second financial institution to credit a second account maintained by the second financial institution to make funds available in the second account in real-time after the payment authorization time. The sender can be financially liable for the second account. The first promise-to-pay message can be based on the successful debit of the first account maintained by the first financial institution. The acts further can include sending the first promise-to-pay message. The acts additionally can include receiving a first response at the application service provider indicating a successful credit of the second account maintained by the second financial institution. The acts further can include sending a notification to the sender from the application service provider in real-time after the payment authorization time of the successful credit of the second account maintained by the second financial institution. The first financial institution can be different from the second financial institution.

In various embodiments, a system includes one or more processing modules and one or more non-transitory memory storage modules storing computing instructions configured to run on the one or more processing modules and perform certain acts. The acts can include receiving a first promise-to-pay message at a second financial institution. The first promise-to-pay message can be based on a successful debit of a first account maintained by a first financial institution. The successful debit of the first account can be based on a bill payment authorization for a payment amount made by a sender at a payment authorization time. The first account can be held by the sender. The acts also can include performing a successful credit for the payment amount to a second account maintained by the second financial institution to make funds available in the second account in real-time after the payment authorization time. The sender can be financially liable for the second account. The acts additionally can include sending a first response from the second financial institution indicating the successful credit of the second account maintained by the second financial institution to inform at least the sender in real-time after the payment authorization time of the successful credit of the second account maintained by the second financial institution. The first financial institution can be different from the second financial institution.

In a number of embodiments, a method can be implemented via execution of computer instructions configured to run at one or more processing modules and configured to be stored at one or more non-transitory memory storage modules. The method can include receiving a first promise-to-pay message at a second financial institution. The first promise-to-pay message can be based on a successful debit of a first account maintained by a first financial institution. The successful debit of the first account can be based on a bill payment authorization for a payment amount made by a sender at a payment authorization time. The first account can be held by the sender. The acts also can include performing a successful credit for the payment amount to a second account maintained by the second financial institution to make funds available in the second account in real-time after the payment authorization time. The sender can be financially liable for the second account. The acts additionally can include sending a first response from the second financial institution indicating the successful credit of the second account maintained by the second financial institution to inform at least the sender in real-time after the payment authorization time of the successful credit of the second account maintained by the second financial institution. The first financial institution can be different from the second financial institution.

In conventional systems, when a first financial institution receives a payment item from a payee, such as a check or an ACH item, to be paid from a payor's account maintained by a second financial institution, the first financial institution generally does not interact with the second financial institution to determine whether to accept the transaction and/or make the funds for the payment item immediately available to the payee. Instead, the first financial institution generally makes that determination based on information about the payee, such as the payee's credit history and/or information about the payee's account(s) (e.g., account balances) maintained by the first financial institution. In some instances, the first financial institution may seek information about the payor's account maintained by the second financial institution through a third-party fraud-prevention service, which generally provides information about whether the account is open and in good status, has had recent activity for not-sufficient funds (NSF) or other return activity, or had a stop payment order. The fraud-prevention service generally derives this information based on overnight batch data received from financial institutions, which in some cases can include the second financial institution.

Figure 8:
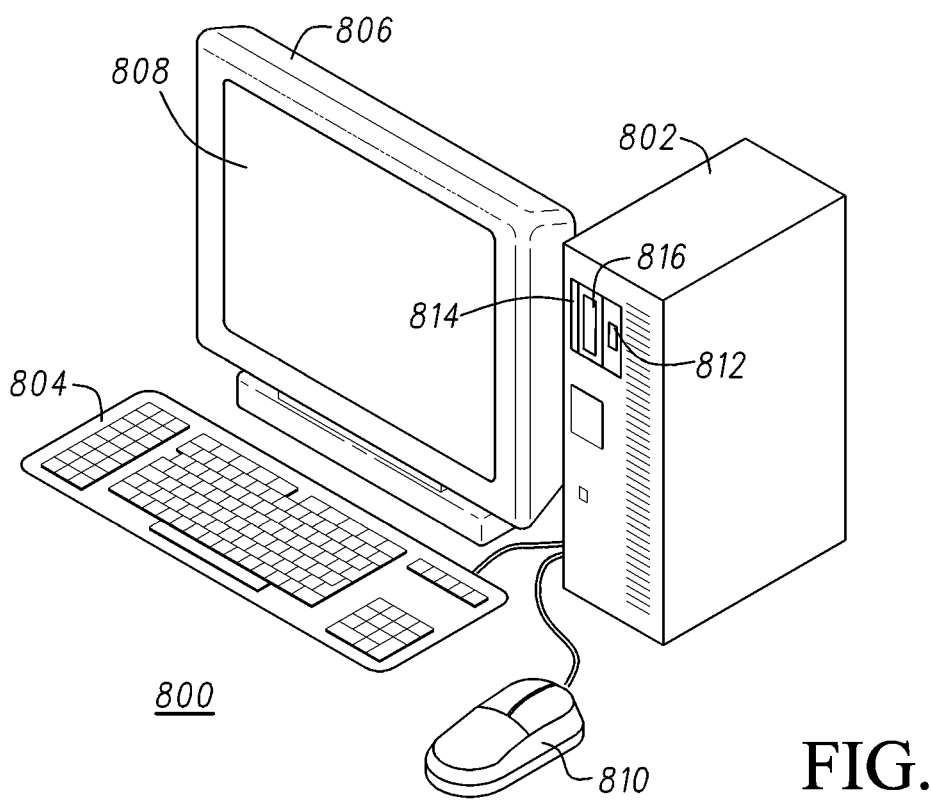
FIG. 8 illustrates a computer that is suitable for implementing an embodiment of the system of FIG. 1 and/or the system of FIG. 2.

Turning to the drawings, FIG. 1 illustrates a block diagram of a system 100 that can be employed for real-time determination of funds availability for check and ACH items, according to an embodiment. System 100 is merely exemplary and embodiments of the system are not limited to the embodiments presented herein. The system can be employed in many different embodiments or examples not specifically depicted or described herein. In some embodiments, certain elements or modules of system 100 can perform various procedures, processes, and/or activities. In other embodiments, the procedures, processes, and/or activities can be performed by other suitable elements or modules of system 100. In some embodiments, system 100 can include a system 110. System 110 can be a computer system, such as computer system 800, as shown in FIG. 8 and described below, and can each be a single computer, a single server, or a cluster or collection of computers or servers, or a cloud of computers or servers. In several embodiments, system 110 can include a database 111. In a number of embodiments, system 110 can include one or more modules, such as a communications module 112, a data module 113, a risk engine 114, and/or a likelihood calculation engine 115, which are described below in further detail.

In many embodiments, system 110 can be in data communication through a network 120 with financial institutions, such as financial institutions 131, 132, 133, and/or 134. Network 120 can be the Internet or another suitable computer data network. In certain embodiments, each of financial institutions 131-134 can include a computer system, such as computer system 800, as shown in FIG. 8 and described below, and can each be a single computer, a single server, or a cluster or collection of computers or servers, or a cloud of computers or servers. In many embodiments, the financial institutions (e.g., 131-134) can be depository financial institutions, such as savings banks, credit unions, savings and loan associations, etc. In other embodiments, other forms of financial institutions and/or other entities can be connected to system 110 through network 120.

In a number of embodiments, system 110 can regularly receive information from financial institutions, such as financial institutions 131-134, about accounts maintained by the financial institutions (e.g., 131-134). In various embodiments, the information received from the financial institutions can be stored in database 111. For example, in many embodiments, each of financial institutions (e.g., 131-134) can provide overnight batch data to system 110, which can include information about whether accounts are open and in good status, what balances are available in the open accounts, whether accounts have had recent not sufficient funds (NSF) or other activity, and/or whether accounts have had a stop payment order. In a number of embodiments, system 110 can use the data provided by the financial institutions to provide fraud-prevention services to financial institutions (e.g., 131-134). For example, if a payee attempts to cash a check at financial institution 131 for a check drawn on a payor's account maintained at financial institution 132, financial institution 131 can inquire with system 110 about information regarding the payor's account at financial institution 132.

In the same or other embodiments, system 110 can provide for interaction between the financial institutions (e.g., 131-134). For example, in many embodiments, system 110 can provide protocols for a financial institution (e.g., 131) to communicate with another one of the financial institutions (e.g., 132) through system 110 to obtain additional information about whether the other financial institution (e.g., 132) that is specified as responsible for paying a payment item is likely to pay the payment item. In some embodiments, the payment item can be a check. In other embodiments, the payment item can be an ACH item. For example, a check can be drawn on an account at the other financial institution (e.g., 132), or an ACH item can specific an account at the other financial institution (e.g., 132) for payment, and financial institution 132 can be deemed responsible for paying the payment item using the specified account. In a number of embodiments, the interactions between the financial institutions (e.g., 131-134) through system 110 can be limited to inquiries regarding checks or ACH items, and not include inquiries regarding payment card transactions (e.g., debit card, credit card, etc.). In other embodiments, the interactions between the financial institutions (e.g., 131-134) through system 110 can include payment card transactions.

In some embodiments, system 110 can determine whether to route an inquiry from a financial institution (e.g., 131) receiving a payment item to another financial institution (e.g., 132) specified by the payment item as responsible for paying the payment item. The determination can be based on one or more factors, as described below in further detail. In several embodiments, the financial institution (e.g., 132) that is specified by the payment item as responsible for paying the payment item can respond with information regarding a likelihood of that financial institution (e.g., 132) paying the payment item. In other embodiments, information regarding a likelihood of that financial institution (e.g., 132) to pay the payment item, such as information provided regularly (e.g., twice daily, hourly, half-hourly, on each transaction, etc.), can be provided to system 110 by that financial institution (e.g., 132). In many embodiments, the financial institution (e.g., 131) that received the payment item can receive the information regarding the likelihood of payment by the financial institution (e.g., 132) that is specified by the payment item as responsible for paying the payment item, and can use that information and/or other information provided by system 110 to determine whether to approve or deny the transaction. In many embodiments, system 110 can facilitate real-time determination of funds availability on a scale of many financial institutions (e.g., greater than 5, 10, 20, 50, 100, 500, 1000, 10,000, or more financial institutions) and can facilitate many such transactions (e.g., greater than 100, 1,000, 10,000, 100,000, 1,000,000, 10,000,000, or more per day) through system 110.

In certain embodiments, system 110 can provide interaction between the financial institutions (e.g., 131-134) for providing credit push notifications. For example, in many embodiments, system 110 can provide protocols for a financial institution (e.g., 131) to communicate with another one of the financial institutions (e.g., 132) through system 110 to notify the other financial institution (e.g., 132) of a credit push payment. In some embodiments, for example, a customer can initiate notification of an ACH credit transaction at financial institution 131 (which can be an originating depository financial institution (ODFI)) to credit an account of a recipient at financial institution 132 (which can be a receiving depository financial institution (RDFI)), which can result in a memo post to the account of the recipient at financial institution 132 in real-time. In many embodiments, the credit push transaction can be cleared through conventional batch processing (e.g., nightly or interim day batch processing), and the notification can be sent from financial institution 131 through system 110 to financial institution 132 in real-time, which can beneficially provide financial institution 132 with information about future credits to be posted to the account of the recipient at financial institution 132. In many embodiments, system 110 can store the transaction, such as in database 111. Additional details regarding real-time payment transactions are shown in FIGS. 10-28 and described below.

Figure 2:
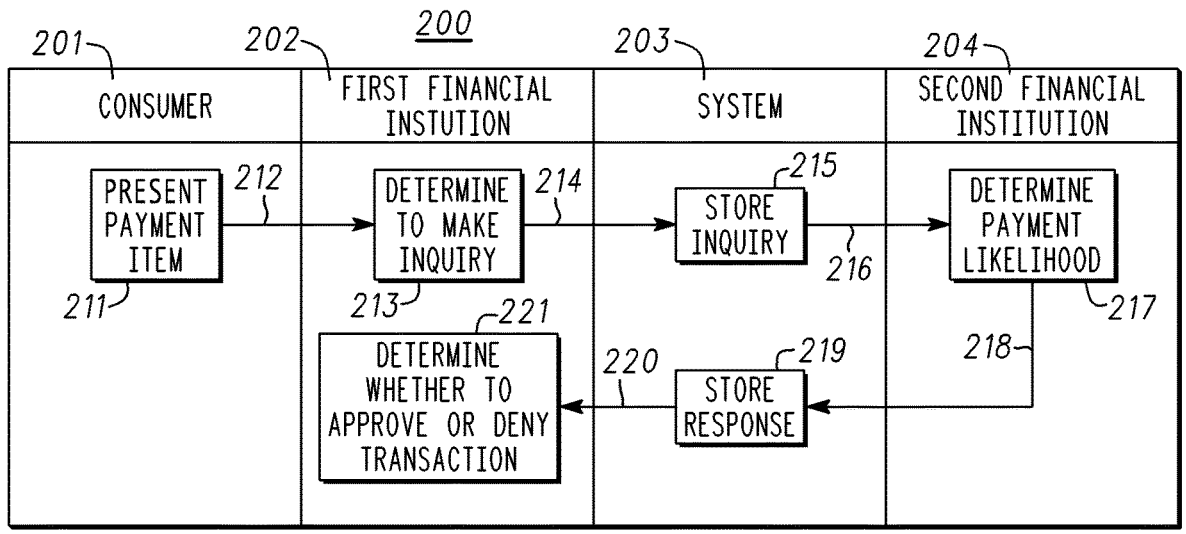
FIG. 2 illustrates an exemplary workflow for real-time determination of funds availability sent from a first financial institution through a system with a second financial institution determining a payment likelihood and without the system making a routing decision, according to various embodiments.

Turning ahead in the drawings, FIG. 2 illustrates an exemplary workflow 200 for real-time determination of funds availability sent from a first financial institution 202 through a system 203 with a second financial institution 204 determining a payment likelihood and without system 203 making a routing decision, according to various embodiments. Workflow 200 is merely exemplary and is not limited to the embodiments presented herein. Workflow 200 can be employed in many different embodiments or examples not specifically depicted or described herein. In some embodiments, the procedures, the processes, and/or the activities of workflow 200 can be performed in the order presented. In other embodiments, the procedures, the processes, and/or the activities of workflow 200 can be performed in any suitable order. In still other embodiments, one or more of the procedures, the processes, and/or the activities of workflow 200 can be combined or skipped. System 203 can be similar or identical to system 110 (FIG. 1).

In some embodiments, workflow 200 can begin with an activity 211 of an entity, such as consumer 201, presenting a payment item to a first financial institution 202 for a transaction. For example, consumer 201 can present a check for $500 to be cashed at a financial institution, such as first financial institution 202. The check can be drawn by a payor against an account of the payor at another financial institution, such as second financial institution 204. In many embodiments, consumer 201 can be the payee, endorsee, or bearer of the check. As another example, consumer 201 can make an online purchase at an online retailer by using checking or savings account information for an account maintained at a financial institution, such as second financial institution 204, and the online retailer can be the originator that presents an ACH payment item based on the checking or savings account information to an originating depository financial institution (ODFI). In various embodiments, consumer 201, the originator, and/or the payor can use the payment item to attempt to effect a transfer of funds (e.g., make a payment, receive a payment, make a deposit, and/or cash the payment item) and/or to determine an availability of funds to be transferred using the payment item. For example, the originator can request that the ACH payment item be screened through the ODFI.

In many embodiments, workflow 200 can continue with an activity 212 of the payment item being received by first financial institution 202. For example, first financial institution 202 can receive a physical check or information regarding the payment item. For example, the payment item can be received through an automated teller machine (ATM), a teller, mail, an online transaction, an online request, remote deposit capture (RDC), lock box, in-store, check processor, or another channel. In other embodiments, first financial institution 202 can be replaced by the originator (such as a merchant) or a payment processor, which can interact directly with system 203. In some embodiments, first financial institution 202 can be a processor or a third party acting on behalf of the ODFI. In a number of embodiments, the second entity can be a processor or a third party acting on behalf of the RDFI.

In some embodiments, workflow 200 can continue with an activity 213 of first financial institution 202 determining whether to make an inquiry to system 203 and/or storing the determination. In some embodiments, first financial institution 202 can automatically send an inquiry to system 203 after receiving a payment item. In other embodiments, first financial institution 202 can make an internal risk decision based on one or more factors, such as the relationship between first financial institution 202 and the requestor (e.g., consumer 201 or the originator who provided the payment item to first financial institution 202). For example, the requestor can have one or more accounts at first financial institution 202. The internal risk decision can be based on the account balances of the requestor at first financial institution 202, return activity of the requestor at first financial institution 202, a date of the payment item, a payment amount of the payment item, and/or a relationship history of deposits of the requestor at first financial institution 202. In addition, or alternatively, the internal risk decision can be based on a relationship history of the payor with first financial institution 202. First financial institution 202 can store the internal risk decision.

In many embodiments, workflow 200 can continue with an activity 214 of first financial institution 202 sending an inquiry to system 203, and/or system 203 receiving the inquiry from financial institution 202. In a number of embodiments, the inquiry can be sent from first financial institution 202 to system 203 in real-time after activity 212 of first financial institution 202 receiving the payment item. In several embodiments, the inquiry can include information from the payment item identifying the account of the payor, the financial institution (e.g., second financial institution 204) maintaining the account of the payor, information regarding the requestor, the channel through which the request was made, the type of transaction, and/or other information. For example, in some embodiments, the inquiry can include: (1) the routing number (e.g. American Bankers Association (ABA) routing transit number (RTN)) specified by the payment item; (2) the account number specified by the payment item; (3) if the payment item is a check, a serial number of the check; (4) an account transaction ("trans") code specified by the payment item; (5) a dollar amount specified by the payment item; (6) an identifier for the originator, requestor, and/or first financial institution 202; (7) one or more channel indicators (e.g., ATM, a teller, mail, an online transaction, the identity of the online device, the location of the online device, RDC, lock box, in-store, check processor, and/or another channel); (8) an identifier of what the requestor has requested with the transaction (e.g., cash, deposit, or payment); (9) an identifier of the type (e.g., check, ACH item, Standard for Financial Services Messaging (ISO (International Organization for Standardization) 20022), certified check, payment cards (debit card, credit card), etc.); (10) transaction identifier (ID) or sequence number for the transaction (which can be generated by system 203); (11) an account number of the requestor, payee, and/or depositor; and/or other suitable information. For example, in some embodiments, the inquiry can include a debit card number for a debit card associated with the account of the payor. In some embodiments, the debit card number can be included in the inquiry in lieu of the routing number and/or the account number. In a number of embodiments, the inquiry can include a transaction business date. In certain embodiments, the inquiry can include a primary client ID or other ID, a transaction ID, and/or an item ID for the payment item.

In certain embodiments, the inquiry can include an identifier linked to the account of the payor. In some embodiments, an identifier can be included in the inquiry in lieu of the routing number and/or the account number. For example, the identifier can include a tokenized or masked token, which can be an identifier which can be linked to the account of the payor. In some embodiments, the token can be a temporary (e.g., one-time use, or limited-time use) identifier. In a number of embodiments, the token include an encrypted identifier. In some embodiments, the identifier in the inquiry can include an email address of the payor, a phone number of the payor, a device ID of the payor, the name of the payor, a debit card number of the payor, a transaction business date, a transaction ID, an item ID, and/or a client ID. In a number of embodiments, such as when the account number and/or routing number is tokenized, the inquiry can include a tokenized service manager ID.

In many embodiments, workflow 200 can continue with an activity 215 of system 203 storing the inquiry sent from first financial institution 202. The inquiry can be stored in database 111 (FIG. 1), and can include a timestamp of when the inquiry was received at system 203. In some embodiments when the inquiry includes an identifier, system 203 can determine the account number and/or routing number from the identifier.

In many embodiments, workflow 200 can continue with an activity 216 of system 203 sending an inquiry to second financial institution 204, and/or second financial institution 204 receiving the inquiry from system 203. In a number of embodiments, the inquiry can be sent from system 203 to second financial institution 204 in real-time after activity 214 of system 203 receiving the inquiry. In many embodiments, the inquiry sent to second financial institution 204 in activity 216 can be similar or identical to the inquiry received by system 203 in activity 214. In some embodiments, such as when the inquiry of activity 214 includes an identifier, the inquiry of activity 216 can include the account number and/or routing number from the identifier. In other embodiments, activity 216 can include the identifier in lieu of the account number and/or routing number, and second financial institution 204 can determine the account number and/or routing number from the identifier.

In several embodiments, workflow 200 can continue with an activity 217 of second financial institution 204 determining and/or saving a payment likelihood. In various embodiments, determining the payment likelihood can be based at least in part on current information of the payor's account maintained by second financial institution 204 and/or information provided to second financial institution 204 in the inquiry. In many embodiments, the financial institutions (e.g., second financial institution 204) that participate in services offered through system 203 and provide payment likelihood for real-time determination of funds availability can have agreed to common consortium rules to be used when determining a payment likelihood. The common consortium rules can advantageously provide consistency across determinations made and information provided by different financial institutions. In some embodiments, the providers of system 203 can dictate the consortium rules to the financial institutions (e.g., second financial institution 204) that provide payment likelihood information.

In several embodiments, the consortium rules can address information that an inquirer (e.g., first financial institution 202) might want to know in determining whether to approve or deny a transaction, such as current account status and sufficiency of funds to cover the payment item, risk of fraud, money laundering, and/or other factors. Second financial institution 204, which is specified as responsible for paying the payment item, can beneficially have current detailed information regarding the payor and/or the payor's account maintained by second financial institution 204. For example, in some embodiments, activity 217 of second financial institution 204 determining the payment likelihood can be based on one or more rules, such as: (1) determining whether the payor's account is currently open (e.g., based on intraday status, if the account is opened or closed during the day of the inquiry); (2) determining whether the current balance and/or available balance (e.g., the current balance adjusted by pending transactions that have not yet cleared) of the payor's account is greater than the amount specified by the payment item (e.g., is greater than or equal to the payment amount, is greater than the payment amount by a predetermined amount (e.g., is the balance at least $200 greater than the payment amount), or is greater than the payment amount by a factor of the payment amount (e.g. is the balance at least 150% of the payment amount)); (3) determining whether the payment amount is in a range of historical spending amounts by the payor (e.g., determining whether the payment amount is consistent with the payor's spending habits); (4) determining whether there is a likelihood of a deposit to be made into the account (e.g., on the day of the inquiry) that would make the payor's account able to cover the payment item, or expected withdrawals that would make the payor's account unable to cover the payment item; (5) determining whether the payment item is consistent with a pattern, if any, between the payee and the payor; (6) determining whether other payment items have been drawn on and/or presented for clearing against the payor's account (e.g., other pending charges) that would affect whether the payor's account could cover the payment item; (7) determining whether there is a risk of fraud based on activity that matches a fraudulent pattern or is inconsistent with the payor's spending habits; (8) determining whether there is a risk of fraud based on how recently the payor's account was opened; (9) determining whether there is a risk of fraud based on the channel used to present the payment; (10) determining whether there is a likelihood of money laundering based on transaction payment amounts, and/or the identities of the payor and/or payee; (11) if the payment item is a check, determining if the account is uses the Positive Pay verification service, and if so, verifying that the check is on the list provided by the payor and if the check has already been paid; (12) if the payment item is a check, determining whether the serial number of the check is in pattern (e.g., whether the serial number of the check is not within the range of serial numbers in one or more checkbooks that have been used recently for the payor's account); (13) if the payment item is a check, determining whether the check is a duplicate of an already-paid check; (14) if the payment item is a check, determining whether the check is likely a counterfeit, such as based on a statistical analysis; and/or other suitable rules.

In a number of embodiments, the rules can be used to determine a likelihood of whether or not the payment item will clear the payor's account at second financial institution 204. For example, in some embodiments, second financial institution 204 can determine a payment likelihood indicator, which can be whether or not second financial institution 204 guarantees payment of the payment item (e.g., either guarantees payment or does not guarantee payment) or whether or not second financial 204 is likely to pay the payment item (e.g., either is likely to pay or is not likely to pay). In the same or other embodiments, second financial institution 204 can determine a payment likelihood score, and the payment likelihood indicator can include the payment likelihood score. In some embodiments, the payment likelihood score can be a numeric score (e.g., 0-100), an alphabetic score (e.g., A-Z), a color score (e.g., red, yellow, or green), or another suitable type of score. In some embodiments, the payment likelihood indicator can include an expiration date/time. For example, the guarantee can have an expiration date/time after which the guarantee or payment likelihood indicator will expire.

In a number of embodiments, the payment likelihood indicator can include reason indicators (e.g., reason codes, explanations, attributes, etc.) that explain the reasons for the payment likelihood indicator. For example, the reasons can include: (1) that the payment item is not found on Positive Pay; (2) that the item is a possible duplicate; (3) that the account is closed; (4) that there has been fraud or the payment item is likely to be fraud on the account; (5) that the payment item is likely to be a counterfeit; (6) that the payment amount specified by the payment item is greater than the current and/or available balance of the payor's account; (6) that the payor's account is overdrawn or has an NSF status; (7) that the account has a sufficient balance; (8) that payment item is or is not in pattern (e.g., payment amount is consistent with transaction history, that the serial number is in the range of serial numbers in one or more checkbooks that have been used recently for the payor's account, etc.); (9) that the expected balance is or is not sufficient, based on expected deposits and/or payments; (10) that the payment is or is not in pattern for transactions between the payor and the payee; (11) that the item is on Positive Pay and is verified; and/or other suitable reasons.

In many embodiments, workflow 200 can continue with an activity 218 of second financial institution 204 sending a response to system 203, and/or system 203 receiving the response from second financial institution 204. In a number of embodiments, the response can be sent from second financial institution 204 to system 203 in real-time after activity 216 of second financial institution 204 receiving the inquiry. In several embodiments, the response can include the payment likelihood indicator that was determined in activity 217. In some embodiments, the response can include information from the inquiry and/or information determined by second financial institution 204. For example, in a number of embodiments, the response can include: (1) the routing number (e.g. ABA RTN) specified by the payment item; (2) the account number specified by the payment item; (3) if the payment item is a check, a serial number of the check; (4) an account transaction ("trans") code specified by the payment item; (5) a dollar amount specified by the payment item; (6) an identifier for the originator, requestor, and/or first financial institution 202; (7) one or more channel indicators (e.g., ATM, a teller, mail, an online transaction, the identity of the online device, the location of the online device, RDC, lock box, in-store, check processor, and/or another channel); (8) an identifier of what the requestor has requested with the transaction (e.g., cash, deposit, or payment); (9) an identifier of the type (e.g., check, ACH item, Standard for Financial Services Messaging (ISO (International Organization for Standardization) 20022), certified check, payment cards (debit card, credit card), etc.); (10) transaction identifier (ID) or sequence number for the transaction (which can be generated by system 203); (11) the account number of the requestor, payee, and/or depositor; (12) the date and/or time(s) of the inquiry/inquiries (e.g., based on the timestamp stored in activity 215 and/or the time the determination of the payment likelihood in activity 217); (13) the payment likelihood indicator (e.g., whether or not guaranteed to pay (which can include a guarantee expiration date/time), whether or not likely to pay; and/or the payment likelihood score); (14) the reason indicators for the payment likelihood indicator; and/or other suitable information.

In many embodiments, workflow 200 can continue with an activity 219 of system 203 storing the response sent from second financial institution 204 in activity 218. The inquiry can be stored in database 111 (FIG. 1), and can include a timestamp of when the response was received at system 203.

In some embodiments, workflow 200 can continue with an activity 220 of system 203 sending a response to first financial institution 202, and/or first financial institution 202 receiving the response from system 203. In a number of embodiments, the response can be sent from system 203 to first financial institution 202 in real-time after activity 218 of system 203 receiving the response. In many embodiments, the response sent to first financial institution 202 in activity 220 can be similar or identical to the response received by system 203 in activity 218.

In several embodiments, workflow 200 can continue with an activity 221 of first financial institution 202 determining whether to approve or deny the transaction, actually approving or denying the transaction, storing the approval or denial, and/or notifying consumer 201 of such approval or denial. In various embodiments, first financial institution 202 can determine whether to approve or deny the transaction based at least in part on the response received by first financial institution 202 in activity 220. By incorporating insight from second financial institution 204, first financial institution 202 can advantageously make a more informed decision in determining the availability of funds for the payment item and in determining whether to approve or deny the transaction. For example, if the response includes a guarantee of payment or an indication or likelihood of payment by second financial institution 204, first financial institution 202 can approve the transaction. If the response includes the payment likelihood score, first financial institution 202 can determine whether the score indicates a low enough risk that first financial institution 202 can be comfortable with the risk of approving the transaction.

Figure 3:
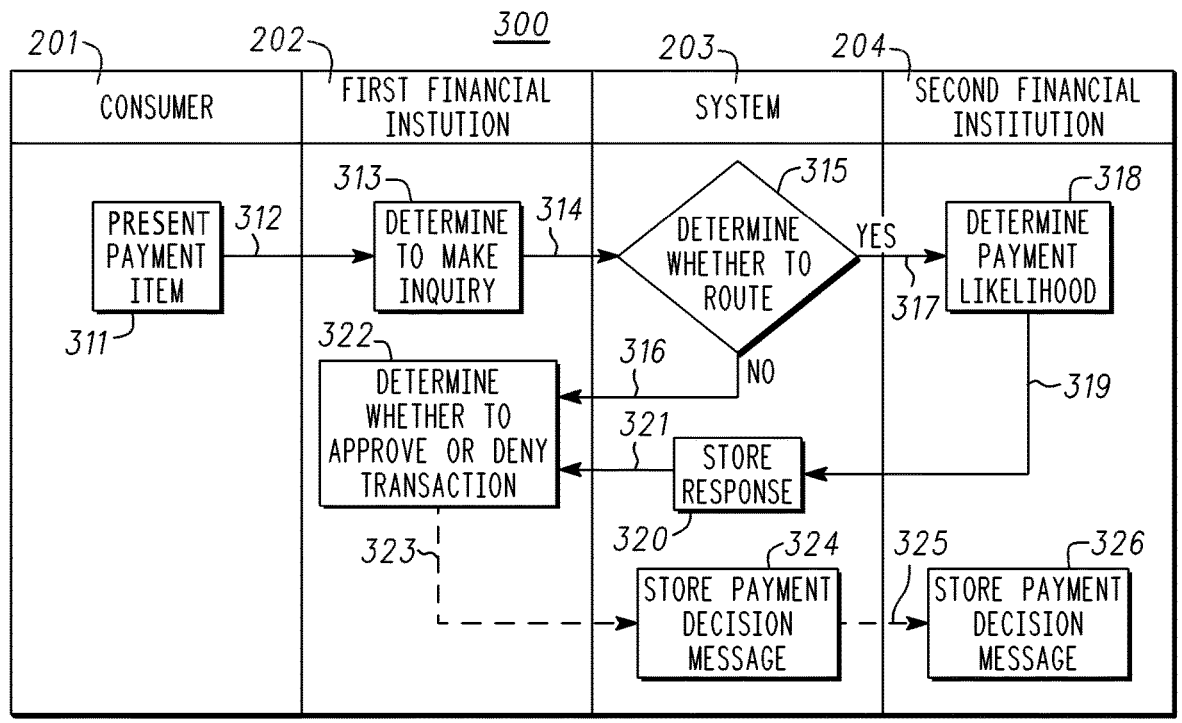
FIG. 3 illustrates an exemplary workflow for real-time determination of funds availability sent from the first financial institution of FIG. 2 through the system of FIG. 2 with the system of FIG. 2 making a routing decision of whether to have the second financial institution of FIG. 2 determine a payment likelihood, according to various embodiments.

Turning ahead in the drawings, FIG. 3 illustrates an exemplary workflow 300 for real-time determination of funds availability sent from first financial institution 202 through system 203 with system 203 making a routing decision of whether to have second financial institution 204 determine a payment likelihood, according to various embodiments. Workflow 300 is merely exemplary and is not limited to the embodiments presented herein. Workflow 300 can be employed in many different embodiments or examples not specifically depicted or described herein. In some embodiments, the procedures, the processes, and/or the activities of workflow 300 can be performed in the order presented. In other embodiments, the procedures, the processes, and/or the activities of workflow 300 can be performed in any suitable order. In still other embodiments, one or more of the procedures, the processes, and/or the activities of workflow 300 can be combined or skipped. Workflow 300 can be similar to workflow 200 (FIG. 2), and various activities of workflow 300 can be similar or identical to various activity of workflow 200 (FIG. 2).

In some embodiments, workflow 300 can begin with an activity 311 of an entity, such as consumer 201, presenting a payment item for a transaction. Activity 311 can be similar or identical to activity 211 (FIG. 2).

In many embodiments, workflow 300 can continue with an activity 312 of the payment item being received by first financial institution 202. Activity 312 can be similar or identical to activity 212 (FIG. 2).

In some embodiments, workflow 300 can continue with an activity 313 of first financial institution 202 determining whether to make an inquiry to system 203 and/or storing the determination. Activity 313 can be similar or identical to activity 213 (FIG. 2).

In many embodiments, workflow 300 can continue with an activity 314 of first financial institution 202 sending an inquiry to system 203, and/or system 203 receiving the inquiry from first financial institution 202. Activity 314 can be similar or identical to activity 214 (FIG. 2).

In a number of embodiments, workflow 300 can continue with an activity 315 of determining whether to route the inquiry to second financial institution 204 and/or storing the determination. In many embodiments, the routing decision can be based at least in part on a risk of non-payment of the payment item by the second entity. In many embodiments, the routing decision can be based on information received from financial institutions (e.g., 131-134 (FIG. 1), which can include first financial institution 202 and/or second financial institution 204), such as overnight batch data regarding whether accounts are open and in good status, what balances are available in the open accounts, whether accounts have had recent NSF or other activity, whether accounts had a stop payment order, and/or other suitable information. In some embodiments, system 203 can store the inquiry from first financial institution 202 received in activity 314 with or without a timestamp of when the inquiry was received by system 203, and system 203 can use database 111 (FIG. 1) to store the inquiry. In a number of embodiments, the routing decision can be based at least in part on other inquiries received earlier in the same day that are similar to the inquiry received in activity 314. In some embodiments, the financial institutions (e.g., 131-134 (FIG. 1), first financial institution 202, and/or second financial institution 204) can provide additional information to system 203 on a periodic or regular basis (e.g., daily, twice daily, hourly, half-hourly, on every transaction, etc.), which can be received by system 203 before receiving the inquiry in activity 314, which can be more up-to-date than overnight batch data, and which can be used by system 203 in some embodiments to determine the routing decision.

In several embodiments, the routing decision can be based on whether second financial institution 204 is setup to participate in online back-office validation to determine payment likelihood, and/or can be based on rules that determine a risk of non-payment, based on information made available to system 203 from the financial institutions (e.g., 131-134 (FIG. 1), first financial institution 202, and/or second financial institution 204) before receiving the inquiry in activity 314, based on earlier inquiries through system 203 (similar to the inquiry received in activity 314), and/or based on the inquiry received in activity 314. In some embodiments, when system 203 applies the rules to determines the risk of non-payment and the routing decision, system 203 can generate decision information, which can be returned to first financial institution 202 and/or sent to second financial institution 204.

In various embodiments, system 203 can determine whether the payment item is drawn on an invalid account. If the account specified by the payment item is not found, system 203 can generate decision information indicating that the account was not found and can determine not to route the inquiry to second financial institution 204.

In many embodiments, system 203 can determine whether the account specified by the payment item is open. If the account is closed, and has been closed for more than a predetermined amount of time (e.g., 7 days), system 203 can generate decision information that the account is closed and determine not to route the inquiry to second financial institution 204. In some embodiments, if the account has been closed for less than a predetermined amount of time (e.g., 7 days), system 203 can generate decision information that the account has been recently closed and can determine to route the inquiry to second financial institution 204.

In several embodiments, system 203 can determine, if the payment item is an ACH item, whether the account specified by the payment item has a "Post no Debits" status. If the account has a "Post no Debits" status, system 203 can generate decision information indicating that the account has a "Post no Debits" status and can determine not to route the inquiry to second financial institution 204.

In various embodiments, system 203 can determine, if the payment item is a check, whether the account specified by the payment item has a stop payment on the item. For example, the stop payment can be based on a three-field match of routing number, account number, and serial number, or a four-field match of routing number account number, serial number, and payment amount. If the account has a stop payment status, system 203 can generate decision information indicating that the account has a stop payment status and can determine not to route the inquiry to second financial institution 204.

In some embodiments, system 203 can determine, if the payment item is a check, whether the account specified by the payment item uses Positive Pay verification. In some embodiments, if the account uses Positive Pay verification, system 203 can generate decision information indicating that the account has uses Positive Pay verification. In some embodiments, system 203 can determine not to route the inquiry to second financial institution 204. In other embodiments, system 203 can determine to route the inquiry to second financial institution 204 for Positive Pay verification.

In many embodiments, system 203 can determine, if the payment item is a check, whether the check is likely a duplicate. If the check is likely a duplicate, system 203 can generate decision information indicating that the check is likely a duplicate and can determine not to route the inquiry to second financial institution 204.

In many embodiments, system 203 can determine, if the payment item is a check, whether the check is likely a counterfeit. If the check is likely a counterfeit, system 203 can generate decision information indicating that the check is likely a counterfeit and can determine not to route the inquiry to second financial institution 204.

In many embodiments, system 203 can determine whether the payment item is likely part of a money-laundering scheme. For example, system 203 can determine whether the payment item is likely part of a money-laundering scheme based on the payment amount of the payment item and/or other transactions, and/or the payee and/or payor for the payment item. If the payment item is likely part of a money-laundering scheme, system 203 can generate decision information indicating that the payment item is likely part of a money-laundering scheme and can determine not to route the inquiry to second financial institution 204.

In many embodiments, system 203 can determine whether the payment item is likely fraudulent. For example, system 203 can determine whether the payment item is likely fraudulent based on the channel used, whether the channel used is a new device, the authentication used in the channel, the location of the channel, whether the payor's account was recently opened, and/or whether the payment is consistent with transaction patterns for the payor and/or payee. If the payment item is likely fraudulent, system 203 can generate decision information indicating that the payment item is likely fraudulent and can determine not to route the inquiry to second financial institution 204.

In some embodiments, if system 203 has been provided with account balances (e.g., nightly, or more frequently), system 203 can determine whether the payment amount specified by the payment item is greater than the latest balance information received by system 203. In some embodiments, system 203 can generate decision information indicating that the payment item is likely unable to be covered by the payor's account and can determine not to route the inquiry to second financial institution 204.

In various embodiments, system 203 can determine whether the payment amount for the payment item is greater than or less than a predetermined amount. For certain financial institutions, and/or for certain accounts at certain financial institutions, the financial institution (e.g., either first financial institution 202 or second financial institution 204) might not want to have the inquiry routed to second financial institution 204 if the payment amount if below a predetermined amount (e.g., a payment amount below $10, $50, or $100). In such cases, system 203 can generate decision information indicating that the payment item is below a certain amount and determine not to route the inquiry to second financial institution 204.

In a number of embodiments, system 203 can determine whether second financial institution is setup to participate in online validation to determine payment likelihood. If second financial institution is not setup to participate in online validation, system 203 can generate decision information indicating that second financial institution 204 is not setup to participate in online validation, and can determine not to route the inquiry to second financial institution 204.

In many embodiments, if system 203 has determined to not route the inquiry to second financial institution 204, system 203 can instead respond to first financial institution 202. In such cases, workflow 300 can continue with an activity 316 of system 203 sending a response to first financial institution 202, and/or first financial institution 202 receiving the response from system 203. In a number of embodiments, the response can be sent from system 203 to first financial institution 204 in real-time after activity 314 of system 203 receiving the inquiry. In many embodiments, the response sent to first financial institution 202 in activity 316 can include information from the inquiry and/or the decision information generated by system 203 in activity 315.

If system 203 has determined to route the inquiry to second financial institution 204, workflow 300 can continue with an activity 317 of system 203 sending an inquiry to second financial institution 204, and/or second financial institution 204 receiving the inquiry from system 203. Activity 317 can be similar or identical to activity 216 (FIG. 2). In some embodiments, the inquiry sent to second financial institution 204 in activity 317 can include the decision information, such as the determination of the risk of non-payment, generated by system 203 in activity 315, and/or the information received by system 203 from first financial institution 202 in activity 314. In other embodiments, the decision information generated by system 203 in activity 315 can be sent to second financial institution 204 in a separate informational message sent before or after the inquiry sent by system 203 to second financial institution 204 in activity 317. In yet other embodiments, after receiving the inquiry in activity 317, second financial institution 204 can send a request for additional information to system 203, and system 203 in response can send an informational message to second financial institution 204 than includes the decision information generated by system 203 in activity 315. In yet other embodiments, second financial institution 204 can proceed to determine the payment likelihood (described below) without the information generated by system 203 in activity 315.

In several embodiments, workflow 300 can continue with an activity 318 of second financial institution 204 determining a payment likelihood and/or storing the determination. Activity 318 can be similar or identical to activity 217 (FIG. 2). In various embodiments, determining the payment likelihood can be based at least in part on current information of the payor's account maintained by second financial institution 204, information provided to second financial institution 204 in the inquiry, and/or the decision information generated by system 203 in activity 315. In many embodiments, the information available to second financial institution 204 can be different than the information available to system 203. For example, the information available to second financial institution 204 can be current information, as opposed to information from the previous night, and/or one or more previous intra-day updates, which can beneficially allow second financial institution 204 to make decisions based on more current information. In some embodiments, system 203 can have information about the payor and/or payee at other financial institutions (e.g., 131-134 (FIG. 1)), which can beneficially allow system 203 to determine risks using aggregated information that is not otherwise available to second financial institution 204. As such, the information provided by system 203 to second financial institution 204 in certain embodiments, such as the decision information generated by system 203 in activity 315, can advantageously enhance the ability of second financial institution 204 to more accurately determine the payment likelihood, such as whether not to guarantee payment, whether or not to determine that payment is likely, and/or to accurately determine a payment likelihood score.

In many embodiments, workflow 300 can continue with an activity 319 of second financial institution 204 sending a response to system 203, and/or system 203 receiving the response from second financial institution 204. Activity 319 can be similar or identical to activity 218 (FIG. 2).

In various embodiments, workflow 300 can continue with an activity 320 of system 203 storing the response sent from second financial institution 204 in activity 319. Activity 320 can be similar or identical to activity 219 (FIG. 2).

In some embodiments, activity 320 can include system 203 further determining a payment likelihood based on the payment likelihood determined by and received from second financial institution 204 and also based on additional information available to system 203. In these embodiments, system 203 might have information that second financial institution 204 does not have, and therefore, system 203 can refine or further determine the payment likelihood that was originally made by second financial institution 204, and system 203 can store the refined determination. For example, as explained above with respect to activity 315, system 203 may have additional financial information about the payor's other bank accounts at other financial institutions that second financial institution 204 does not have. Similarly, system 203 may have financial information about second financial institution 204 that is not part of the response in activity 319 but that system 203 can use to refine or further determine the payment likelihood.

In some embodiments, workflow 300 can continue with an activity 321 of system 203 system 203 sending a response to first financial institution 202, and/or first financial institution 202 receiving the response from system 203. Activity 321 can be similar or identical to activity 220 (FIG. 2). In some embodiments, the decision information generated by system 203 in activity 315 can be added to the response to first financial institution 202, and/or other risk factors, such as whether the account was recently opened.

In several embodiments, workflow 300 can continue after activity 316 or activity 321 with an activity 322 of first financial institution 202 determining whether to approve or deny the transaction, actually approving or denying the transaction, storing the approval or denial, and/or notifying consumer 201 of such approval or denial. Activity 322 can be similar or identical to activity 221 (FIG. 2). By incorporating insight from second financial institution 204 (e.g., the payment likelihood decision determined in activity 318) and/or system 203 (e.g., the decision information generated in activity 315), first financial institution 202 can advantageously make a more informed decision in determining the availability of funds for the payment item and in determining whether to approve or deny the transaction.

In some embodiments, workflow 300 can optionally continue after activity 322 with an activity 323 of first financial institution 202 sending a payment decision message to system 203, and/or system 203 receiving a payment decision message from first financial institution 202. In a number of embodiments, the payment decision message can include information regarding whether first financial institution 202 accepted or denied the transaction. In some embodiments, the payment decision message can be sent from first financial institution 202 in real-time after activity 316 or activity 321 of system 203 receiving the response.

In many embodiments, workflow 300 can continue with an activity 324 of system 203 storing the payment decision message sent from first financial institution 202 in activity 323. The payment decision message can be stored in database 111 (FIG. 1), and can include a timestamp of when the payment decision message was received at system 203.

In some embodiments, workflow 300 can further optionally continue with an activity 325 of system 203 sending a payment decision message to second financial institution 204, and/or second financial institution 204 receiving the payment decision message from system 203. In a number of embodiments, the payment decision message can be sent from system 203 to second financial institution 204 in real-time after activity 323 of system 203 receiving the payment decision message in activity 323. In many embodiments, the payment decision message sent to second financial institution 204 in activity 325 can be similar or identical to the payment decision message received by system 203 in activity 323.

In some embodiments, workflow 300 can further optionally continue with an activity 326 of second financial institution 204 storing the payment decision message sent from system 203 in activity 325. Second financial institution 204 also can store a timestamp of when the payment decision message was received at second financial institution 204.

In various embodiments, the information in the payment decision message sent to system 203 and/or second financial institution 204 from first financial institution 202 can beneficially be used by system 203 and/or second financial institution 204 to determine risks in future transactions. In many embodiments, second financial institution 204 can use the information in the payment decision message to update a pending account status of the payor's account. In some embodiments, workflow 200 (FIG. 2) can similarly include sending a payment decision message to system 203 and/or second financial institution 204 such that activities 323, 324, 325, and 326 also can be part of workflow 200 (FIG. 2) by occurring after activity 221 (FIG. 2).

Figure 4:
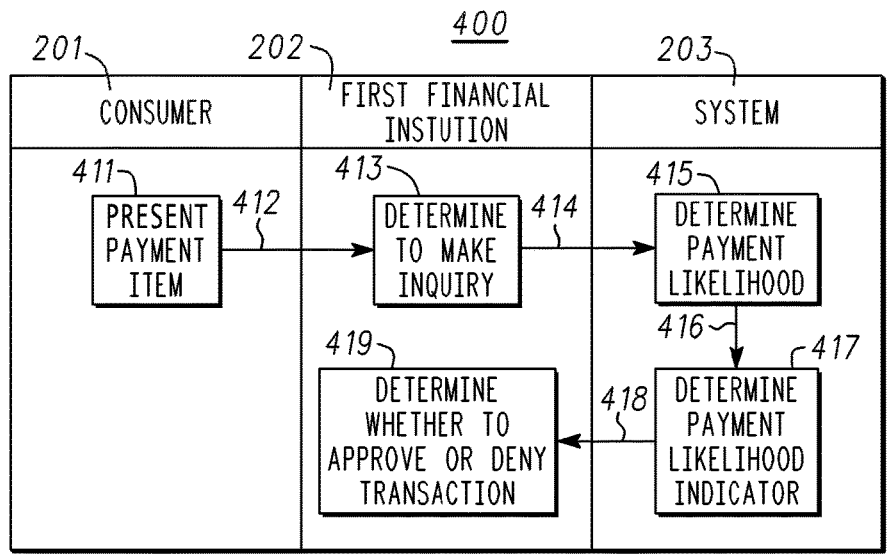
FIG. 4 illustrates an exemplary workflow for real-time determination of funds availability sent from the first financial institution of FIG. 2 to the system of FIG. 2 for determining a payment likelihood, according to various embodiments.

Turning ahead in the drawings, FIG. 4 illustrates an exemplary workflow 400 for real-time determination of funds availability sent from first financial institution 202 to system 203 for determining a payment likelihood, according to various embodiments. Workflow 400 is merely exemplary and is not limited to the embodiments presented herein. Workflow 400 can be employed in many different embodiments or examples not specifically depicted or described herein. In some embodiments, the procedures, the processes, and/or the activities of workflow 400 can be performed in the order presented. In other embodiments, the procedures, the processes, and/or the activities of workflow 400 can be performed in any suitable order. In still other embodiments, one or more of the procedures, the processes, and/or the activities of workflow 400 can be combined or skipped. Workflow 400 can be similar to workflow 200 (FIG. 2) and/or workflow 300 (FIG. 3), and various activities of workflow 400 can be similar or identical to various activity of workflow 200 (FIG. 2) and/or workflow 300 (FIG. 3).

In some embodiments, workflow 400 can begin with an activity 411 of an entity, such as consumer 201, presenting a payment item for a transaction. Activity 411 can be similar or identical to activity 211 (FIG. 2) and/or activity 311 (FIG. 3).

In many embodiments, workflow 400 can continue with an activity 412 of the payment item being received by first financial institution 202. Activity 412 can be similar or identical to activity 212 (FIG. 2) and/or activity 312 (FIG. 3).

In some embodiments, workflow 400 can continue with an activity 413 of determining whether to make an inquiry to system 203 and/or storing the determination. Activity 413 can be similar or identical to activity 213 (FIG. 2) and/or activity 313 (FIG. 3).

In many embodiments, workflow 400 can continue with an activity 414 of first financial institution 202 sending an inquiry to system 203, and/or system 203 receiving the inquiry from first financial institution 202. Activity 414 can be similar or identical to activity 214 (FIG. 2) and/or activity 314 (FIG. 3).

In a number of embodiments, workflow 400 can continue with an activity 415 of system 203 determining a payment likelihood. Activity 415 can be similar to activity 217 (FIG. 2), activity 315 (FIG. 3), and/or activity 318 (FIG. 3). In some embodiments, system 203 can store the inquiry from first financial institution 202 received in activity 414 with or without a timestamp of when the inquiry was received by system 203, and system 203 can store the inquiry and/or timestamp in database 111 (FIG. 1). In a number of embodiments, system 203 can apply one or more of the rules applied in making the routing decision in activity 315 (FIG. 3) to determine a risk of non-payment, and/or system 203 can generate decision information, such as the decision information generated in activity 315 (FIG. 3), by applying the rules. System 203 can determine a payment likelihood based on the decision information and/or through applying rules, such as the common consortium rules used to determine a payment likelihood in activity 217 (FIG. 2) and/or activity 318 (FIG. 3). In some embodiments, a financial institution that is specified in a payment item as responsible for paying the payment item can provide information regularly (e.g., twice daily, hourly, half-hourly, on each transaction, etc.) to system 203 so as to allow system 203 to determine the payment likelihood, rather than the financial institution determining the payment likelihood (as done by second financial institution 204 in activity 217 (FIG. 2) and activity 318 (FIG. 3)). In some embodiments, the financial institution can provide less, as much, or more information to system 203 as is used by second financial institution 204 to determine the payment likelihood in activity 217 (FIG. 2) and/or activity 318 (FIG. 3).

In a number of embodiments, workflow 400 can continue with an activity 416 of system 203 providing the payment likelihood information and/or decision information generated in activity 415 to be stored in system 203.

In several embodiments, workflow 400 can continue with an activity 417 of system 203 storing the payment likelihood information and/or decision information generated in activity 415 with or without a timestamp when the determination was made, in system 203, and system 203 can store the information and/or timestamp in database 111 (FIG. 1).

In many embodiments, workflow 400 can continue with an activity 418 of system 203 sending a response to system first financial institution 202, and/or first financial institution 202 receiving the response from system 203. Activity 417 can be similar to activity 218 (FIG. 2), activity 220 (FIG. 2), activity 319 (FIG. 3), and/or activity 321 (FIG. 3). The response can include the decision information and/or the payment response likelihood information, as determined in activity 415, and/or other risk factors, such as whether the account was recently opened.

In several embodiments, workflow 400 can continue with an activity 419 of first financial institution 202 determining whether to approve or deny the transaction, actually approving or denying the transaction, storing the approval or denial, and/or notifying consumer 201 of such approval or denial. Activity 422 can be similar or identical to activity 221 (FIG. 2) and/or activity 322 (FIG. 3). In some embodiments, workflow 400 can optionally send the payment decision information to system 203, as described in activities 323 and 324 in FIG. 3.

Figure 5:
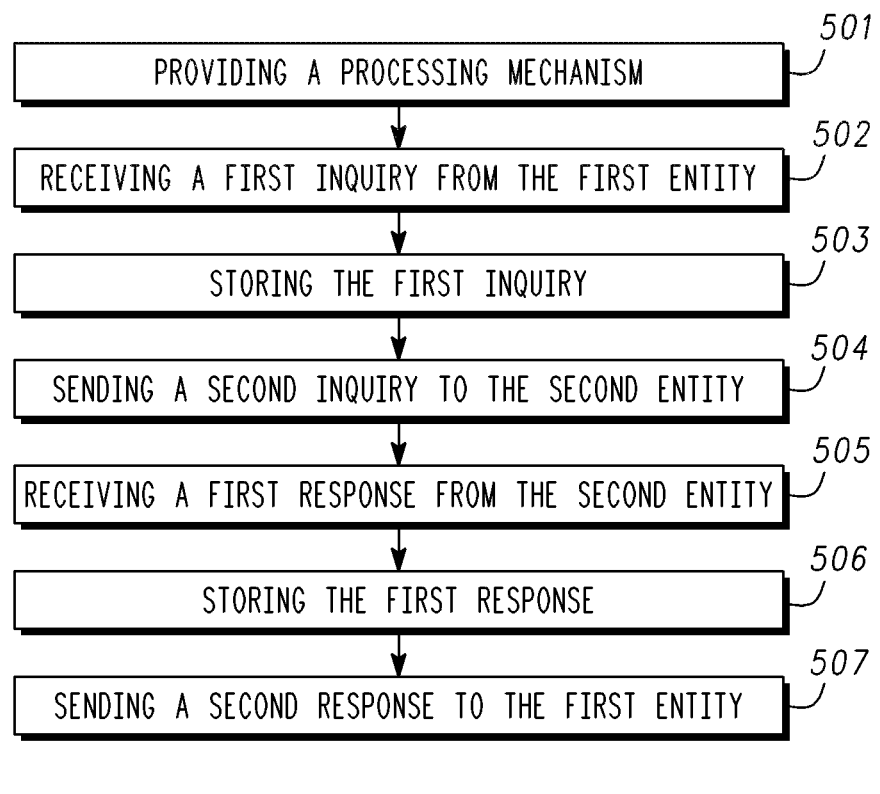
FIG. 5 illustrates an exemplary flow chart for a method to facilitate determining an availability of funds for a payment item, according to an embodiment.

Turning ahead in the drawings, FIG. 5 illustrates a flow chart for a method 500 to facilitate determining an availability of funds for a payment item, according to an embodiment. Method 500 is merely exemplary and is not limited to the embodiments presented herein. Method 500 can be employed in many different embodiments or examples not specifically depicted or described herein. In some embodiments, the procedures, the processes, and/or the activities of method 500 can be performed in the order presented. In other embodiments, the procedures, the processes, and/or the activities of method 500 can be performed in any suitable order. In still other embodiments, one or more of the procedures, the processes, and/or the activities of method 500 can be combined or skipped. Method 500 can be similar or identical to the acts performed by system 203 (FIGS. 2-4) in workflow 200 (FIG. 2). In many embodiments, the payment item can include one of a check or an ACH item.

Referring to FIG. 5, method 500 can include a block 501 of providing a processing mechanism in data communication through a network with a first entity and a plurality of depository financial institutions. The first entity can be similar or identical to first financial institution 202 (FIGS. 2-4). The processing mechanism can be similar or identical to system 110 (FIG. 1) and/or system 203 (FIGS. 2-4). The network can be similar or identical to network 120 (FIG. 1). The depository financial institutions can be similar or identical to financial institutions 131-134 (FIG. 1), first financial institution 202 (FIGS. 2-4), and/or second financial institution 204 (FIGS. 2-3). In some embodiments, the plurality of depository financial institutions can include a second entity. The second entity can be similar or identical to second financial institution 204 (FIGS. 2-3). In some embodiments, the second entity can be specified by the payment item as being responsible for paying the payment item. In many embodiments, the first entity can be different from the second entity. In some embodiments, the payment item can be a check, the first entity can be a depository financial institution receiving the check for deposit, and the second entity can be a depository financial institution against which the check has been drawn. In other embodiments, the payment item can be an ACH item, the first entity can be an originating depository financial institution (ODFI) for the ACH item, and the second entity can be a receiving depository financial institution (RDFI) for the ACH item. In a number of embodiments, the first entity can be a payment processor, and the second entity can be a financial institution.

In many embodiments, method 500 additionally can include a block 502 of receiving a first inquiry at the processing mechanism through the network from the first entity. The first inquiry can be similar or identical to the inquiry sent from first financial institution 202 (FIGS. 2-4) to system 203 (FIGS. 2-4) in activity 214 (FIG. 2). In various embodiments, the first inquiry can be received from the first entity in real-time after the first entity receives the payment item. For example, the first entity can receive the payment item similarly or identically to first financial institution 202 (FIGS. 2-4) receiving the payment item in activity 212 (FIG. 2).

In some embodiments, method 500 further can include a block 503 of storing the first inquiry received from the first entity along with a first timestamp that indicates when the first inquiry was received from the first entity. Block 503 of storing the first inquiry can be similar or identical to activity 215 (FIG. 2) of system 203 (FIGS. 2-4) storing the inquiry sent from first financial institution 202 (FIGS. 2-4).

In many embodiments, method 500 additionally can include a block 504 of sending a second inquiry from the processing mechanism through the network to the second entity in real-time after receiving the first inquiry. The second inquiry can be similar or identical to the inquiry sent from system 203 (FIGS. 2-4) to second financial institution 204 (FIGS. 2-3) in activity 216 (FIG. 2), and block 504 can be similar or identical to activity 216 (FIG. 2). In various embodiments, the second inquiry can be based at least in part on the first inquiry. In some embodiments, the first and/or second inquiries can include a routing number of the second entity that is specified by the payment item; an account number of the account maintained by the second entity that is specified by the payment item; a payment amount that is specified by the payment item; an identifier of the first entity; a transaction channel identifier that indicates the channel through which a transacting entity presented the payment item to the first entity; a payment distribution method identifier that indicates how the transacting entity requested to be paid for the payment item by the first entity; an account number of the first entity associated with the transacting entity; and/or, if the payment item is a check, a serial number of the check. In a number of embodiments, the first inquiry can include an identifier linked to the account maintained by the second entity that is specified by the payment item.

In some embodiments, method 500 further can include a block 505 of receiving a first response at the processing mechanism through the network from the second entity. The first response can be similar or identical to the response sent from second financial institution 204 (FIGS. 2-3) to system 203 (FIGS. 2-4) in activity 218 (FIG. 2), and block 505 can be similar or identical to activity 281 (FIG. 2). In various embodiments, the first response can be sent by the second entity in real-time in response to receiving the second inquiry.

In many embodiments, method 500 additionally can include a block 506 of storing the first response received from the second entity along with a second timestamp that indicates when the first response was received from the second entity. Block 506 of storing the first response can be similar or identical to activity 219 (FIG. 2) of system 203 (FIGS. 2-4) storing the response sent from second financial institution 204 (FIGS. 2-3).

In some embodiments, method 500 further can include a block 507 of sending a second response from the processing mechanism through the network to the first entity in real-time after receiving the first response. The second response can be similar or identical to the response sent from system 203 (FIGS. 2-4) to first financial institution 202 (FIGS. 2-4) in activity 220 (FIG. 2), and block 507 can be similar to activity 220 (FIG. 2). In various embodiments, the second response can be sent within 30 seconds of receiving the first inquiry. In some embodiments, the second response can be based at least in part on the first response. In some embodiments, the first and/or second responses each can include a payment likelihood indicator provided by the second entity that indicates a likelihood of the second entity to pay the payment item. The payment likelihood indicator can be similar or identical to the payment likelihood indicator determined by second financial institution 204 (FIGS. 2-3) in activity 217 (FIG. 2). In various embodiments, the payment likelihood indicator can be based at least in part on a current status and a current available balance of an account maintained by the second entity that is specified by the payment item for payment of the payment item. In a number of embodiments, the payment likelihood indicator in the first and/or second responses can include an indication of whether or not the second entity guarantees payment of the payment item. In many embodiments, the payment likelihood indicator in the first and/or second responses can include a score. The score can be similar or identical to the payment likelihood score determined by second financial institution 204 (FIGS. 2-3) in activity 217 (FIG. 2). In various embodiments, the first and/or second responses each can further include one or more reason indicators to explain the payment likelihood indicator provided by the second entity. The reason indicators can be similar or identical to the reason indicators determined by second financial institution 204 (FIGS. 2-3) in activity 217 (FIG. 2).

Figure 6:
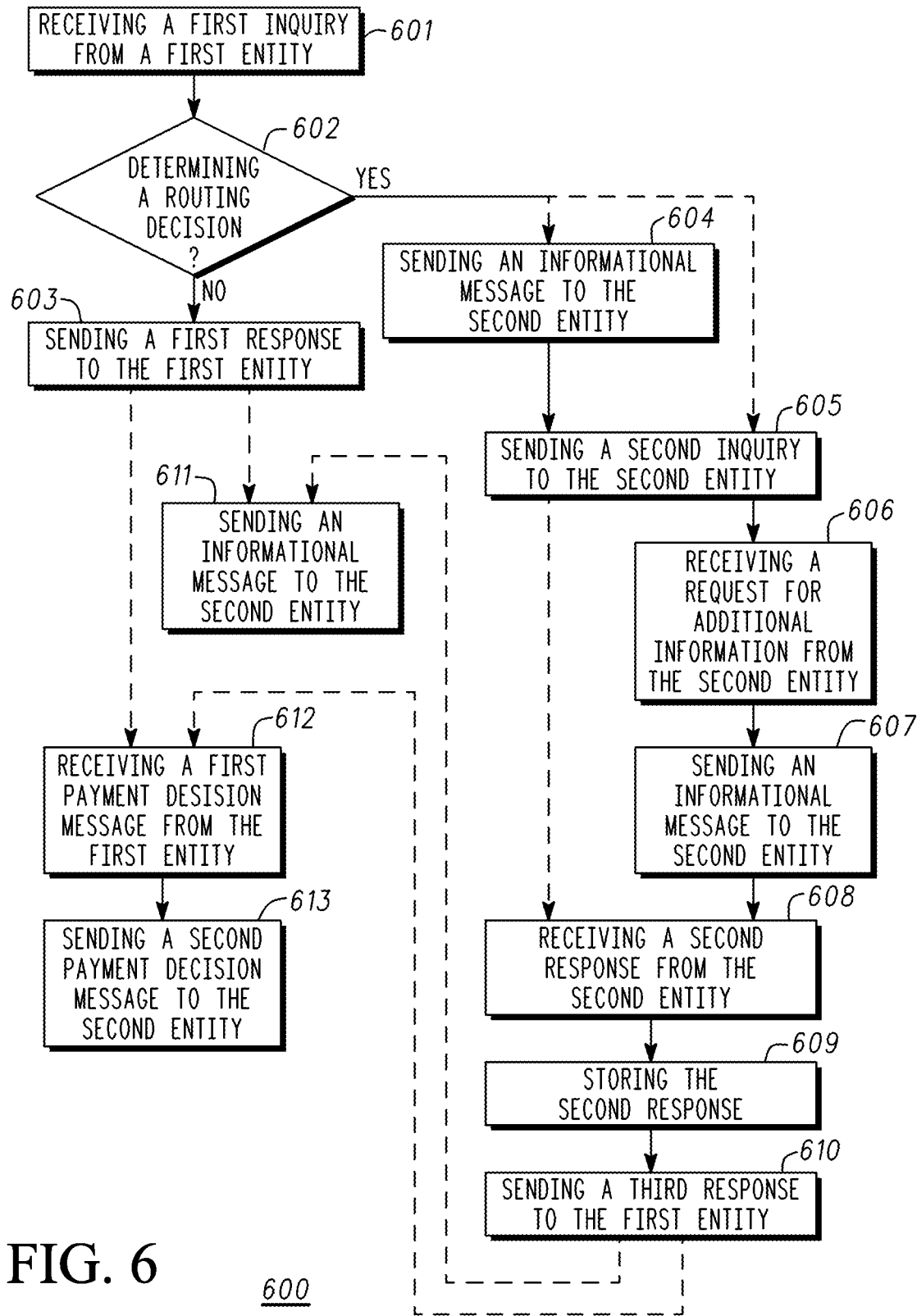
FIG. 6 illustrates an exemplary flow chart for a method to facilitate determining an availability of funds for a payment item, according to an embodiment.

Turning ahead in the drawings, FIG. 6 illustrates a flow chart for a method 600 to facilitate determining an availability of funds for a payment item, according to an embodiment. Method 600 is merely exemplary and is not limited to the embodiments presented herein. Method 600 can be employed in many different embodiments or examples not specifically depicted or described herein. In some embodiments, the procedures, the processes, and/or the activities of method 600 can be performed in the order presented. In other embodiments, the procedures, the processes, and/or the activities of method 600 can be performed in any suitable order. In still other embodiments, one or more of the procedures, the processes, and/or the activities of method 600 can be combined or skipped. Method 600 can be similar or identical to the acts performed by system 203 (FIGS. 2-4) in workflow 300 (FIG. 3). In many embodiments, the payment item can include one of a check or an ACH item.

Referring to FIG. 6, method 600 can include a block 601 of receiving a first inquiry through a network from a first entity. The first entity can be similar or identical to first financial institution 202 (FIGS. 2-4). The network can be similar or identical to network 120 (FIG. 1). The first inquiry can be similar or identical to the inquiry sent from first financial institution 202 (FIGS. 2-4) to system 203 (FIGS. 2-4) in activity 314 (FIG. 3), and block 610 can be similar or identical to activity 315 (FIG. 3). In a number of embodiments, the first inquiry can be received from the first entity in real-time after the first entity receives the payment item. For example, the first entity can receive the payment item similarly or identical to first financial institution 202 (FIGS. 2-4) receiving the payment item in activity 312 (FIG. 3).

In many embodiments, method 600 additionally can include a block 602 of determining a routing decision of whether or not to route the first inquiry to a second entity. Block 602 of determining the routing decision can be similar or identical to activity 315 (FIG. 3) of system 203 (FIGS. 2-4) determining whether to route the inquiry to second financial institution 204 (FIGS. 2-3). The second entity can be similar or identical to second financial institution 204 (FIGS. 2-3). In many embodiments, the first entity can be different from the second entity. In various embodiments, the second entity can be a depository financial institution that is specified by the payment item as responsible for paying the payment item. In a number of embodiments, the routing decision can be based at least in part on a risk of non-payment of the payment item by the second entity. In some embodiments, the payment item can be a check, the first entity can be a depository financial institution receiving the check for deposit, and the second entity can be a depository financial institution against which the check has been drawn. In other embodiments, the payment item can be an ACH item, the first entity can be an originating depository financial institution (ODFI) for the ACH item, and the second entity can be a receiving depository financial institution (RDFI) for the ACH item.

In several embodiments, determining the routing decision can include determining the routing decision based at least on part on account data received from a plurality of financial institutions for accounts maintained by the financial institutions. The financial institutions can be similar or identical to financial institutions 131-134 (FIG. 1), first financial institution 202 (FIGS. 2-4), and/or second financial institution 204 (FIGS. 2-3). In various embodiments, the account data can be received before receiving the first inquiry. In many embodiments, the plurality of financial institutions can include the second entity. In some embodiments, the payment item can specify for payment a first account of the accounts. In a number of embodiments, the first account can be maintained by the second entity. In some embodiments, the account data can include first account data for the first account.

In various embodiments, determining the routing decision further can include determining the routing decision such that the routing decision is to not route the first inquiry to the second entity when it is determined, based on the first account data, that the first account is not valid. In many embodiments, determining the routing decision further can include determining the routing decision such that the routing decision is to not route the first inquiry to the second entity when it is determined, based on the first account data, that the first account has been closed for a predetermined amount of time. In a number of embodiments, determining the routing decision further can include determining the routing decision such that the routing decision is to not route the first inquiry to the second entity when the payment item comprises an ACH item and it is determined, based on the first account data, that the first account has a post no debits status. In some embodiments, determining the routing decision further can include determining the routing decision such that the routing decision is to not route the first inquiry to the second entity when the payment item comprises a check and it is determined, based on the first account data, that the first account has a stop payment on the check. In several embodiments, determining the routing decision further can include determining the routing decision such that the routing decision is to not route the first inquiry to the second entity when the payment item comprises a check and it is determined, based on the first account data, the first account uses positive pay verification. In various embodiments, determining the routing decision further can include determining the routing decision such that the routing decision is to not route the first inquiry to the second entity when it is determined, based on the first account data, the payment item is likely a duplicate. In many embodiments, determining the routing decision further can include determining the routing decision such that the routing decision is to not route the first inquiry to the second entity when, based on the first account data, a payment amount of payment item is determined to be below a predetermined threshold amount.

In some embodiments, method 600 further can include, if the routing decision is to not route the first inquiry to the second entity, a block 603 of sending a first response through the network to the first entity in real-time after receiving the first inquiry. Block 603 can be similar or identical to activity 316 (FIG. 3), and the first response can be similar or identical to the response sent from system 203 (FIGS. 2-4) to first financial institution 202 (FIGS. 2-4) in activity 316 (FIG. 3). In some embodiments, sending the first response to the first entity can include sending the first response such that the first response includes information derived in determining the routing decision. For example, the information can be similar or identical to the decision information generated by system 203 (FIGS. 2-4) in activity 315 (FIG. 3).

In certain embodiments, method 600 can optionally include, if the routing decision is to route the first inquiry to the second entity, a block 604 of sending an informational message through the network to the second entity in real-time after receiving the first inquiry. In some embodiments, the informational message can include information derived from determining the routing decision. For example, the information can be similar or identical to the decision information generated by system 203 (FIGS. 2-4) in activity 315 (FIG. 3), and block 604 can be similar or identical to activity 317 (FIG. 3).

In many embodiments, method 600 additionally can include, if the routing decision is to route the first inquiry to the second entity, after block 602 or block 604, a block 605 of sending a second inquiry through the network to the second entity in real-time after receiving the first inquiry. The second inquiry can be similar or identical to the inquiry sent from system 203 (FIGS. 2-4) to second financial institution 204 (FIGS. 2-3) in activity 317 (FIG. 3), and block 605 can be similar to activity 317 (FIG. 3). In various embodiments, the second inquiry can be based at least in part on the first inquiry. In some embodiments, the first and/or second inquiries can include a routing number of the second entity that is specified by the payment item; an account number of the second entity that is specified by the payment item; a payment amount that is specified by the payment item; an identifier of the first entity; a transaction channel identifier that indicates the channel through which a transacting entity presented the payment item to the first entity; a payment distribution method identifier that indicates how the transacting entity requested to be paid for the payment item by the first entity; an account number of the first entity associated with the transacting entity; and/or, if the payment item is a check, a serial number of the check. In some embodiments, sending the second inquiry to the second entity can include sending the second inquiry such that the second inquiry further includes information derived from determining the routing decision. For example, the information can be similar or identical to the decision information generated by system 203 (FIGS. 2-4) in activity 315 (FIG. 3).

In certain embodiments, method 600 can optionally include, such as in some embodiments when block 604 was skipped, a block 606 of receiving a request for additional information through the network from the second entity.

In certain embodiments, method 600 can further optionally include, after block 606, a block 607 of sending an informational message through the network to the second entity in real-time after receiving the request for additional information. The informational message can include information derived from determining the routing decision. For example, the information can be similar or identical to the decision information generated by system 203 (FIGS. 2-4) in activity 315 (FIG. 3). Blocks 606 and 607 can be similar to activity 317 (FIG. 3).

In many embodiments, method 600 additionally can include, after block 605 or block 607, a block 608 of receiving a second response through the network from the second entity. The first response can be similar or identical to the response sent from second financial institution 204 (FIGS. 2-3) to system 203 (FIGS. 2-4) in activity 319 (FIG. 3), and block 608 can be similar or identical to activity 319 (FIG. 3). In various embodiments, the first response can be sent by the second entity in real-time in response to receiving the second inquiry.

In some embodiments, method 600 further can include a block 609 of storing the second response received from the second entity along with a timestamp that indicates when the second response was received from the second entity. Block 609 of storing the second response can be similar or identical to activity 320 (FIG. 3) of system 203 (FIGS. 2-4) storing the response sent from second financial institution 204 (FIGS. 2-3).

In many embodiments, method 600 additionally can include a block 610 of sending a third response through the network to the first entity in real-time after receiving the second response. The third response can be similar or identical to the response sent from system 203 (FIGS. 2-4) to first financial institution 202 (FIGS. 2-4) in activity 321 (FIG. 3), and block 610 can be similar or identical to activity 321 (FIG. 3). In various embodiments, the third response can be based at least in part on the second response. In some embodiments, the second and/or third responses can include a payment likelihood indicator provided by the second entity that indicates a likelihood of the second entity to pay the payment item. The payment likelihood indicator can be similar or identical to the payment likelihood indicator determined by second financial institution 204 (FIGS. 2-3) in activity 318 (FIG. 3). In various embodiments, the payment likelihood indicator can be based at least in part on a current status and a current available balance of an account maintained by the second entity that is specified by the payment item for payment of the payment item. In some embodiments, the one or more processing modules (e.g., system 203 (FIGS. 2-4) can be in data communication through the network with a plurality of financial institutions that have each agreed to apply common standards for determining the payment likelihood indicator. The financial institutions can be similar or identical to financial institutions 131-134 (FIG. 1), first financial institution 202 (FIGS. 2-4), and/or second financial institution 204 (FIGS. 2-3). The common standards can be similar or identical to the common consortium rules described above in connection with activity 318 (FIG. 3). In several embodiments, the second entity can be any one of the plurality of financial institutions, as specified by the payment item. In some embodiments, sending the third response to the first entity can include sending the third response such that the third response further includes information derived from determining the routing decision. For example, the information can be similar or identical to the decision information generated by system 203 (FIGS. 2-4) in activity 315 (FIG. 3).

In a number of embodiments, the payment likelihood indicator in the second and/or third responses can include an indication of whether or not the second entity guarantees payment of the payment item. In many embodiments, the payment likelihood indicator in the second and/or third responses can include a score. The score can be similar or identical to the payment likelihood score determined by second financial institution 204 (FIGS. 2-3) in activity 217 (FIG. 2). In various embodiments, the second and/or third responses each can further include one or more reason indicators to explain the payment likelihood indicator provided by the second entity. The reason indicators can be similar or identical to the reason indicators determined by second financial institution 204 (FIGS. 2-3) in activity 217 (FIG. 2). In various embodiments, one of the first response or the third response can be sent within 30 seconds of receiving the first inquiry.

In certain embodiments, method 600 optionally can include, after block 603 or block 610, a block 611 of sending an informational message through the network to the second entity including information derived from determining the routing decision. For example, the information can be similar or identical to the decision information generated by system 203 (FIGS. 2-4) in activity 315 (FIG. 3).

In certain embodiments, method 600 optionally can include, after block 603 or block 610, a block 612 of receiving a first payment decision message through the network from the first entity that indicates whether the first entity paid the payment item. For example, the first payment decision message can be similar to the payment decision message received by system 203 (FIGS. 2-4) in activity 323 (FIG. 3), and block 612 can be similar or identical to activity 323 (FIG. 3).

In certain embodiments, method 600 can include, after block 612, a block 613 of sending a second payment decision message through the network to the second entity, the second payment decision message being based at least in part on the first payment decision message. For example, the second payment decision message can be similar to the payment decision message sent by system 203 (FIGS. 2-4) in activity 325 (FIG. 3), and block 613 can be similar or identical to activity 325 (FIG. 3). In many embodiments, sending the second payment decision message to the second entity can include sending the second payment message such that the second payment message further includes information derived from determining the routing decision. For example, the information can be similar or identical to the decision information generated by system 203 (FIGS. 2-4) in activity 315 (FIG. 3).

Figure 7:
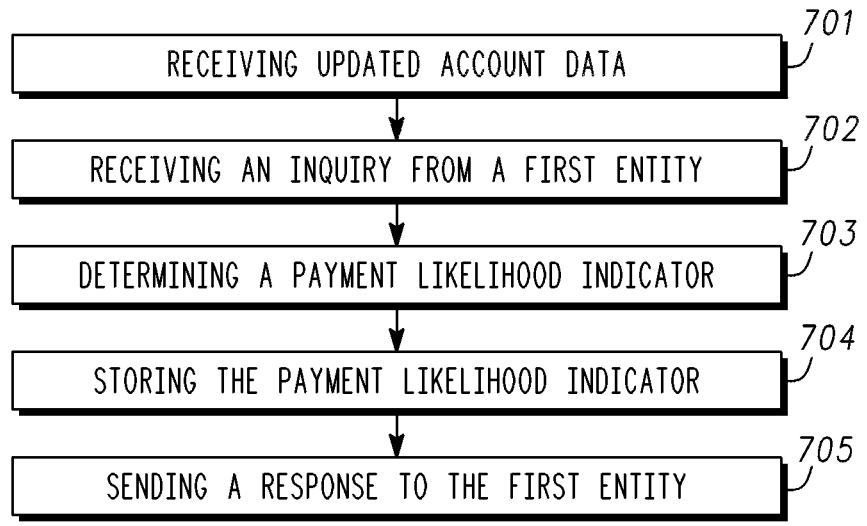
FIG. 7 illustrates an exemplary flow chart for a method to facilitate determining an availability of funds for a payment item, according to an embodiment.

Turning ahead in the drawings, FIG. 7 illustrates a flow chart for a method 700 to facilitate determining an availability of funds for a payment item, according to an embodiment. Method 700 is merely exemplary and is not limited to the embodiments presented herein. Method 700 can be employed in many different embodiments or examples not specifically depicted or described herein. In some embodiments, the procedures, the processes, and/or the activities of method 700 can be performed in the order presented. In other embodiments, the procedures, the processes, and/or the activities of method 700 can be performed in any suitable order. In still other embodiments, one or more of the procedures, the processes, and/or the activities of method 700 can be combined or skipped. Method 700 can be similar or identical to the acts performed by system 203 (FIGS. 2-4) in workflow 400 (FIG. 5). In many embodiments, the payment item can include one of a check or an ACH item.

Referring to FIG. 7, method 700 can include a block 701 of receiving at least hourly updated account data comprising current statuses and current available balances of accounts maintained by one or more depository financial institutions. The financial institutions can be similar or identical to financial institutions 131-134 (FIG. 1), first financial institution 202 (FIGS. 2-4), and/or second financial institution 204 (FIGS. 2-3).

In many embodiments, method 700 additionally can include a block 702 of receiving an inquiry through a network from a first entity. The first entity can be similar or identical to first financial institution 202 (FIGS. 2-4). The network can be similar or identical to network 120 (FIG. 1). The inquiry can be similar or identical to the inquiry sent from first financial institution 202 (FIGS. 2-4) to system 203 (FIGS. 2-4) in activity 414 (FIG. 4), and block 702 can be similar or identical to activity 414 (FIG. 4). In a number of embodiments, the inquiry can be received from the first entity in real-time after the first entity receives the payment item. For example, the first entity can receive the payment item similarly or identical to first financial institution 202 (FIGS. 2-4) receiving the payment item in activity 412 (FIG. 3). In various embodiments, the payment item can specify a second entity as responsible for paying the payment item. The second entity can be similar or identical to second financial institution 204 (FIGS. 2-3). In many embodiments, the first entity can be different from the second entity. In some embodiments, the payment item can specify an account maintained by the second entity for payment of the payment item. In a number of embodiments, one of the one or more depository financial institutions can include the second entity.

In a number of embodiments, the payment item can be a check, the first entity can be a depository financial institution receiving the check for deposit, and the second entity can be a depository financial institution against which the check has been drawn. In other embodiments, the payment item can be an ACH item, the first entity can be an originating depository financial institution (ODFI) for the ACH item, and the second entity can be a receiving depository financial institution (RDFI) for the ACH item. In several embodiments, the inquiry can include a routing number of the second entity that is specified by the payment item; an account number maintained by the second entity that is specified by the payment item; a payment amount that is specified by the payment item; an identifier of the first entity; a transaction channel identifier that indicates the channel through which a transacting entity presented the payment item to the first entity; a payment distribution method identifier that indicates how the transacting entity requested to be paid for the payment item by the first entity; an account number of the first entity associated with the transacting entity; and/or, if the payment item is a check, a serial number of the check.

In some embodiments, method 700 further can include a block 703 of determining a payment likelihood indicator based at least in part on a status and an available balance of the account as updated by the updated account data. The payment likelihood indicator can be similar or identical to the payment likelihood indicator determined by second financial institution 204 (FIGS. 2-3) in activity 415 (FIG. 4), and block 703 can be similar to activity 415 (FIG. 4).

In many embodiments, method 700 additionally can include a block 704 of storing the payment likelihood indicator. For example, block 704 of storing the payment likelihood indicator can be similar or identical to activity 417 (FIG. 4) of system 203 (FIGS. 2-4) storing the payment likelihood indicator.

In some embodiments, method 700 further can include a block 705 of sending a response through the network to the first entity in real-time after receiving the inquiry. The response can be similar or identical to the response sent from system 203 (FIGS. 2-4) to first financial institution 202 (FIGS. 2-4) in activity 418 (FIG. 4), and block 705 can be similar or identical to activity 418 (FIG. 4). In a number of embodiments, the response can include the payment likelihood indicator.

In various embodiments, the payment likelihood indicator can indicate a likelihood of the second entity to pay the payment item. In a number of embodiments, the payment likelihood indicator in the response can include an indication of whether or not the second entity guarantees payment of the payment item. In many embodiments, the payment likelihood indicator in the response can include a score. The score can be similar or identical to the payment likelihood score determined by system 203 (FIGS. 2-4) in activity 415 (FIG. 4). In various embodiments, the response can further include one or more reason indicators to explain the payment likelihood indicator. The reason indicators can be similar or identical to the reason indicators determined by system 203 (FIGS. 2-3) in activity 415 (FIG. 4). In various embodiments, the response can be sent within 30 seconds of receiving the inquiry.

Returning to FIG. 1, as described above, system 110 can include one or more modules, such as communications module 112, data module 113, risk engine 114, and/or likelihood calculation engine 115. System 110 and the modules therein are merely exemplary and are not limited to the embodiments presented herein. System 110 can be employed in many different embodiments or examples not specifically depicted or described herein. In some embodiments, certain elements or modules of system 110 can perform various procedures, processes, and/or acts. In other embodiments, the procedures, processes, and/or acts can be performed by other suitable elements or modules.

In many embodiments, communications module 112 can at least partially perform block 502 (FIG. 5) of receiving a first inquiry at the processing mechanism through the network from the first entity, block 504 (FIG. 5) of sending a second inquiry from the processing mechanism through the network to the second entity in real-time after receiving the first inquiry, block 505 (FIG. 5) of receiving a first response at the processing mechanism through the network from the second entity, block 507 (FIG. 5) of sending a second response from the processing mechanism through the network to the first entity in real-time after receiving the first response, block 601 (FIG. 6) of receiving a first inquiry through a network from a first entity, block 603 (FIG. 6) of sending a first response through the network to the first entity in real-time after receiving the first inquiry, block 604 (FIG. 6) of sending an informational message through the network to the second entity in real-time after receiving the first inquiry, block 605 (FIG. 6) of sending a second inquiry through the network to the second entity in real-time after receiving the first inquiry, block 606 (FIG. 6) of receiving a request for additional information through the network from the second entity, block 607 (FIG. 6) of sending an informational message through the network to the second entity in real-time after receiving the request for additional information, block 608 (FIG. 6) of receiving a second response through the network from the second entity, block 610 (FIG. 6) of sending a third response through the network to the first entity in real-time after receiving the second response, block 611 (FIG. 6) of sending an informational message through the network to the second entity including information derived from determining the routing decision, block 612 (FIG. 6) of receiving a first payment decision message through the network from the first entity that indicates whether the first entity paid the payment item, block 613 (FIG. 6) of sending a second payment decision message through the network to the second entity, block 701 (FIG. 7) of receiving at least hourly updated account data comprising current statuses and current available balances of accounts maintained by one or more depository financial institutions, block 702 (FIG. 7) of receiving an inquiry through a network from a first entity, and/or block 705 (FIG. 7) of sending a response through the network to the first entity in real-time after receiving the inquiry.

In several embodiments, data module 113 can at least partially perform block 503 (FIG. 5) of storing the first inquiry received from the first entity along with a first timestamp that indicates when the first inquiry was received from the first entity, block 506 (FIG. 5) of storing the first response received from the second entity along with a second timestamp that indicates when the first response was received from the second entity, block 609 (FIG. 6) of storing the second response received from the second entity along with a timestamp that indicates when the second response was received from the second entity, and/or block 704 (FIG. 7) of storing the payment likelihood indicator. In some embodiments, module 113 also can perform portions of block 602 (FIG. 6) and block 703 (FIG. 7).

In many embodiments, risk engine 114 can at least partially perform block 602 (FIG. 6) of determining a routing decision of whether or not to route the first inquiry to a second entity. Furthermore, as explained above for activity 320 (FIG. 3), some embodiments of risk engine 114 also can at least partially perform block 609 (FIG. 6) when block 320 (FIG. 3) refines or further determines the payment likelihood after receiving the originally determined payment likelihood from the second financial institution.

In several embodiments, likelihood calculation engine 115 can at least partially perform block 703 (FIG. 7) of determining a payment likelihood indicator based at least in part on a status and an available balance of the account as updated by the updated account data In various embodiments, the techniques described herein can beneficially connect in real-time a depository bank, an originator, or a payment acceptor with information from the paying bank about a payment item in order to deliver more intelligence as to the likelihood that the payment item will pay. These techniques can advantageously provide the paying bank with insight as to check and/or ACH items that will clear in the near term. In many embodiments, the techniques described herein can allow financial institutions to connect to a single entity (e.g., server 110 (FIG. 1) or server 203 (FIGS. 2-4) to connect to multiple financial institutions for query and responses, and/or to access fraud-prevention services.

Figure 9:
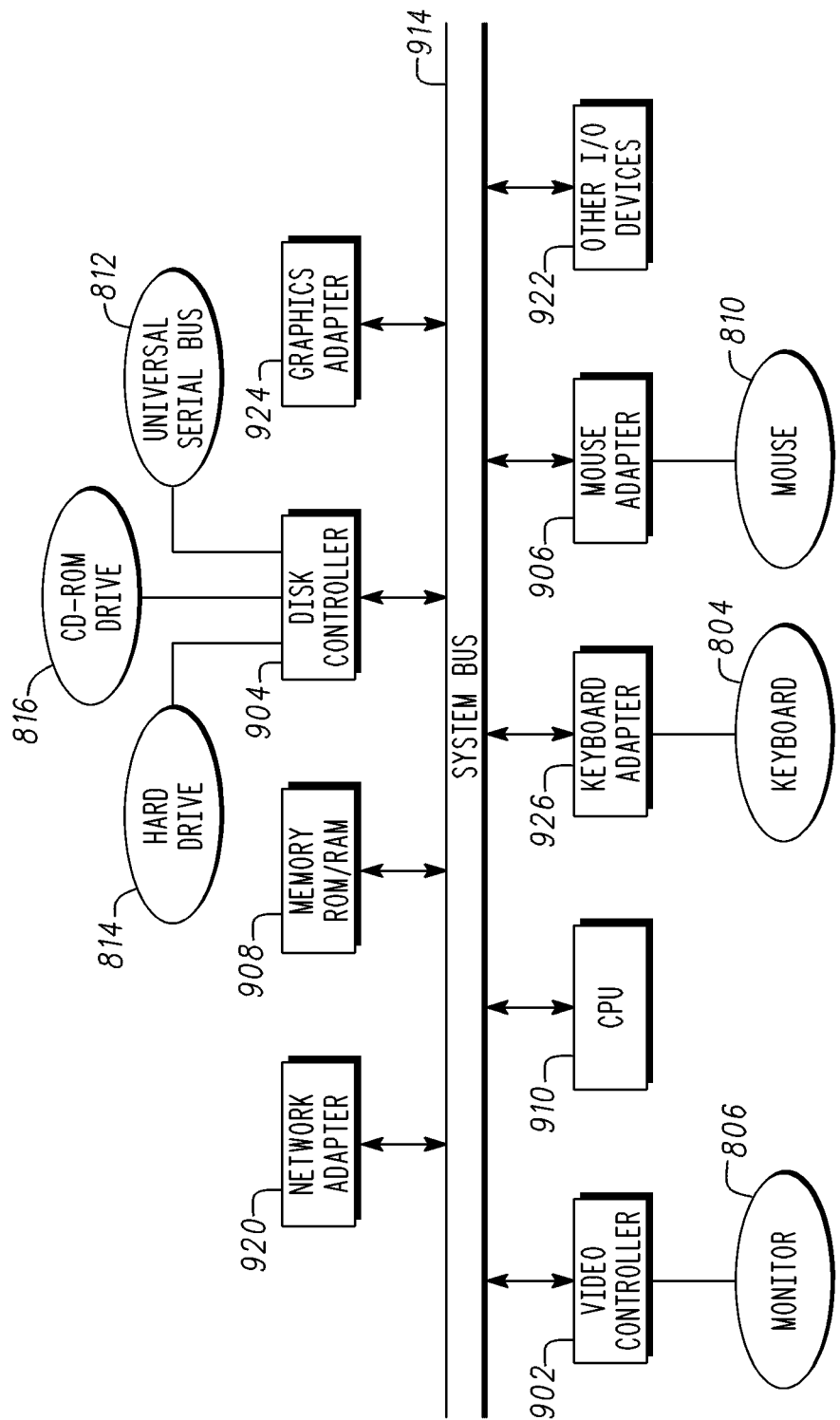
FIG. 9 illustrates a representative block diagram of an example of elements included in circuit boards inside a chassis of the computer of FIG. 8.
Figure 26:
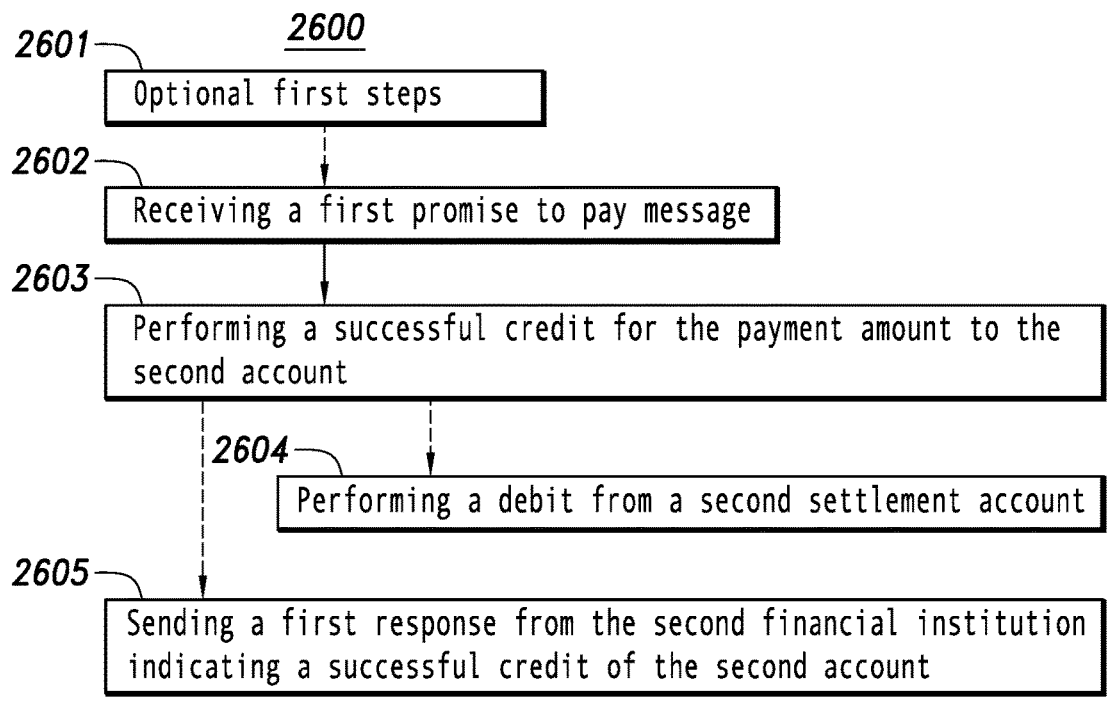
FIG. 26 illustrates a flow chart for a method to facilitate a real-time funds availability bill-pay transaction, according to another embodiment.
Figure 27:
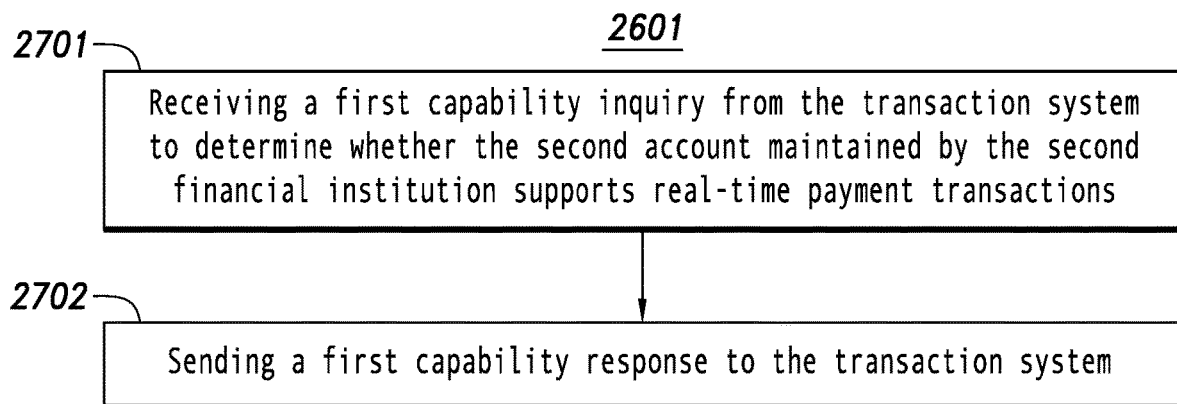
FIG. 27 illustrates a block of optional first steps, according to the embodiment of FIG. 26.

Turning ahead in the drawings, FIG. 8 illustrates a computer 800, all of which or a portion of which can be suitable for implementing an embodiment of at least a portion of system 110 (FIG. 1), system 203 (FIGS. 2-4), system 1000 (FIGS. 10-11), system 1200 (FIG. 12); system 1300 (FIGS. 13-14), system 1500 (FIGS. 15-16), system 1700 (FIG. 17), transaction system 1050 (FIGS. 10-17, 28), sending participant (FIGS. 10-17, 28), receiving participant (FIGS. 10-17, 28), application service provider 1030 (FIGS. 10-12), application service provider 1330 (FIGS. 13-14), application service provider 1530 (FIGS. 15-17), and/or application service provider 2830 (FIG. 28), and/or the techniques described in workflow 200 (FIG. 2), workflow 300 (FIG. 3), workflow 400 (FIG. 4), method 500 (FIG. 5), method 600 (FIG. 6), method 700 (FIG. 7), method 1800 (FIG. 18), block 1801 (FIG. 19), block 1802 (FIG. 20), method 2100 (FIG. 21), method 2200 (FIG. 22), block 2201 (FIG. 23), method 2400 (FIG. 24), block 2401 (FIG. 25), method 2600 (FIG. 26), and/or block 2601 (FIG. 27). Computer 800 includes a chassis 802 containing one or more circuit boards (not shown), a USB (universal serial bus) port 812, a Compact Disc Read-Only Memory (CD-ROM) and/or Digital Video Disc (DVD) drive 816, and a hard drive 814. A representative block diagram of the elements included on the circuit boards inside chassis 802 is shown in FIG. 9. A central processing unit (CPU) 910 in FIG. 9 is coupled to a system bus 914 in FIG. 9. In various embodiments, the architecture of CPU 910 can be compliant with any of a variety of commercially distributed architecture families.

Continuing with FIG. 9, system bus 914 also is coupled to memory 908 that includes both read only memory (ROM) and random access memory (RAM). Non-volatile portions of memory storage unit 908 or the ROM can be encoded with a boot code sequence suitable for restoring computer 800 (FIG. 8) to a functional state after a system reset. In addition, memory 908 can include microcode such as a Basic Input-Output System (BIOS). In some examples, the one or more memory storage units of the various embodiments disclosed herein can comprise memory storage unit 908, a USB-equipped electronic device, such as, an external memory storage unit (not shown) coupled to universal serial bus (USB) port 812 (FIGS. 8-9), hard drive 814 (FIGS. 8-9), and/or CD-ROM or DVD drive 816 (FIGS. 8-9). In the same or different examples, the one or more memory storage units of the various embodiments disclosed herein can comprise an operating system, which can be a software program that manages the hardware and software resources of a computer and/or a computer network. The operating system can perform basic tasks such as, for example, controlling and allocating memory, prioritizing the processing of instructions, controlling input and output devices, facilitating networking, and managing files. Some examples of common operating systems can comprise Microsoft® Windows® operating system (OS), Mac® OS, UNIX® OS, and Linux® OS.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processors of the various embodiments disclosed herein can comprise CPU 910.

In the depicted embodiment of FIG. 9, various I/O devices such as a disk controller 904, a graphics adapter 924, a video controller 902, a keyboard adapter 926, a mouse adapter 906, a network adapter 920, and other I/O devices 922 can be coupled to system bus 914. Keyboard adapter 926 and mouse adapter 906 are coupled to a keyboard 804 (FIGS. 8 and 9) and a mouse 810 (FIGS. 8 and 9), respectively, of computer 800 (FIG. 8). While graphics adapter 924 and video controller 902 are indicated as distinct units in FIG. 9, video controller 902 can be integrated into graphics adapter 924, or vice versa in other embodiments. Video controller 902 is suitable for refreshing a monitor 806 (FIGS. 8 and 9) to display images on a screen 808 (FIG. 8) of computer 800 (FIG. 8). Disk controller 904 can control hard drive 814 (FIGS. 8 and 9), USB port 812 (FIGS. 8 and 9), and CD-ROM or DVD drive 816 (FIGS. 8 and 9). In other embodiments, distinct units can be used to control each of these devices separately.

In some embodiments, network adapter 920 can comprise and/or be implemented as a WNIC (wireless network interface controller) card (not shown) plugged or coupled to an expansion port (not shown) in computer system 800 (FIG. 8). In other embodiments, the WNIC card can be a wireless network card built into computer system 800 (FIG. 8). A wireless network adapter can be built into computer system 800 (FIG. 8) by having wireless communication capabilities integrated into the motherboard chipset (not shown), or implemented via one or more dedicated wireless communication chips (not shown), connected through a PCI (peripheral component interconnector) or a PCI express bus of computer system 800 (FIG. 8) or USB port 812 (FIG. 8). In other embodiments, network adapter 920 can comprise and/or be implemented as a wired network interface controller card (not shown).

Although many other components of computer 800 (FIG. 8) are not shown, such components and their interconnection are well known to those of ordinary skill in the art. Accordingly, further details concerning the construction and composition of computer 800 and the circuit boards inside chassis 802 (FIG. 8) need not be discussed herein.

When computer 800 in FIG. 8 is running, program instructions stored on a USB drive in USB port 812, on a CD-ROM or DVD in CD-ROM and/or DVD drive 816, on hard drive 814, or in memory 908 (FIG. 9) are executed by CPU 910 (FIG. 9). A portion of the program instructions, stored on these devices, can be suitable for carrying out all or at least part of the techniques described herein.

Although computer system 800 is illustrated as a desktop computer in FIG. 8, there can be examples where computer system 800 may take a different form factor while still having functional elements similar to those described for computer system 800. In some embodiments, computer system 800 may comprise a single computer, a single server, or a cluster or collection of computers or servers, or a cloud of computers or servers. Typically, a cluster or collection of servers can be used when the demand on computer system 800 exceeds the reasonable capability of a single server or computer. In certain embodiments, computer system 800 may comprise a portable computer, such as a laptop computer. In certain other embodiments, computer system 800 may comprise a mobile device, such as a smartphone. In certain additional embodiments, computer system 800 may comprise an embedded system.

In many embodiments, after a biller sends a bill to a customer, the customer can send a payment to the biller such that the biller can have real-time availability of funds.

Various embodiments of a system for payment with real-time funds availability can include a payor (also referred to as a sender or the customer), an application service provider, a sending participant, and application sponsor, a transaction system, a receiving participant, the biller (also referred to as a recipient), and/or other suitable elements, as shown in one or more of FIGS. 10-17 and described below. In many embodiments, the transaction system can provide for real-time communication between financial institutions to facilitate real-time funds availability in payment transactions. The transaction system can be similar to system 110 (FIG. 1) or system 203 (FIGS. 2-4). The payment and payment transactions can be to pay one or more bills and/or other financial obligations.

Figure 10:
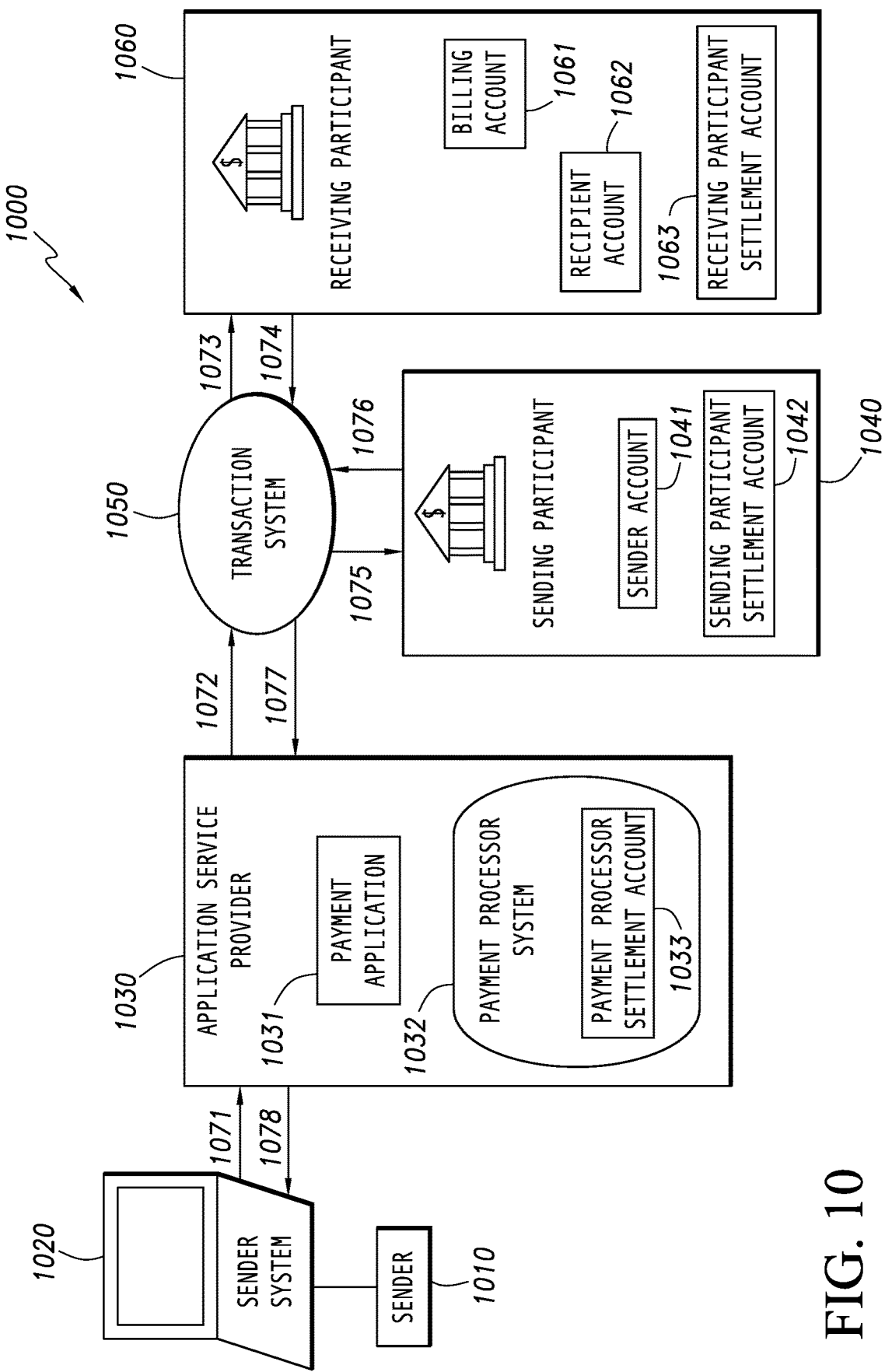
FIG. 10 illustrates a block diagram of a system in which an application service provider is in data communication with a transaction system, and showing messages for an "is account real-time capable call," according to an embodiment.
Figure 11:
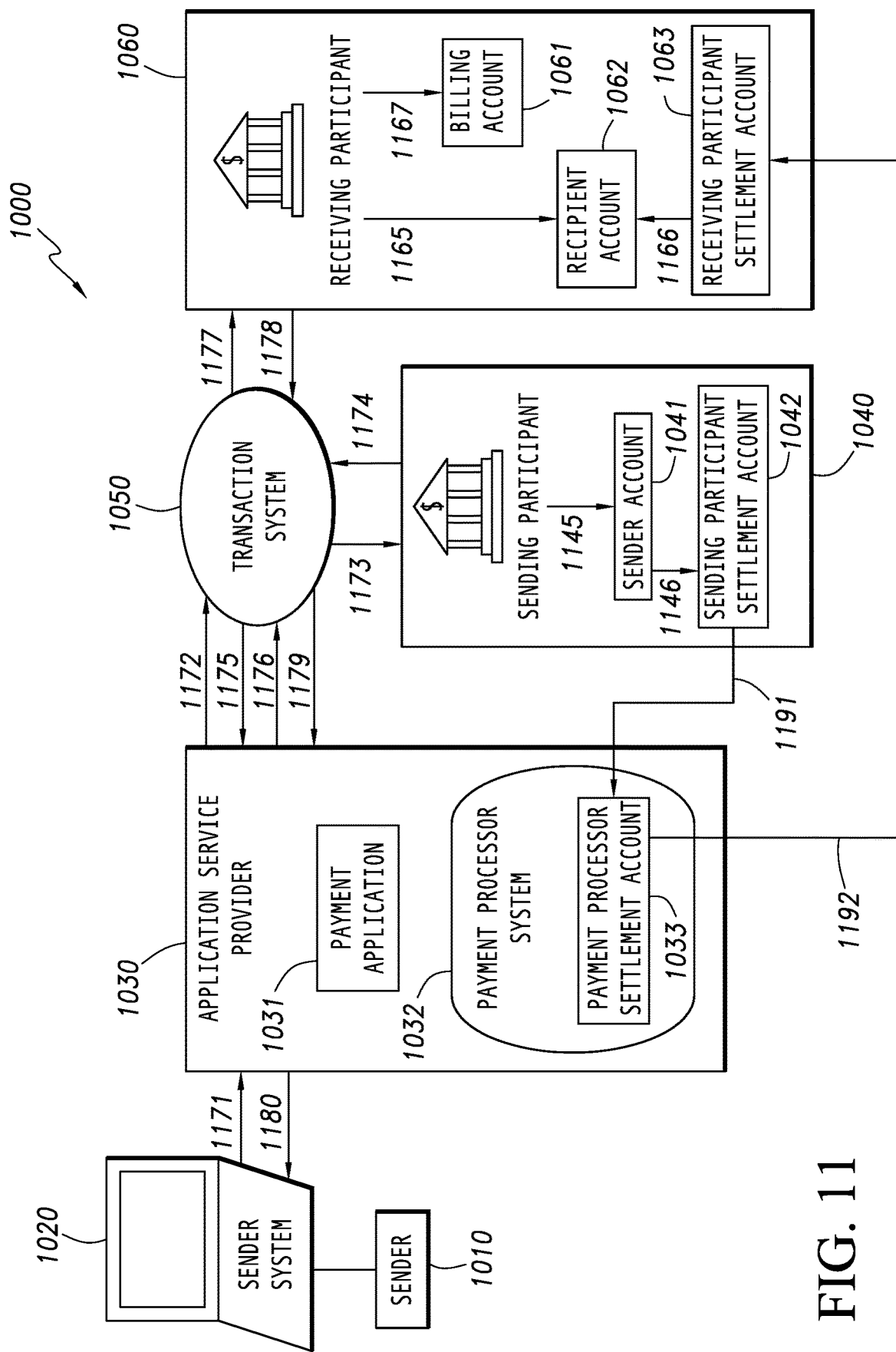
FIG. 11 illustrates a block diagram of the system of FIG. 10, showing payment messages.
Figure 12:
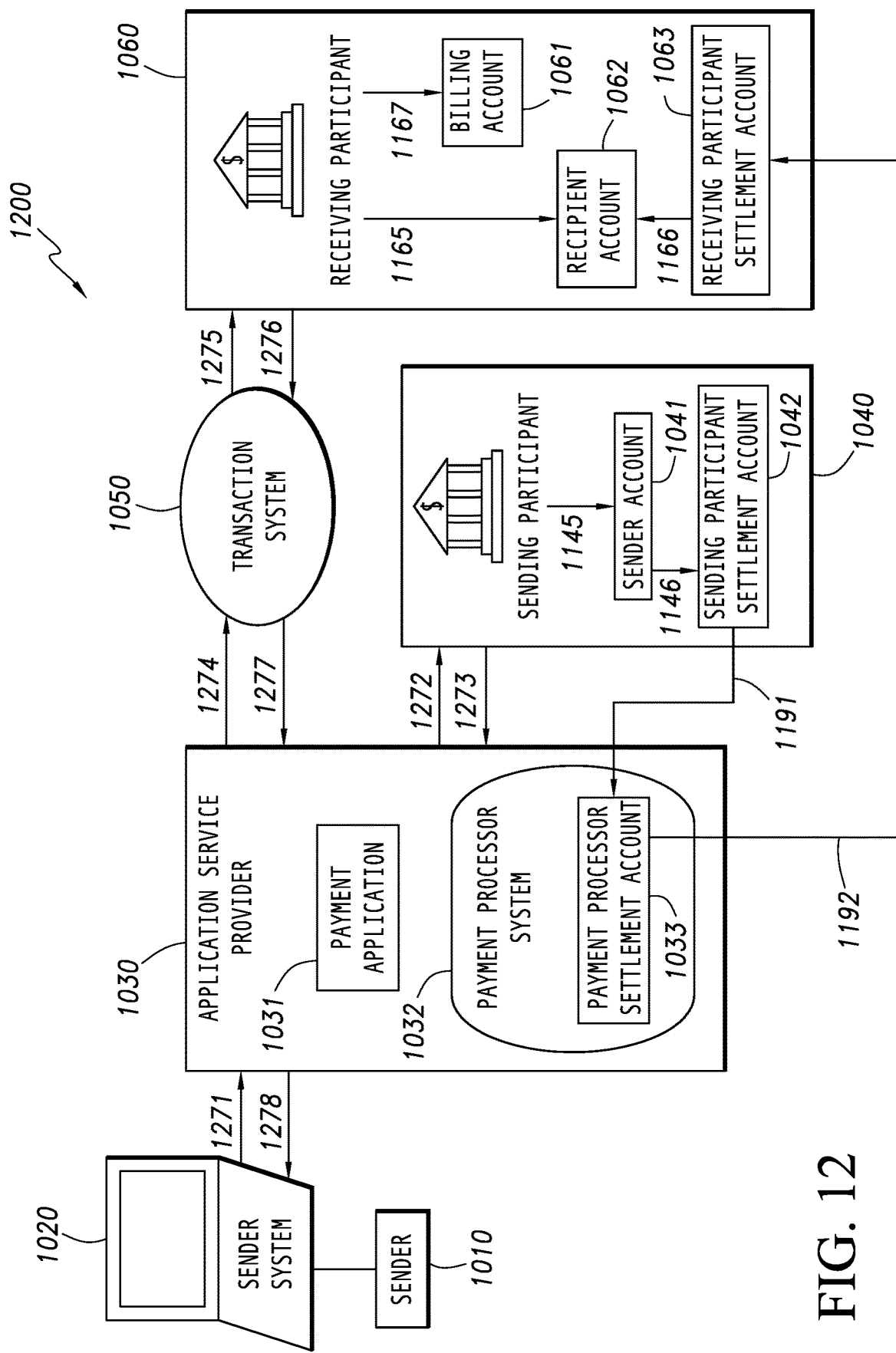
FIG. 12 illustrates a block diagram of a system that is a variation of the system of FIG. 10, in which a sending participant of FIG. 10 is in data communication with the application service provider of FIG. 10 instead of the transaction system of FIG. 10, and showing the payment messages, according to an embodiment.
Figure 13:
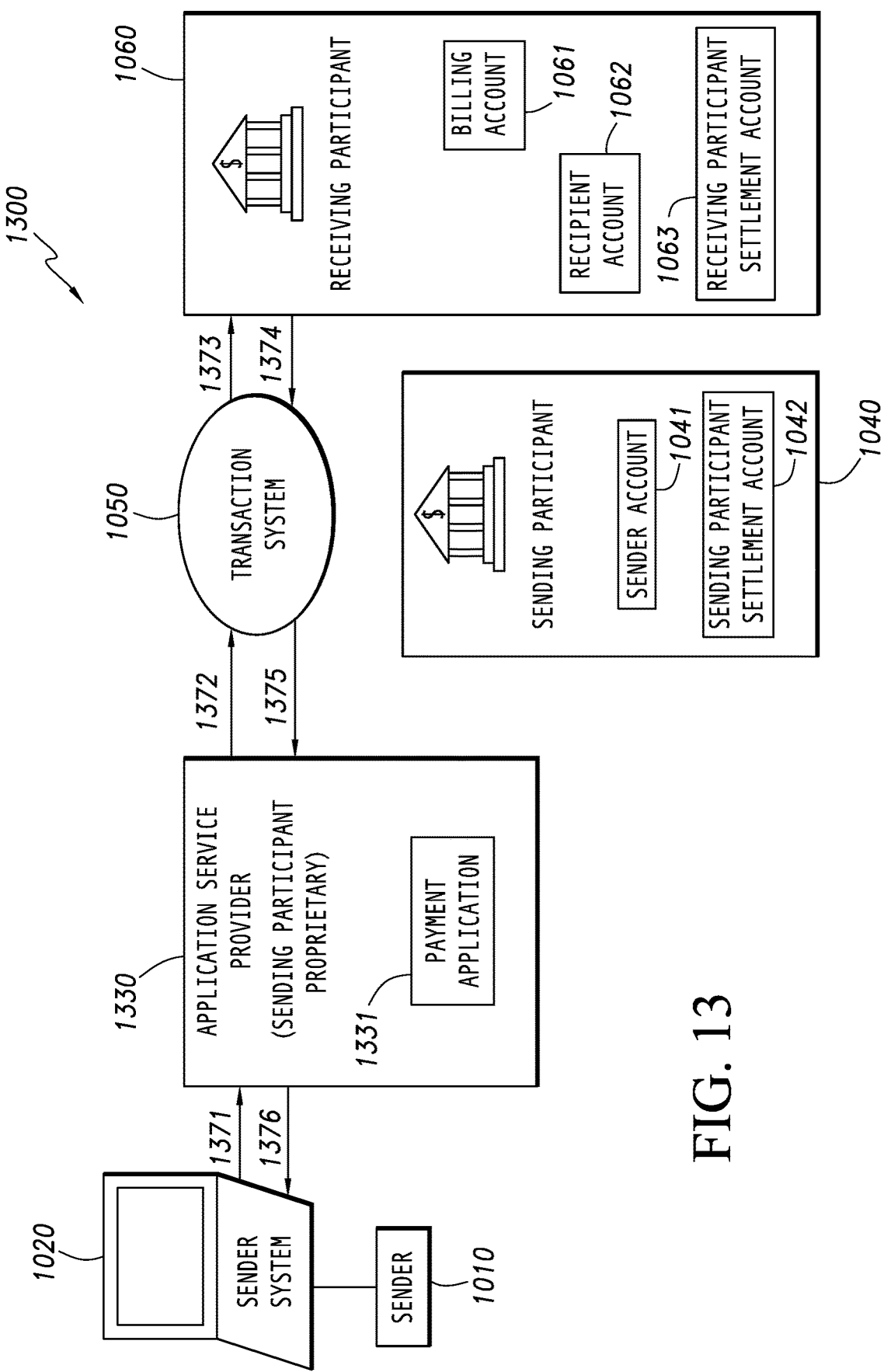
FIG. 13 illustrates a block diagram of a system that is a variation of the system of FIG. 10, showing messages for an "is account real-time capable call," according to an embodiment.
Figure 14:
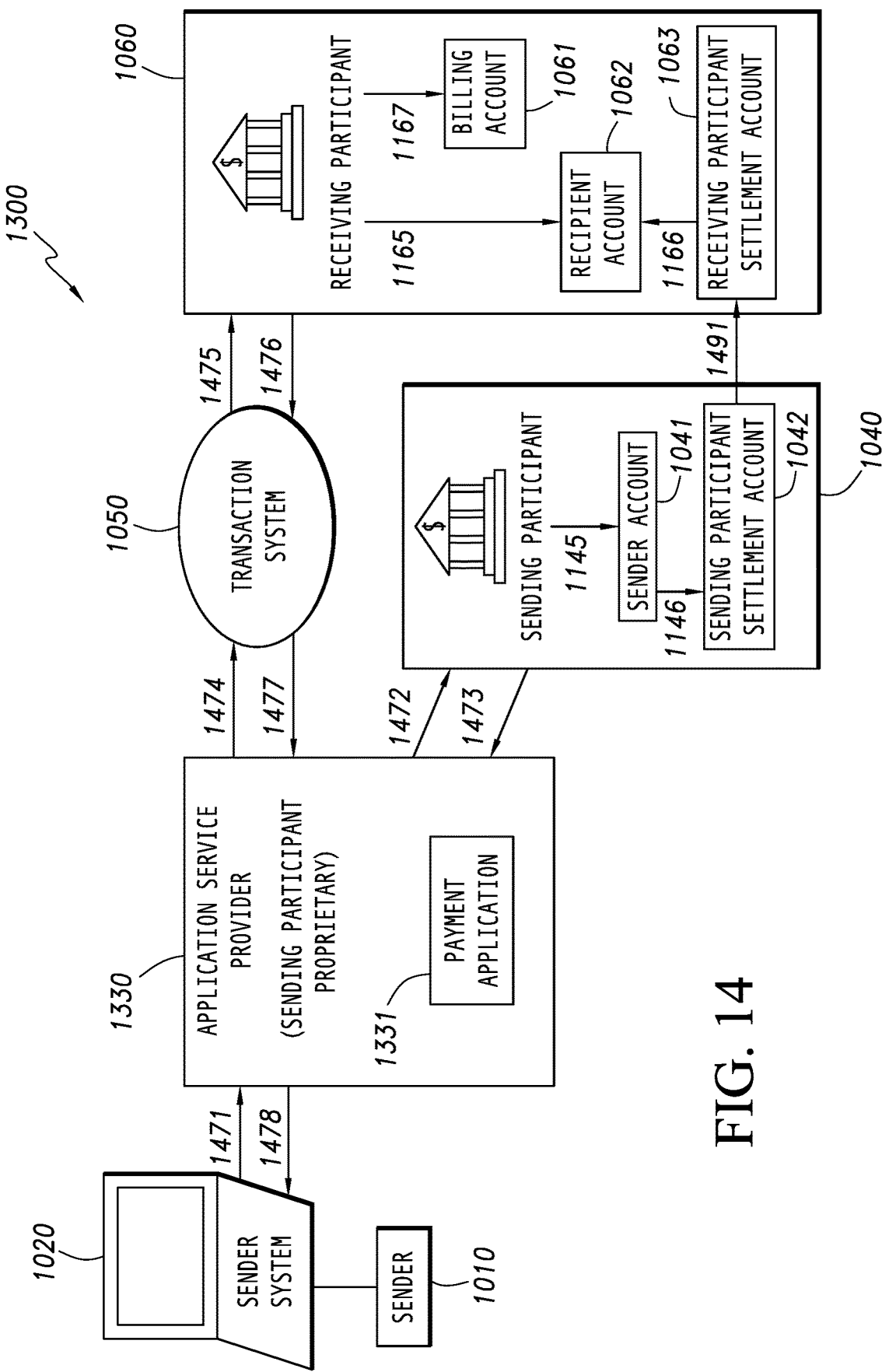
FIG. 14 illustrates a block diagram of the system of FIG. 13, showing the payment messages.
Figure 15:
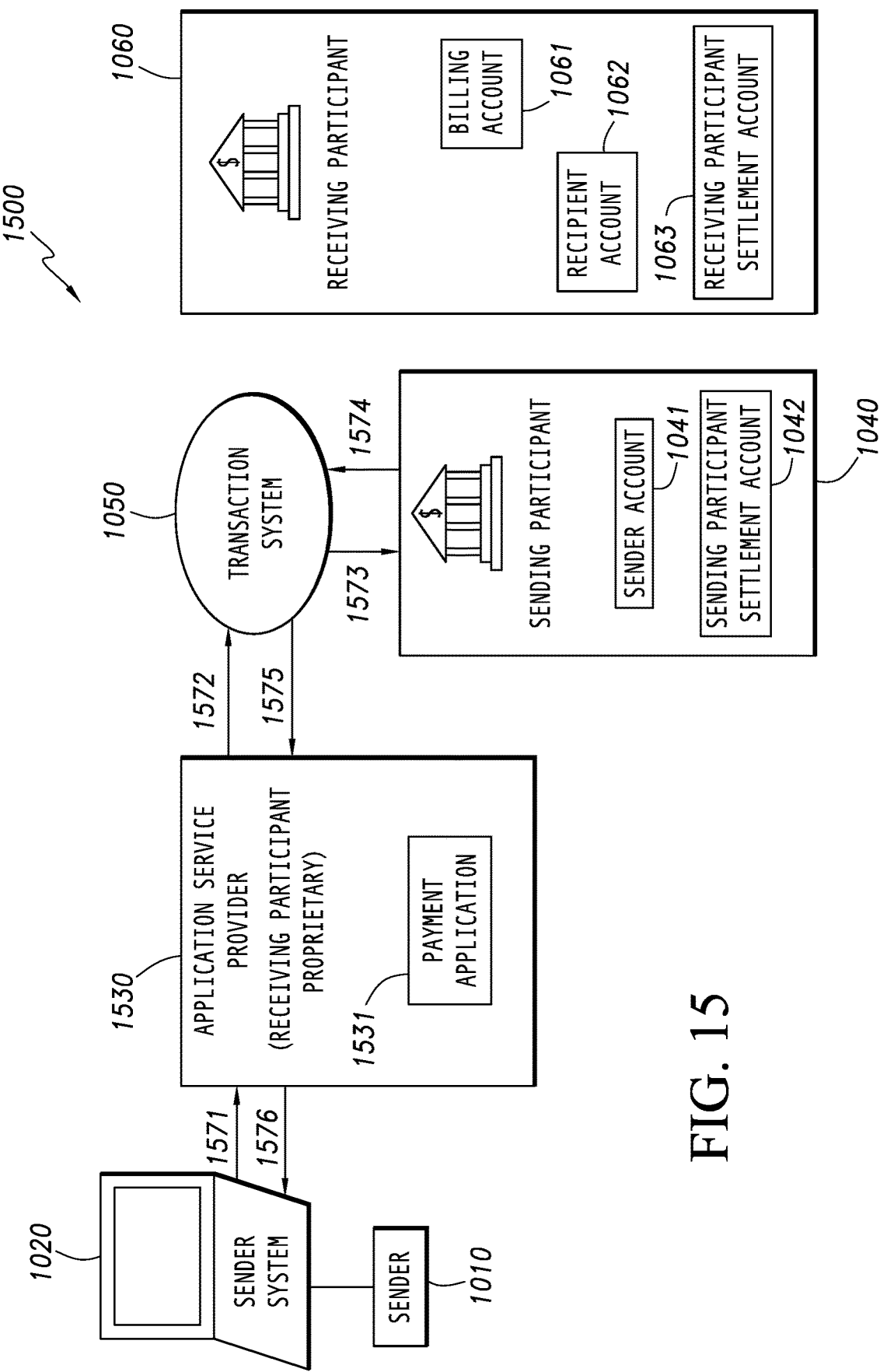
FIG. 15 illustrates a block diagram of a system that is a variation of the system of FIG. 10, in which a receiving participant of FIG. 10 is in data communication with the transaction system of FIG. 10 for credit call messages, and showing messages for an "is account real-time capable call," according to an embodiment.
Figure 16:
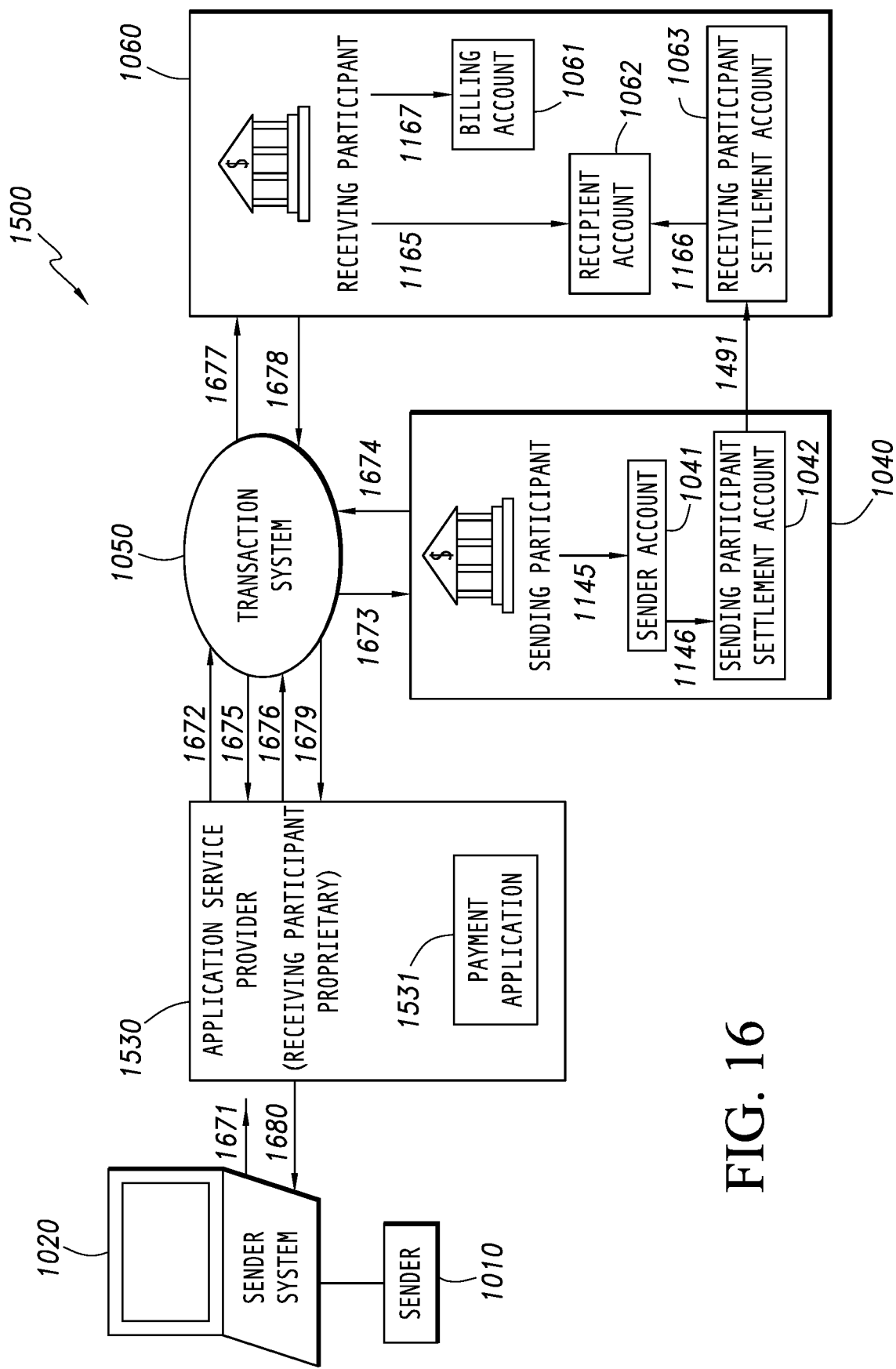
FIG. 16 illustrates a block diagram of the system of FIG. 15, showing the payment messages.
Figure 17:
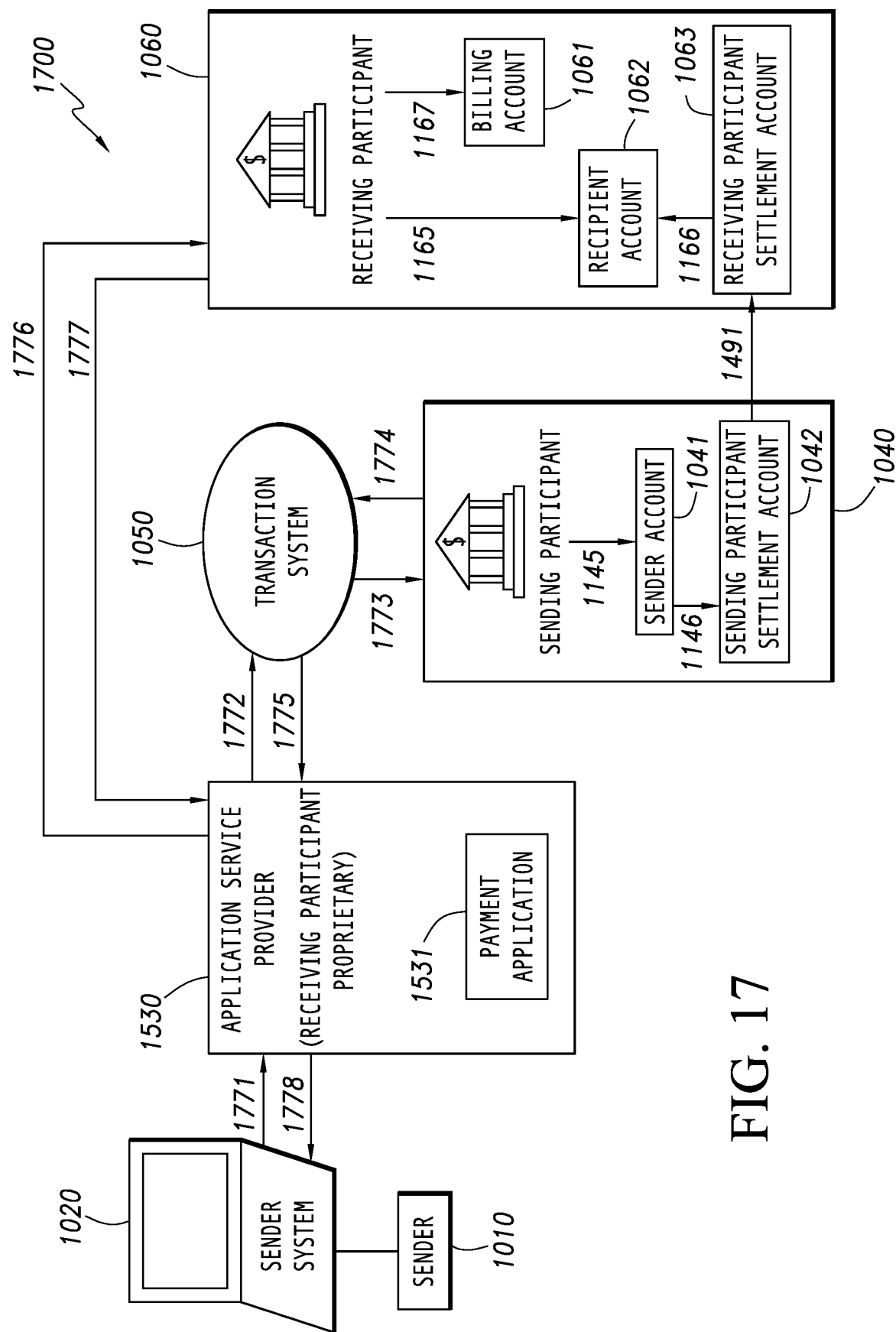
FIG. 17 illustrates a block diagram of a system that is a variation of the system of FIG. 15, in which the receiving participant of FIG. 15 (or FIG. 10) is in data communication for the credit call messages with an application service provider of FIG. 15 instead of the transaction system of FIG. 15 (or FIG. 10), and showing the payment messages, according to an embodiment.

In some embodiments, payment with real-time funds availability can be provided through a consolidated payment model, such as shown in FIGS. 10-14 and described below, where the payment model can be to pay one or more bills or other financial obligations. For example, payment transactions can be initiated at an aggregator or consolidator website, such as, in some embodiments, at a website or an application of the sending participant, such as shown in FIGS. 13-14 and described below, or, in other embodiments, at a website or an application hosted by an application service provider that is separate from the sending participant, such as shown in FIGS. 10-12 and described below. In many embodiments, the application service provider can be separate from the sending participant, but the application service provider can host a website or an application on behalf of the sending participant. In a number of embodiments, the consolidated payment model can allow the consumer to make payments to multiple different billers. In some embodiments, the billers can be pre-registered to receive payments through the application service provider. In several embodiments, payment with real-time funds availability can be provided through a biller direct model, which can allow the sender to initiate payment transactions directly through a biller that issues bills, such as through a website or an application of the biller, such as shown in FIGS. 15-17 and described below.

Turning ahead in the drawings, FIGS. 10-12 illustrate block diagrams of systems that can be employed for real-time funds availability in payment transactions in a first exemplary scenario, using the consolidated payment model, in which an application service provider is separate from the sending participant. FIG. 10 illustrates a block diagram of a system 1000 in which an application service provider 1030 is in data communication with a transaction system 1050, and showing messages for an "is account real-time capable call." FIG. 11 illustrates a block diagram of system 1000, showing payment messages. FIG. 12 illustrates a block diagram of a system 1200 that is a variation of system 1100 of FIGS. 10-11, in which a sending participant 1040 is in data communication with application service provider 1030 instead of transaction system 1050, and showing details of the payment messages.

System 1000 is merely exemplary and embodiments of the system are not limited to the embodiments presented herein. The system can be employed in many different embodiments or examples not specifically depicted or described herein. In some embodiments, certain elements or modules of system 1000 can perform various procedures, processes, and/or activities. In other embodiments, the procedures, processes, and/or activities can be performed by other suitable elements or modules of system 1000.

In many embodiments, system 1000 (FIGS. 10-11) can include a sender 1010, a sender system 1020, application service provider 1030, sending participant 1040, transaction system 1050, and/or receiving participant 1060. In many embodiments, sender 1010 can be the payor of the bill-pay transaction (e.g., the customer) and/or can be an end-user that initiates a funds transfer, such as through sender system 1020. In several embodiments, application service provider 1030 can be an entity that provides a user interface (UI) or application programming interface (API) for a payment application 1031, which can be hosted by application service provider and accessed through sender system 1020 and which can be used to pay one or more bills and/or other financial obligations. In a number of embodiments, sending participant 1040 can be a financial institution that holds a sender account 1041, which can be a funding account of sender 1010 to be debited in conjunction with a debit/payment transaction. In many embodiments, sender participant 1040 can be similar to financial institutions 131-134 (FIG. 1), first financial institution 202 (FIGS. 2-4) and/or second financial institution 204 (FIGS. 2-3). In several embodiments, sending participant 1040 can approve a debit of funds from sending account 1041. Sender account 1041 can be the funding account used by the sender to fund the transaction. In a number of embodiments, sending participant 1040 can include a sending participant settlement account 1042, which can be used by sending participant

1040 to settle fund transfers between sending participant 1040 and other financial institutions, such as receiving participant 1060.

In a number of embodiments, the application sponsor can be an entity or financial institution that approves the debit transactions from sender account 1041. In many embodiments, sending participant 1040 can serve as the application sponsor for the network funds transfers for the consolidated payment model, such as shown in FIGS. 10-14 and described herein and below. In several embodiments, the receiving participant can serve as the application sponsor for the network funds transfers for the biller direct model, such as shown in FIGS. 15-17 and described below. In a number of embodiments, receiving participant 1060 can be a financial institution that holds a recipient account 1062 to be credited in conjunction with the payment transaction. In many embodiments, receiving participant 1040 can be similar to financial institutions 131-134 (FIG. 1), first financial institution 202 (FIGS. 2-4) and/or second financial institution 204 (FIGS. 2-3). In many embodiments, the recipient can be the biller, which can receive the funds in recipient account 1062 of receiving participant 1060, and/or can be an end-user whose account is credited in conjunction with the payment transaction. In several embodiments, receiving participant 1060 can include a billing account 1061, which can be an account billed to sender 1010, and which is used by sender 1010 to fund a bill-payment or funds transfer to billing account 1061. In a number of embodiments, receiving participant 1060 can include a receiving participant settlement account 1063, which can be used by receiving participant 1060 to settle fund transfers between receiving participant 1060 and other financial institutions, such as sending participant 1040.

In a number of embodiments, the payment transaction can include various messages between various elements of the system. In some embodiments, the messages can include messages for an "is account real-time capable call," which can determine whether real-time payment is an available option for the biller/recipient, such as shown in FIGS. 10, 13, and 15, and described below. In a number of embodiments, the messages can include payment messages, which can include providing a real-time promise-to-pay to the receiving participant, such that the receiving participant can make funds available in real-time to the biller/recipient, such as shown in FIGS. 11-12, 14, and 16-17, and described below.

In the first exemplary scenario, as shown in FIGS. 10-12, a website can be hosted by application service provider 1030, which can be separate from, but on behalf of, sending participant 1040. As an example, the application service provider can be Fiserv, Inc. ("Fiserv"), of Brookfield, Wis. or another suitable application service provider; sending participant 1040 (and the application sponsor) can be Capital One Financial Corp. ("CapOne" or "Capital One"), of McLean, Va., or another suitable sending participant; and receiving participant 1060 can be United States Automotive Association Federal Savings Bank ("USAA"), of San Antonio, Tex., or another suitable receiving participant. In this exemplary scenario, a Capital One customer, such as sender 1010, can use sender system 1020 to log onto a consolidated payment website, such as payment application 1031, provided by Fiserv to initiate a payment transaction to pay a USAA credit card (e.g., billing account 1061) from a Capital One account (e.g., sender account 1041). For example, Fiserv can provide a Fiserv application to sender 1010, such as through a website accessed on sender system 1020. In many embodiments, application service provider 1030 can include payment processor system 1032, such as the NOW network of Fiserv, or another suitable payment processor system. Application service provider 1030 thus can be referred to as a payment processor. In a number of embodiments, payment processor system 1032 can include at least one payment processor settlement account 1033, which can be an account that resides at a financial institution that is used by application service provider 1030 to facilitate settlement with other financial institutions. In some embodiments, application service provider 1030 can include a payment processor settlement account 1033 for each financial institution within a network of financial institutions that use application service provider 1030 for payment processing.

In many embodiments, payment processor system 1032 of application service provider 1030 can be in data communication with transaction system 1050. In some embodiments, transaction system 1050 can be a switch and/or switch network provided by an entity separate from sending participant 1040, receiving participant 1060, and/or application service provider 1030, such as Early Warning Services, LLC, of Scottsdale, Ariz., or another suitable entity. In a number of embodiments, transaction system 1050 can be in data communication with receiving participant 1060, as shown in FIGS. 10-12. In some embodiments, sending participant 1040 can be in data communication with transaction system 1050, as shown in FIGS. 10-11. In other embodiments, sending participant 1040 can be in data communication with application service provider 1030, as shown in FIG. 12.

FIG. 10 illustrates messages for an "is account real-time capable call," which can be used to determine if application service provider 1030 should present an instant (real-time) payment option to sender 1010 for the biller, by determining if the one or more relevant accounts (i.e., sender account 1041 and recipient account 1062) are real-time capable. For example, sender 1010 can log onto Capital One's payment website hosted by Fiserv, and the sender can choose to pay a bill for the biller/recipient, which has an account with USAA. As shown in FIG. 10, in a number of embodiments, the request by sender 1010 to pay a bill sent by the biller can cause sender system 1020 to send a message 1071 to application service provider 1030 to determine if the relevant accounts are real-time capable. Application service provider 1030 can receive message 1071 from sender system 1020, and can forward message 1071 in a message 1072 to transaction system 1050 to determine if the relevant accounts are real-time capable. Transaction system 1050 receive message 1072 from application service provider 1030, and can forward message 1072 to receiving participant 1060 in a message 1073 to determine if the relevant accounts are real-time capable. Receiving participant 1060 can receive message 1073 from transaction system 1050, can determine whether recipient account 1062 is capable of handling real-time funds availability transactions, and can send a response to transaction system 1050 in a message 1074, which can indicate whether recipient account 1062 is capable of handling real-time funds availability transactions. Transaction system 1050 can receive message 1074 from receiving participant 1060, and can forward message 1072 in a message 1075 to sending participant 1040 to determine if the relevant accounts are real-time capable. Sending participant 1040 can receive message 1075 from transaction system 1050, can determine whether sender account 1041 is capable of handling real-time funds availability transactions, and can send a response to transaction system 1050 in a message 1076, which can indicate whether sender account 1041 is capable of handling real-time funds availability transactions. Transaction system 1050 can receive message 1076 from sending participant 1040. In some embodiments, messages 1073 and 1075 can be sent from transaction system 1050 in any suitable order, and messages 1074 and 1076 can be received at transaction system 1050 in any suitable order.

Transaction system 1050 can forward the responses that were received by transaction system 1050 in message 1074 and message 1076 to application service provider 1030 in a message 1077. Application service provider 1030 can receive message 1077 from transaction system 1050. If the relevant accounts are real-time capable, application service provider 1030 can present an instant payment option to sender 1010 by sending a message 1078 to sender system 1020. Sender system 1020 can receive message 1078 from application service provider 1030. If sending participant 1040 is instead in data communication with application service provider 1030 instead of transaction system 1050, application service provider 1030 can communicate with sending participant 1040, instead of transaction system 1050 communicating with sending participant 1040, to determine if sender account 1041 is capable of handling real-time funds availability transactions. In many embodiments, the "is account real-time capable call" messages (e.g., messages 1071-1078) can each individually, and/or collectively, occur in real-time.

FIG. 11 illustrates payment messages in system 1000, which is a first version of consolidated real-time payment using application service provider 1030 separate from sending participant 1040, in which sending participant 1040 is in data communication with transaction system 1050. As shown in FIG. 11, in a number of embodiments, sender 1010 can use sender system 1020 to submit payment in real-time to application service provider 1030 in a message 1171. Application service provider 1030 can receive message 1171 from sender system 1020, and can send a message 1172 to transaction system 1050 to debit sender account 1041. Transaction system 1050 can receive message 1172 from application service provider 1030, and can send a message 1173 to sending participant 1040 to debit sender account 1041 in sending participant 1040. Sending participant 1040 can receive message 1173 from transaction system 1050, can debit the funds for the payment from sender account 1041 in an activity 1145, and can credit the funds to sending participant settlement account 1042 in an activity 1146. In many embodiments, sending participant 1040 can determine whether to successfully debit sender account 1041 based on a number of factors, such as whether sender account 1041 is open and in good status (or closed), whether sender account 1041 has had recent not sufficient funds (NSF) activity, whether sender account 1041 has a stop payment order, whether sender account 1041 has sufficient funds for the debit, and/or other suitable factors.

In several embodiments, once sending participant 1040 has successfully debited sender account 1041, sending participant 1040 can send a message 1174 to transaction system 1050 that the debit of sender account 1041 was successful. Transaction system 1050 can receive message 1174 from sending participant 1040, and can forward message 1174 to application service provider 1030 in a message 1175 indicating that debiting of sender account 1041 was successful. Application service provider 1030 can receive message 1175 from transaction system 1050. Once application service provider 1030 has determined that the debit of sender account 1041 was successful, application service provider 1030 can send a message 1176 to transaction system 1050 of a promise-to-pay credit. Transaction system 1050 can receive message 1176 from application service provider 1030, and can forward message 1176 to receiving participant 1060 in a message 1177 of a promise-to-pay credit. Receiving participant 1060 can receive message 1177 from transaction system 1050, can credit the funds to recipient account 1062 in an activity 1165, and can debit the funds from receiving participant settlement account 1063 in an activity 1166, to provide real-time funds availability to the biller/recipient. In many embodiments, when recipient account 1062 has been credited, an accounts receivable (AR) system can credit the funds to billing account 1061 corresponding to sender 1010 of the biller/recipient in an activity 1167, which can indicate that sender 1010 has paid billing account 1061.

In many embodiments, once receiving participant 1060 has successfully credited recipient account 1062, receiving participant 1060 can send a message 1178 to transaction system 1050 that the credit of recipient account 1062 was successful. Transaction system 1050 can receive message 1178 from receiving participant 1060, and can forward message 1178 to application service provider 1030 in a message 1179 indicating that the credit of recipient account 1062 was successful. Application service provider 1030 can receive message 1179 from transaction system 1050, and can present a notification of success to sender 1010 to sender system 1020 in a message 1180 that the instant (real-time) payment was successful. Sender system 1020 can receive message 1180 from application service provider 1030, and can provide information to sender 1010 that the real-time payment was successful. In many embodiments, the payment messages (e.g., 1171-1180) can each individually, and/or collectively, occur in real-time.

In a number of embodiments, the settlement of funds in the various accounts (e.g., payment processor settlement account 1033, sender account 1041, sending participant settlement account 1042, billing account 1061, recipient account 1062, and receiving participant settlement account 1063) can occur through various different channels and or through various different methods. For example, in some embodiments, application service provider 1030 can act as a settlement agent, which can effectuate a pull automated clearinghouse (ACH) of the funds from sending participant settlement account 1042 to payment processor settlement account 1033 in an activity 1191. In many embodiments, application service provider 1030 can effectuate a push ACH of the funds to receiving participant settlement account 1063 from payment processor settlement account 1033 in an activity 1192. In other embodiments, the settlement of funds can occur outside of application service provider 1030. In some embodiments, the settlement of transactions can occur nightly in batches, or occasionally during the day, such as 2-5 times a day. In other embodiments, as described below, the settlement of transactions can occur for each payment transaction or regularly for small groups of transactions. In some embodiments, the settlement transactions can occur for each payment transaction in real-time. Various embodiments of settlement are described below in further detail.

In various first embodiments of settlement, settlement can occur as net settlement with batch posting of financial accounts. In such first embodiments of settlement, in activity 1145, sending participant 1040 can apply the debit of funds from sender account 1041 in real-time for providing a payment guarantee. In activity 1146, sending participant 1040 can credit sending participant settlement account 1042 after sender account 1041 is debited. Sending participant settlement account 1042 can be debited later when settlement completes, such as in activity 1191 of pulling the funds from sending participant settlement account 1042 to payment processor settlement account 1033. In activity 1167, billing account 1061 can be updated in real-time to reflect the payment in the balance and open-to-buy (OTB) amount of the USAA credit card, for example. In activity 1165, receiving participant 1060 can apply a memo post credit to recipient account 1062 in real-time when receiving participant 1060 receives the promise-to-pay (e.g., message 1177). Recipient account 1062 can be credited later when receiving participant settlement account 1063 is credited when settlement completes. In activity 1166, receiving participant 1060 can apply a memo post debit to receiving participant settlement account 1063. Receiving participant settlement account 1063 can be credited later when settlement completes. Settlement can complete when activities 1191 and 1192 occur, which can result in transfer of funds from sending participant settlement account 1042 to receiving participant settlement account 1063 through payment processor settlement account 1033.

In the first embodiments of settlement, within real-time of sender submitting payment (e.g., in message 1171), payment can be visible as posted or pending, and the USAA credit card or line of credit OTB can reflect accepted payment with funds available to spend. The account balance for sender 1010 in billing account 1061 can reflect payment in real-time upon receiving participant receiving the promise-to-pay (e.g. message 1177). Receiving participant settlement account 1063 can be debited and credited for the amount of the payment when the funds are received in receiving participant settlement account 1063 when settlement completes.

In the first embodiments of settlement, settlement can complete through the conventional ACH settlement process, such as intra-day or overnight batch processing. In some of the first embodiments of settlement, settlement completion in activities 1191 and 1192 can occur as single ACH items for each transaction. For example, during the batch posting at settlement completion, each transaction can be represented as a single ACH item. In others of the first embodiments of settlement, multiple transactions can be batched and represented as single transaction. For example, if there are multiple transactions between the same two financial institutions, those transactions can all be batched together and settled as a single batch ACH, or through a wire advice file.

In various second embodiments of settlement, settlement can occur as net settlement with batch posting of financial accounts with real-time posting of the AR system. Such second embodiments of settlement can be similar to the first embodiments of settlement. For example, in activity 1145, sending participant 1040 can apply the debit of funds from sender account 1041 in real-time for providing a payment guarantee. In activity 1146, sending participant 1040 can credit sending participant settlement account 1042 after sender account 1041 is debited. Sending participant settlement account 1042 can be debited later when settlement completes, such as in activity 1191 of pulling the funds from sending participant settlement account 1042 to payment processor settlement account 1033. In activity 1167, billing account 1061 can be updated in real-time to reflect the payment in the balance and open-to-buy (OTB) amount of the USAA credit card, for example. In activity 1166, receiving participant 1060 can apply a memo post debit to receiving participant settlement account 1063. Receiving participant settlement account 1063 can be credited later when settlement completes. Settlement can complete when activities 1191 and 1192 occur, which can result in transfer of funds from sending participant settlement account 1042 to receiving participant settlement account 1063 through payment processor settlement account 1033.

The second embodiments of settlement can be different from the first embodiments of settlement in some respects. For example, in activity 1165, receiving participant 1060 can update recipient account 1062 to apply a hard credit in real-time after receiving participant 1060 receives the promise-to-pay (e.g., message 1177). Recipient account 1062 can be credited from receiving participant settlement account 1063.

In the second embodiments of settlement, within real-time of sender submitting payment (e.g., in message 1171), payment can be visible as posted (not pending), and the USAA credit card or line of credit OTB can reflect accepted payment with funds available to spend. The account balance for sender 1010 in billing account 1061 can be updated in real-time upon receiving participant receiving the promise-to-pay (e.g, message 1177), and recipient account 1062 can be credited in real-time. Receiving participant settlement account 1063 can be debited in real-time for the amount of the payment transferred to recipient account 1062, and can be credited for the amount of the payment when the funds are received in receiving participant settlement account 1063 when settlement completes.

The second embodiments of settlement can be similar to the first embodiments of settlement for completion of settlement. For example, settlement can complete through the conventional ACH settlement process, such as intra-day or overnight batch processing. In some of the second embodiments of settlement, settlement completion in activities 1191 and 1192 can occur as single ACH items for each transaction. For example, during the batch posting at settlement completion, each transaction can be represented as a single ACH item. In others of the second embodiments of settlement, multiple transactions can be batched and represented as single transaction. For example, if there are multiple transactions between the same two financial institutions, those transactions can all be batched together and settled as a single batch ACH, or through a wire advice file.

In various third embodiments of settlement, settlement can occur as real-time settlement and real-time posting to the financial accounts and the AR system. Such third embodiments of settlement can be similar to the second embodiments of settlement. For example, in activity 1145, sending participant 1040 can apply the debit of funds from sender account 1041 in real-time for providing a payment guarantee. In activity 1167, billing account 1061 can be updated in real-time to reflect the payment in the balance and open-to-buy (OTB) amount of the USAA credit card, for example. In activity 1165, receiving participant 1060 can update recipient account 1062 to apply a hard credit in real-time after receiving participant 1060 receives the promise-to-pay (e.g., message 1177). Recipient account 1062 can be credited from receiving participant settlement account 1063.

The third embodiments of settlement can be different from the second embodiments of settlement in some respects. For example, in activity 1146, sending participant 1040 can credit in real-time when sender account 1041 is debited, and can debit sending participant settlement account 1042 in real-time through settlement that completes in real-time after sender 1010 initiates the payment (e.g., in message 1171). In activity 1166, receiving participant 1060 can apply a debit in real-time to receiving participant settlement account 1063. Receiving participant settlement account 1063 can be credited in real-time through settlement that completes in real-time after sender 1010 initiates the payment (e.g., in message 1171).

In the third embodiments of settlement, within real-time of sender submitting payment (e.g., in message 1171), payment can be visible as posted (not pending), and the USAA credit card or line of credit OTB can reflect accepted payment with funds available to spend. The account balance for sender 1010 in billing account 1061 can be updated in real-time upon receiving the promise-to-pay (e.g., message 1177), and recipient account 1062 can be credited in real-time. Receiving participant settlement account 1063 can be debited in real-time for the amount of the payment transferred to recipient account 1062, and can be credited in real-time for the amount of the payment as the funds are received in real-time receiving participant settlement account 1063.

The third embodiments of settlement can be different from the first and second embodiments of settlement for completion of settlement. In the third embodiments of settlement, real-time settlement can complete through a process that transfers funds from sending participant settlement account 1042 to receiving participant settlement account 1063 in real-time for each transaction. In some embodiments, real-time settlement completion of funds from sending participant settlement account 1042 to receiving participant settlement account 1063 can occur through payment processor settlement account 1033, through transaction system 1050, or through another suitable funds transfer mechanism.

In some of the third embodiments of settlement, activities 1191 and 1192 can occur after activity 1146 and before activity 1166. In other embodiments, activities 1191 and 1192 can occur after activities 1146 and 1166.

FIG. 11 illustrates payment messages in system 1000, which is a first version of consolidated real-time payment using application service provider 1030 separate from sending participant 1040, in which sending participant 1040 is in data communication with transaction system 1050.

FIG. 12 illustrates payment messages in a system 1200, which is a second version of consolidated real-time payment using application service provider 1030 separate from sending participant 1040, in which sending participant 1040 is in data communication with application service provider 1030, instead of sending participant 1040 being in data communication with transaction system 1050. System 1200 is merely exemplary and embodiments of the system are not limited to the embodiments presented herein. The system can be employed in many different embodiments or examples not specifically depicted or described herein. In some embodiments, certain elements or modules of system 1200 can perform various procedures, processes, and/or activities. In other embodiments, the procedures, processes, and/or activities can be performed by other suitable elements or modules of system 1200.

In many embodiments, system 1200 can include sender 1010, sender system 1020, application service provider 1030, sending participant 1040, transaction system 1050, and/or receiving participant 1060, as described above in connection with FIGS. 10-11, but sending participant 1040 can be in data communication with application service provider 1030 instead of transaction system 1050, as shown in FIG. 12.

As shown in FIG. 12, in a number of embodiments, sender 1010 can use sender system 1020 to submit payment in real-time to application service provider 1030 in a message 1271. Message 1271 can be similar or identical to message 1171 (FIG. 11). Application service provider 1030 can receive message 1271 from sender system 1020, and can send a message 1272 to sending participant 1040 to debit sender account 1041. Sending participant 1040 can receive message 1272 from application service provider 1030, can debit the funds for the payment from sender account 1041 in activity 1145, and can credit the funds to sending participant settlement account 1042 in activity 1146, as described above in connection with FIG. 11. In several embodiments, once sending participant 1040 has successfully debited sender account 1041, sending participant 1040 can send a message 1273 to application service provider 1030 indicating that the debit of sender account 1041 was successful. Application service provider 1030 can receive message 1273 from sending participant 1040.

Once application service provider 1030 has determined that the debit of sender account 1041 was successful, application service provider 1030 can send a message 1274 to transaction system 1050 of a promise-to-pay credit. Transaction system 1050 can receive message 1274 from application service provider 1030, and can forward message 1274 to receiving participant 1060 in a message 1275 of a promise-to-pay credit. Receiving participant 1060 can receive message 1275 from transaction system 1050, can credit the funds to recipient account 1062 in activity 1165, and can debit the funds from receiving participant settlement account 1063 in activity 1166, to provide real-time funds availability to the biller/recipient, as described above in connection with FIG. 11. In many embodiments, when recipient account 1062 has been credited, the accounts receivable (AR) system can credit the funds to billing account 1061 corresponding to sender 1010 of the biller/recipient in activity 1167, which can indicate that sender 1010 has paid billing account 1061, as described above in connection with FIG. 11.

In many embodiments, once receiving participant 1060 has successfully credited recipient account 1062, receiving participant 1060 can send a message 1276 to transaction system 1050 that the credit of recipient account 1062 was successful. Transaction system 1050 can receive message 1276 from receive participant 1060, and can forward message 1276 to application service provider 1030 in a message 1277 indicating that the credit of recipient account 1062 was successful. Application service provider 1030 can receive message 1277 from transaction system 1050, and can present a notification of success to sender 1010 to sender system 1020 in a message 1278 that the instant (real-time) payment was successful. Sender system 1020 can receive message 1278 from application service provider 1030, and can provide information to sender 1010 that the real-time payment was successful. In many embodiments, the payment messages (e.g., 1271-1278) can each individually, and/or collectively, occur in real-time.

In a number of embodiments, the settlement of funds in the various accounts (e.g., sender account 1041, sending participant settlement account 1042, billing account 1061, recipient account 1062, and receiving participant settlement account 1063) can be identical to the various embodiments described above in connection with FIG. 11.

Turning ahead in the drawings, FIGS. 13-14 illustrate block diagrams of a system that can be employed for real-time funds availability in payment transactions in a second exemplary scenario, using the consolidated payment model, in which the application service provider is the same as the sending participant. FIG. 13 illustrates a block diagram of a system 1300, showing messages for an "is account real-time capable call." FIG. 14 illustrates a block diagram of system 1300, showing details of the payment messages.

System 1300 is merely exemplary and embodiments of the system are not limited to the embodiments presented herein. The system can be employed in many different embodiments or examples not specifically depicted or described herein. In some embodiments, certain elements or modules of system 1300 can perform various procedures, processes, and/or activities. In other embodiments, the procedures, processes, and/or activities can be performed by other suitable elements or modules of system 1300.

In many embodiments, system 1300 (FIGS. 13-14) can include a sender 1010, a sender system 1020, an application service provider 1330, sending participant 1040, transaction system 1050, and/or receiving participant 1060. In several embodiments, application service provider 1330 can be an entity that provides a user interface (UI) or application programming interface (API) for payment application 1031, in which application service provider 1530 and/or payment application 1531 are proprietary to sending participant 1040.

In the second exemplary scenario, as shown in FIG. 13-14, sending participant 1040 can provide a payment application 1331 to sender 1010. Similar to other payment applications described above, payment application 1331 can be used to pay one or more bills and/or other financial obligations. For example, sending participant 1040, application service provider 1330, and the application sponsor can be Wells Fargo & Co. ("Wells Fargo"), of San Francisco, Calif.; and receiving participant 1060 can be USAA. In this exemplary scenario, a Wells Fargo customer, such as sender 1010, can use sender system 1020 to log onto a consolidated payment website, such as payment application 1331, hosted by Wells Fargo to pay a USAA auto loan (e.g., billing account 1061) from a demand deposit account (DDA) (e.g., sender account 1041) of the customer (e.g., sender 1010) at Wells Fargo. In various embodiments, sending participant 1040 can provide payment application 1331, which can be accessed by sender 1010 to initiate a payment transaction. For example, Wells Fargo can provide a website. In many embodiments, sending participant 1040 can be in data communication with transaction system 1050. In a number of embodiments, transaction system 1050 can be in data communication with receiving participant 1060, as shown in FIGS. 13-14. Application service provider 1330 and payment application 1331 can be part of sending participant 1040, and can be in data communication with each other.

FIG. 13 illustrates messages for an "is account real-time capable call," which can be used to determine if application service provider 1330 should present an instant (real-time) payment option to sender 1010 for the biller, by determining if the one or more relevant accounts (i.e., sender account 1041 and recipient account 1062) are real-time capable. The "is account real-time capable call" in FIG. 13 can be similar to the "is account real-time capable call" in FIG. 10. But unlike the "is account real-time capable call" of FIG. 10, the "is account real-time capable call" in FIG. 13 is modified because application service provider 1330 is not separate from sending participant 1040. Because application service provider 1330 and sending participant 1040 are the same entity, sending participant 1040/application service provider 1330 can know when sender account 1041 at sending participant 1040 is real-time capable, so it is not necessary to send a message to sending participant 1040 to determine if sender account 1041 is real-time capable.

As shown in FIG. 13, in a number of embodiments, the request by sender 1010 to pay a bill sent by the biller can cause sender system 1020 to send a message 1371 to application service provider 1330 to determine if the relevant accounts are real-time capable. Application service provider 1330 can receive message 1371 from sender system 1020, and can forward message 1371 to transaction system 1050 in a message 1372 to determine if the relevant accounts are real-time capable. Transaction system 1050 can receive message 1372 from application service provider 1330, and can forward message 1372 to receiving participant 1060 in a message 1373 to determine if the relevant accounts are real-time capable. Receiving participant 1060 can receive message 1373 from transaction system 1050, can determine whether recipient account 1062 is capable of handling real-time funds availability transactions, and can send a response to transaction system 1050 in a message 1374, which can indicate whether recipient account 1062 is capable of handling real-time funds availability transactions.

Transaction system 1050 can receive message 1374 from receiving participant 1060, and can forward the response in message 1374 to application service provider 1330 in a message 1375 indicating whether recipient account 1062 is capable of handling real-time funds availability transactions. Application service provider 1330 can receive message 1375 from transaction system 1050. As explained above, application service provider 1330 can know whether sender account 1041 is real-time capable. If the relevant accounts are real-time capable, application service provider 1330 can present an instant payment option to sender 1010 by sending a message 1376 to sender system 1020. Sender system 1020 can receive message 1376 from application service provider 1030. In many embodiments, the "is account real-time capable call" messages (e.g., messages 1371-1376) can each individually, and/or collectively, occur in real-time.

FIG. 14 illustrates payment messages in system 1300. As shown in FIG. 14, in a number of embodiments, sender 1010 can use sender system 1020 to submit payment in real-time to application service provider 1330 in a message 1471. Message 1471 can be similar or identical to message 1171 (FIG. 11) and/or message 1271 (FIG. 12). Application service provider 1330 can receive message 1471 from sender system 1020, and can send a message 1472 internally to sending participant 1040 to debit sender account 1041. Sending participant 1040 can receive message 1472 from application service provider 1330, and can debit the funds for the payment from sender account 1041 in activity 1145 and credit the funds to sending participant settlement account 1042 in activity 1146, as described above in connection with FIG. 11. In several embodiments, once sending participant 1040 has successfully debited sender account 1041, sending participant 1040 can send a message 1473 internally to application service provider 1330 indicating that the debit of sender account 1041 was successful. Application service provider 1330 can receive message 1473 from sending participant 1040.

In several embodiments, once application service provider 1330 has determined that the debit of sender account 1041 was successful, application service provider 1330 can send a message 1474 to transaction system 1050 of a promise-to-pay credit. Transaction system 1050 can receive message 1474 from application service provider 1330, and can forward message 1474 to receiving participant 1060 in a message 1475 of a promise-to-pay credit. Receiving participant 1060 can receive message 1475 from transaction system 1050, credit the funds to recipient account 1062 in activity 1165, and can debit the funds from receiving participant settlement account 1063 in activity 1166, to provide real-time funds availability to the biller/recipient, as described above in connection with FIG. 11. In many embodiments, when recipient account 1062 has been credited, the AR system can credit the funds to billing account 1061 corresponding to sender 1010 of the biller/recipient in activity 1167, which can indicate that sender 1010 has paid billing account 1061, as described above in connection with FIG. 11.

In many embodiments, once receiving participant 1060 has successfully credited recipient account 1062, receiving participant 1060 can send a message 1476 to transaction system 1050 that the credit of recipient account 1062 was successful. Transaction system 1050 can receive message 1476 from receive participant 1060, and can forward message 1476 to application service provider 1330 in a message 1477 indicating that the credit of recipient account 1062 was successful. Application service provider 1330 can receive message 1477 from transaction system 1050, and can present a notification of success to sender 1010 to sender system 1020 in a message 1478 that the instant (real-time) payment was successful. Sender system 1020 can receive message 1478 from application service provider 1330, and can provide information to sender 1010 that the real-time payment was successful. In many embodiments, the payment messages (e.g., 1471-1478) can each individually, and/or collectively, occur in real-time.

In a number of embodiments, the settlement of funds in the various accounts (e.g., sender account 1041, sending participant settlement account 1042, billing account 1061, recipient account 1062, and receiving participant settlement account 1063) can be similar to the various embodiments described above in connection with FIG. 11, except that activities 1191 and 1192 can be replaced with an activity 1491 that does not involve payment processor settlement account 1033 (FIGS. 10-12). The first and second embodiments of settlement described above in connection with FIG. 11 can be modified such that activity 1491 can include a single ACH item for each transaction (such as an ACH push from sending participant settlement account 1042 to receiving participant settlement account 1063, or, alternatively, an ACH pull from receiving participant settlement account 1063 from sending participant settlement account 1042), or a batched transactions, such that if there are multiple transactions between the same two financial institutions, those transactions can all be batched together and settled as a single batch ACH, or through a wire advice file. The third embodiments of settlement described above in connection with FIG. 11 can be modified such that activity 1491 can include real-time settlement that can complete through a process that transfers funds from sending participant settlement account 1042 to receiving participant settlement account 1063 in real-time for each transaction after the payment has been initiated. In some of the third embodiments of settlement, activity 1491 can occur after activity 1146 and before activity 1166. In other embodiments, activity 1491 can occur after activities 1146 and 1166. In some embodiments, real-time settlement completion of funds from sending participant settlement account 1042 to receiving participant settlement account 1063 can occur through transaction system 1050, or through another suitable funds transfer mechanism.

Turning ahead in the drawings, FIGS. 15-17 illustrate block diagrams of systems that can be employed for real-time funds availability in payment transactions in a third exemplary scenario, using the biller direct model, in which the application service provider is the same entity as the receiving participant. FIG. 15 illustrates a block diagram of a system 1500, in which receiving participant 1060 is in data communication with transaction system 1050 for credit call messages, and showing messages for an "is account real-time capable call." FIG. 16 illustrates a block diagram of system 1500, showing the payment messages. FIG. 17 illustrates a block diagram of a system 1700 that is a variation of system 1500 of FIGS. 15-16, in which receiving participant 1060 is in data communication for the credit call messages with an application service provider 1530 instead of transaction system 1050, and showing the payment messages.

System 1500 is merely exemplary and embodiments of the system are not limited to the embodiments presented herein. The system can be employed in many different embodiments or examples not specifically depicted or described herein. In some embodiments, certain elements or modules of system 1500 can perform various procedures, processes, and/or activities. In other embodiments, the procedures, processes, and/or activities can be performed by other suitable elements or modules of system 1500.

In many embodiments, system 1500 (FIGS. 15-16) can include a sender 1010, a sender system 1020, an application service provider 1530, sending participant 1040, transaction system 1050, and/or receiving participant 1060. In several embodiments, application service provider 1530 can be an entity that provides a user interface (UI) or application programming interface (API) for payment application 1031, in which application service provider 1530 and/or a payment application 1531 are proprietary to receiving participant 1060.

In the third exemplary scenario, as shown in FIG. 15-17, receiving participant 1060 can provide payment application 1531 to sender 1010. Similar to other payment applications described above, payment application 1531 can be used to pay one or more bills and/or other financial obligations. For example, receiving participant 1060 and application service provider 1530 can be Capital One, and sending participant 1040 can be USAA. In this exemplary scenario, a Capital One customer, such as sender 1010, can use sender system 1020 to log onto a direct payment website, such as payment application 1531 from Capital One to pay the customer's Capital One credit card (e.g., billing account 1061) from a DDA account held by the customer at USAA (e.g., sender account 1041). In various embodiments, receiving participant 1060 can provide payment application 1531, which can be accessed by sender 1010 to initiate a payment transaction. For example, Capital One can provide a billing application layer, such as a website or an application (e.g., mobile application). In many embodiments, application service provider 1530 can be in data communication with transaction system 1050. In a number of embodiments, transaction system 1050 can be in data communication with sending participant 1040. In many embodiments, application service provider 1530 can have an internal data communication link with receiving participant 1060. In some embodiments, promise-to-pay credit call messages can be sent to and received from receiving participant 1060 through transaction system 1050, such as shown in FIG. 16 and described below. In other embodiments, promise-to-pay credit call messages can be sent to and received from receiving participant 1060 through application service provider 1530, as shown in FIG. 17 and described below.

FIG. 15 illustrates messages for an "is account real-time capable call," which can be used to determine if application service provider 1530 should present an instant (real-time) payment option to sender 1010 for the biller, by determining if the one or more relevant accounts (i.e., sender account 1041 and recipient account 1062) are real-time capable. The "is account real-time capable call" in FIG. 15 can be similar to the "is account real-time capable call" in FIGS. 10 and 13. But unlike the "is account real-time capable call" of FIGS. 10 and 13, the "is account real-time capable call" in FIG. 15 is modified because application service provider 1530 is not separate from receiving participant 1060. Because application service provider 1530 and receiving participant 1040 are the same entity, receiving participant 1060/application service provider 1530 can know when recipient account 1062 at receiving participant 1060 is real-time capable, so it can be not necessary to send a message to receiving participant 1060 to determine if recipient account 1062 is real-time capable.

As shown in FIG. 15, in a number of embodiments, the request by sender 1010 to pay a bill sent by the biller can cause sender system 1020 to send a message 1571 to application service provider 1530 to determine if the relevant accounts are real-time capable. Application service provider 1530 can receive message 1571 from sender system 1020, and can forward message 1571 to transaction system 1050 in a message 1572 to determine if the relevant accounts are real-time capable. Transaction system 1050 can receive message 1572 from application service provider 1530, and can forward message 1572 to sending participant 1040 in a message 1573 to determine if the relevant accounts are real-time capable. Sending participant 1040 can receive message 1573 from transaction system 1050, can determine whether sender account 1041 is capable of handling real-time funds availability transactions, and can send a response to transaction system 1050 in a message 1574, which can indicate whether sending account 1041 is capable of handling real-time funds availability transactions.

Transaction system 1050 can receive message 1574 from sending participant 1040, and can forward the response in message 1574 to application service provider 1530 in a message 1575 indicating whether sending account 1041 is capable of handling real-time funds availability transactions. Application service provider 1530 can receive message 1575 from transaction system 1050. As explained above, application service provider 1530 can know whether recipient account 1062 is real-time capable. If the relevant accounts are real-time capable, application service provider 1530 can present an instant payment option to sender 1010 by sending a message 1576 to sender system 1020. Sender system 1020 can receive message 1576 from application service provider 1030. In many embodiments, the "is account real-time capable call" messages (e.g., messages 1571-1576) can each individually, and/or collectively, occur in real-time.

FIG. 16 illustrates payment messages in system 1500, which is a first version of the biller direct model of real-time bill pay, in which the application service provider is the same entity as the receiving participant, and in which promise-to-pay credit call messages can be sent to and received from receiving participant 1060 through transaction system 1050. As shown in FIG. 16, in a number of embodiments, sender 1010 can use sender system 1020 to submit payment in real-time to application service provider 1530 in a message 1671. Application service provider 1530 can receive message 1671 from sender system 1020, and can send a message 1672 to transaction system 1050 to debit sender account 1041. Transaction system 1050 can receive message 1672 from application service provider 1530, and can send a message 1673 to sending participant 1040 to debit sender account 1041 in sending participant 1040. Sending participant 1040 can receive message 1673 from transaction system 1050, can debit the funds for the payment from sender account 1041 in activity 1145, and can credit the funds to sending participant settlement account 1042 in activity 1146, as described above in connection with FIG. 11.

In several embodiments, once sending participant 1040 has successfully debited sender account 1041, sending participant 1040 can send a message 1674 to transaction system 1050 that the debit of sender account 1041 was successful. Transaction system 1050 can receive message 1674 from sending participant 1040, and can forward message 1674 to application service provider 1530 in a message 1675 indicating that debiting of sender account 1041 was successful. Application service provider 1530 can receive message 1675 from transaction system 1050. Once application service provider 1530 has determined that the debit of sender account 1041 was successful, application service provider 1530 can send a message 1676 to transaction system 1050 of a promise-to-pay credit. Transaction system 1050 can receive message 1676 from application service provider 1530, and can forward message 1676 to receiving participant 1060 in a message 1677 of a promise-to-pay credit. Receiving participant 1060 can receive message 1677 from transaction system 1050, can credit the funds to recipient account 1062 in activity 1165, and can debit the funds from receiving participant settlement account 1063 in activity 1166, to provide real-time funds availability to the biller/recipient, as described above in connection with FIG. 11. In many embodiments, when recipient account 1062 has been credited, the AR system can credit the funds to billing account 1061 corresponding to sender 1010 of the biller/recipient in activity 1167, which can indicate that sender 1010 has paid billing account 1061, as described above in connection with FIG. 11.

In many embodiments, once receiving participant 1060 has successfully credited recipient account 1062, receiving participant 1060 can send a message 1678 to transaction system 1050 that the credit of recipient account 1062 was successful. Transaction system 1050 can receive message 1678 from receiving participant 1060, and can forward the response in message 1678 to application service provider 1530 in a message 1679 indicating that the credit of recipient account 1062 was successful. Application service provider 1530 can receive message 1679 from transaction system 1050, and can present a notification of success to sender 1010 to sender system 1020 in a message 1680 that the instant (real-time) payment was successful. Sender system 1020 can receive message 1680 from application service provider 1530, and can provide information to sender 1010 that the real-time payment was successful. In many embodiments, the payment messages (e.g., 1671-1680) can each individually, and/or collectively, occur in real-time.

In a number of embodiments, the settlement of funds in the various accounts (e.g., sender account 1041, sending participant settlement account 1042, billing account 1061, recipient account 1062, and receiving participant settlement account 1063) can be similar or identical to the various embodiments described above in connection with activity 1491 of FIG. 14.

FIG. 17 illustrates payment messages in system 1700, which is a second version of the biller direct model of real-time bill pay, in which the application service provider is the same entity as the receiving participant, and promise-to-pay credit call messages can be sent to and received from receiving participant 1060 through application service provider 1530.

System 1700 is merely exemplary and embodiments of the system are not limited to the embodiments presented herein. The system can be employed in many different embodiments or examples not specifically depicted or described herein. In some embodiments, certain elements or modules of system 1700 can perform various procedures, processes, and/or activities. In other embodiments, the procedures, processes, and/or activities can be performed by other suitable elements or modules of system 1700.

In many embodiments, system 1700 can include sender 1010, sender system 1020, application service provider 1530, sending participant 1040, transaction system 1050, and/or receiving participant 1060, as described above in connection with FIGS. 15-16, but promise-to-pay credit call messages can be sent to and received from receiving participant 1060 through application service provider 1530 instead of transaction system 1050.

As shown in FIG. 17, in a number of embodiments, sender 1010 can use sender system 1020 to submit payment in real-time to application service provider 1530 in a message 1771. Application service provider 1530 can receive message 1771 from sender system 1020, and can send a message 1772 to transaction system 1050 to debit sender account 1041. Transaction system 1050 can receive message 1772 from application service provider 1530, and can send a message 1773 to sending participant 1040 to debit sender account 1041 in sending participant 1040. Sending participant 1040 can receive message 1773 from sending participant 1040, can debit the funds for the payment from sender account 1041 in activity 1145, and can credit the funds to sending participant settlement account 1042 in activity 1146, as described above in connection with FIG. 11.

In several embodiments, once sending participant 1040 has successfully debited sender account 1041, sending participant 1040 can send a message 1774 to transaction system 1050 that the debit of sender account 1041 was successful. Transaction system 1050 can receive message 1774 from sending participant 1040, and can forward message 1774 to application service provider 1530 in a message 1775 indicating that debiting of sender account 1041 was successful. Application service provider 1530 can receive message 1775 from transaction system 1050. Once application service provider 1530 has determined that the debit of sender account 1041 was successful, application service provider 1530 can send a message 1776 to receiving participant 1060 of a promise-to-pay credit. Receiving participant 1060 can receive message 1776 from application service provider 1530, can credit the funds to recipient account 1062 in activity 1165, and can debit the funds from receiving participant settlement account 1063 in activity 1166, to provide real-time funds availability to the biller/recipient, as described above in connection with FIG. 11. In many embodiments, when recipient account 1062 has been credited, the AR system can credit the funds to billing account 1061 corresponding to sender 1010 of the biller/recipient in activity 1167, which can indicate that sender 1010 has paid billing account 1061, as described above in connection with FIG. 11.

In many embodiments, once receiving participant 1060 has successfully credited recipient account 1062, receiving participant 1060 can send a message 1777 to application service provider 1530, indicating that the credit of recipient account 1062 was successful. Application service provider 1530 can receive message 1777 from receiving participant 1060, and can present a notification of success to sender 1010 to sender system 1020 in a message 1778 that the instant (real-time) payment was successful. Sender system 1020 can receive message 1778 from application service provider 1530, and can provide information to sender 1010 that the real-time payment was successful. In many embodiments, the payment messages (e.g., 1771-1778) can each individually, and/or collectively, occur in real-time.

In a number of embodiments, the settlement of funds in the various accounts (e.g., sender account 1041, sending participant settlement account 1042, billing account 1061, recipient account 1062, and receiving participant settlement account 1063) can be similar or identical to the various embodiments described above in connection with activity 1491 of FIG. 14.

In some embodiments, the "is account real-time capable call" in FIGS. 10, 13, and/or 15 can validate real-time capability of accounts from both sending participant 1040 (FIGS. 10-17) and receiving participant 1060 (FIGS. 10-17). In some embodiments, the "is account real-time capable call" can determine whether the instant pay option should be presented to the sender 1010 (FIGS. 10-17) on the payment application (e.g., 1031 (FIGS. 10-12), 1331 (FIGS. 13-14), and/or 1531 (FIGS. 15-17)). The "is account real-time capable call" can verify if the funding account and/or the biller account is real-time capable.

In many embodiments, the "is account real-time capable call" in FIGS. 10, 13, and/or 15 advantageously can facilitate one or more of the following benefits, among other benefits:

a. Account validation for real-time capability: Financial institutions (e.g., sending participant 1040 (FIGS. 10-17) and/or receiving participant 1060 (FIGS. 10-17)) or the application service provider (e.g., 1030 (FIGS. 10-12), 1330 (FIGS. 13-14), and/or 1530 (FIG. 15-17) can initiate an accounts capable call in order to validate whether or not sender account 1041 (FIGS. 10-17), billing account 1061 (FIGS. 10-17), and/or recipient account 1062 (FIGS. 10-17)) are real-time capable.

b. Settlement instructions from billers: The "is account real-time capable call" response messages can be designed to carry settlement information from the biller to sending participant 1040, so that the messaging process can rely on real-time information instead of expensive directory look-ups to facilitate the remittance process. Providing the settlement instructions during the initial capability call can advantageously facilitate settlement participant 1040 not having to rely on an older directory of accounts and the assurance that the settlement account is the correct account.

c. Inform sender 1010 (FIGS. 10-17) of Settlement Expectations: The message structure can incorporate a customer settlement field where key values can be interpreted into formatted messages back to the consumer in a real-time fashion. This can provide information on settlement expectations and so forth. For example, the biller can inform the customer (e.g., sender 1010 (FIGS. 10-17)) that payment will be accepted real-time and the OTB in the billing account (e.g., billing account 1061 (FIGS. 10-17)) for the customer (e.g., sender 1010 (FIGS. 10-17)) will be increased, but that the payment may not be visible on the customer's statement for two business days (depending on the settlement type used).

d. Optional billing account information: The "is account real-time capable call" response messages can include optional fields such as current balance, last payment date, minimum amount due, and if provided, it can be displayed to the consumer (e.g., sender 1010 (FIGS. 10-17)) on the Payment UI (user interface) (e.g., payment application 1031 (FIGS. 10-12), 1331 (FIGS. 13-14), and/or 1531 (FIGS. 15-17)) at the time of payment, which can provide beneficial information to sender 1010 (FIGS. 10-17).

In several embodiments, the "is account real-time capable call" can include various elements in the inquiry messages (e.g., messages 1071-1073, 1075 (FIG. 10), 1371-1373 (FIG. 13), and/or messages 1571-1573 (FIG. 15)), such as:
a. Message wrapper fields: This section of the inquiry message can include fields, such as transaction ID, transaction date and so forth.
b. Debit block: This section of the inquiry message can provide information on the Funding Accounts. Data elements can be include ABA, account number, etc.
c. Payment item block: This section of the inquiry message can provide information on the item (e.g., on a credit card payment) for which sender 1010 (FIGS. 10-17) wishes to make a payment. Data elements can include billing account information, personally identifiable information (PII) of sender 1010 (FIGS. 10-17) such as a name, a home address, a telephone number, a social security number, a tax identification number, an age, an income level, marital status, a number of dependents, a frequent shopper identifier, shopping preferences, billing ID, etc.
d. Settlement block: This section of the inquiry message can provide the information regarding sending participant settlement account 1042 (FIGS. 10-17). Data elements can include account information such as ABA and account number.

In several embodiments, the "is account real-time capable call" can include various elements in the response messages (e.g., messages 1074, 1076-1078 (FIG. 10), 1374-1376 (FIG. 13), and/or messages 1574-1576 (FIG. 15)), such as:
a. Message wrapper fields: This section of the response message can include fields, such as transaction ID, transaction Date, etc.
b. Debit block: This section of the response message can return fields from sending participant 1040 (FIGS. 10-17) that maintains sender account 1041 (FIGS. 10-17) for sender 1010 (FIGS. 10-17). Data elements can include: a real-time capable flag, reason codes if account is not real-time capable, optional fee information, etc.
c. Payment item block: This section of the response message can return fields from receiving participant 1060 (FIGS. 10-17), which in some instances can be the biller. Data elements can include a real-time capable flag, reason codes if account is not real-time capable, a customer messaging field, payment information fields, and optional fee information field.
d. Settlement block: This section of the response message can return fields from receiving participant 1060 (FIGS. 10-17), which in some instances can be the biller. Data elements can include information about receiving participant settlement account 1063 (FIGS. 10-17), the settlement method, and any additional information on billing account 1061 (FIGS. 10-17), and/or recipient account 1062 (FIGS. 10-17).

In some embodiments, the debit call can be sent to sending participant 1040 (FIGS. 10-17), and given successful execution of the debit call, sending account 1041 (FIGS. 10-17) can be decremented. In some embodiments, the structure of the debit call can leverage the same Inquiry framework that has already been developed and used for Deposit Chek® Direct, offered by Early Warning Services, LLC.

In several embodiments, the debit call can include various elements in the inquiry messages (e.g., messages 1173 (FIG. 11), 1272 (FIG. 12), 1472 (FIG. 14), 1673 (FIG. 16), and/or 1773 (FIG. 17)). The transaction system can get this inquiry if the transaction system is in data communication with the sending recipient. Otherwise the "billing intermediary" handles this debiting. After the "debiting Inquiry" has happened, the debiting response can be received by either the transaction system or the billing intermediary. In some embodiments, various elements in the inquiry of the debit call (e.g., messages 1773 (FIG. 11), 1272 (FIG. 12), 1472 (FIG. 14), 1673 (FIG. 16), and/or 1773 (FIG. 17)) can include:
a. Message wrapper fields: This section of the inquiry message can include fields, such as transaction ID, transaction date, etc.
b. Debit block: This section of the inquiry message can provide information on sender account 1041 (FIGS. 10-17). Data elements can include ABA, account number, etc.
c. Settlement block: This section of the inquiry message can provide settlement fields from receiving participant 1060 (FIGS. 10-17), which were returned in the "is account real-time capable call" response message. Data elements can include information for receiving participant settlement account 1063 (FIGS. 10-17), the settlement method, and any additional information on billing account 1061 (FIGS. 10-17), and/or recipient account 1062 (FIGS. 10-17).

In several embodiments, the debit call can include various elements in the response messages (e.g., messages 1174 (FIG. 11), 1273 (FIG. 12), 1473 (FIG. 14), 1674 (FIG. 16), and/or 1774 (FIG. 17)). The debit response can come from the sending participant 1040 (FIGS. 10-17) in response to the payment debit inquiry. If transaction system 1050 (FIGS. 10-17) receives this response then it can be forwarded to the application service provider (e.g., 1030 (FIGS. 10-12), 1330 (FIGS. 13-14), and/or 1530 (FIGS. 15-17). However, in some embodiments, if the application service provider (e.g., 1030 (FIGS. 10-12), 1330 (FIGS. 13-14), and/or 1530 (FIGS. 15-17) receives this response, it is not forwarded to transaction system 1050 (FIGS. 10-17). In other embodiments, the response can be forwarded to transaction system 1050 (FIGS. 10-17). In some embodiments, various elements in the response (e.g., messages 1174 (FIG. 11), 1273 (FIG. 12), 1473 (FIG. 14), 1674 (FIG. 16), and/or 1774 (FIG. 17)) of the debit call can include:
a. Message wrapper fields: This section of the response message can fields, such as transaction ID, transaction date, etc.
b. Debit block: This section of the response message can return fields from sending participant 1040 (FIGS. 10-17), which maintains sender account 1041 (FIGS. 10-17) for sender 1010 (FIGS. 10-17). Data elements can include: a payment guarantee flag, a payment guarantee expiration date, and reason codes if the payment guarantee is not offered.

In some embodiments, the credit call, also known as the promise-to-pay, can be sent to receiving participant 1060 (FIGS. 10-17), after the debit call has been successfully executed and payment guarantee was offered. In some embodiments, the structure of the credit call can leverage the same Inquiry framework that has already been developed and used for Deposit Chek® Direct, offered by Early Warning Services, LLC. In a number of embodiments, the process can be handled through transaction system 1050 (FIGS. 10-17). If transaction system 1050 (FIG. 1017) does the debit call then can forward the debit call to the application service provider (e.g., 1030 (FIGS. 10-12), 1330 (FIGS. 13-14), and/or 1530 (FIGS. 15-17), and then the application service provider (e.g., 1030 (FIGS. 10-12), 1330 (FIGS.

13-14), and/or 1530 (FIGS. 15-17) can send the credit call to transaction system 1050 (FIGS. 10-17).

In several embodiments, the credit call can include various elements in the inquiry messages (e.g., messages 1176-1177 (FIG. 11), 1274-1275 (FIG. 12), 1474-1475 (FIG. 14), 1676-1677 (FIG. 16), and/or 1776 (FIG. 17)). In some embodiments, the credit call inquiry can be sent through transaction system 1050 (FIGS. 10-17). The various elements of the inquiry of the credit call (e.g., messages 1176-1177 (FIG. 11), 1274-1275 (FIG. 12), 1474-1475 (FIG. 14), 1676-1677 (FIG. 16), and/or 1776 (FIG. 17) can include:

a. Message wrapper fields: This section of the response message can fields, such as transaction ID, transaction date, etc.

b. Payment item block: This section of the inquiry message can provide information on the item (e.g., a credit card payment) for which the consumer wishes to make a payment. Data elements can include billing account information, customer PII, etc.

In several embodiments, the credit call can include various elements in the response messages (e.g., messages 1178-1180 (FIG. 11), 1276-1278 (FIG. 12), 1476-1478 (FIG. 14), 1678-1680 (FIG. 16), and/or 1777-1778 (FIG. 17)), such as:

a. Message wrapper fields: This section of the response message can fields, such as transaction ID, transaction date, etc.

b. Payment item block: This section of the response message can return fields from the receiving participant 1060 (FIGS. 10-17), which in some instances can be the biller. Data elements can include a payment credit success flag, reason codes if credit is not successful, customer message fields, customer support phone numbers, and other optional fields on billing account 1061 (FIGS. 10-17) for the customer (e.g., sender 1010 (FIGS. 10-17)).

In some embodiments, logging and monitoring can be provided in transaction system 1050 (FIGS. 10-17). In a number of embodiments, incoming and outgoing message data can be logged so that the information can be available for billing, statistical and reporting, and/or client logs, if applicable. In some embodiments, transaction system 1050 (FIGS. 10-17) can include logging, which can advantageously provide at one or more of the following advantages, among other benefits:

a. Log message data at a switch of transaction system 1050 (FIGS. 10-17) can be made available for research, corporate, and/or client reporting purposes.

b. Message validation or communication failures between transaction system 1050 (FIGS. 10-17) on one hand, and receiving sending participant 1040 (FIGS. 10-17) and/or receiving participant 1060 (FIGS. 10-17) on the other hand, can be logged to new logs so they are made available for alerting.

c. Failures can be logged at transaction system 1050 (FIGS. 10-17) for messages, which can allow alerts to be triggered based on severity. Logged data can be used for research purposes.

d. Logging can allow transaction system 1050 (FIGS. 10-17) to reconcile messages for billing (such as reversals and other types of transactions).

e. System monitoring of transactions for various issues such as excessive timeouts, invalid message formats, etc. can be provided, and alerts can be provided in real-time.

In a number of embodiments, the financial institutions, such as sending recipient 1040 (FIGS. 10-17) and/or receiving recipient 1060 (FIGS. 10-17), can include logging, which can provide pertinent detail on summary of counts and response times at transaction system 1050 (FIGS. 10-17).

In a number of embodiments, connectivity can exist between participants, such as participating financial institutions (sending recipient 1040 (FIGS. 10-17) and/or receiving recipient 1060 (FIGS. 10-17)), and application service providers, (e.g., application service provider 1030 (FIGS. 10-12)). Dedicated circuits can be implemented to establish new connections or to supplement if existing pipe capacity of transaction system 1050 (FIG. 10—is already maxed out.

In a number of embodiments, transaction system 1050 (FIGS. 10-17) can assess if connectivity with capacity already exists or new pipes need to be established to support connectivity needs. New participants, such as a new one of application service provider 1030 (FIGS. 10-12), can be provided new connectivity. In some embodiments, one or more of the following capabilities, among others, can be facilitated via the dedicated circuits:

a. Real-time messaging capability between participants supporting the following message types:
        i. Account real-time capable call
        ii. Debit call
        iii. Credit call
        iv. Reversal call b. FTP connections established for reporting and activity payment file transfer.

c. Web service connections for reporting and dashboard sharing.

In many embodiments, transaction system 1050 (FIGS. 10-17) can host and maintain a biller directory for message routing purposes. This directory can be complimentary to a biller directory of application service provider 1030 (FIGS. 10-12). This directory can link billers to financial institutions (1040 (FIGS. 10-17) and/or receiving recipient 1060 (FIGS. 10-17)), and can be updated with the "is account real-time capable call" response information.

In some of to the settlement types described above, or in addition to the settlement types described above, in various embodiments, settlement can occur between sending participant 1040 (FIGS. 10-17) and receiving participant 1060 (FIGS. 10-17) using conventional methods (e.g., existing rails) to move the money from sending participant 1040 (FIGS. 10-17) to receiving participant (FIGS. 10-17). In many embodiments, transaction system 1050 (FIGS. 10-17) can send batch files to the financial institutions (e.g., the sending participant 1040 (FIGS. 10-17) and/or the receiving participant 1060 (FIGS. 10-17)) with reconciliation information.

In a number of embodiments, application service provider 1030 (FIGS. 10-12) can serve as a third party settlement agent and send reconciliation files, and settlement can be handled by application service provider 1030 (FIGS. 10-12). In some embodiments, reconciliation information can be sent from application service provider 1030 (FIGS. 10-12) to sending participant 1040 (FIGS. 10-17) and/or receiving participant 1060 (FIGS. 10-17).

In various embodiments, a third party settlement agent can be different from application service provider 1330 (FIGS. 13-14) when application service provider is the same entity as sending participant 1040 (FIGS. 10-17). The third party settlement agent can settle the transaction without being involved in the payment messages.

In various embodiments, settlement can be handled by transaction system 1050 (FIGS. 10-17). In some embodiments, transaction system 1050 (FIGS. 10-17) can include a payment/settlement system, which can provide movement of funds between financial institutions (e.g., sending participant 1040 (FIGS. 10-17) and/or receiving participant 1060 (FIGS. 10-17)), the ability to view transactions, the ability to reconcile transactions, the posting of files to the Federal Reserve, and network fee settlement, among other benefits.

In many embodiments, in the response of the "is account real-time capable call," receiving participant 1060 (FIGS. 10-17) and/or the recipient/biller can indicate the manner in which they prefer to settle the transaction, which can be their most desired settlement method. For example, it could be through a card network, through the ACH system, or it could be through a payment/settlement system of transaction system 1050 (FIGS. 10-17). This settlement method can be included in the response message (e.g., messages 1074, 1076-1078 (FIG. 10), 1374-1376 (FIG. 13), and/or messages 1574-1576 (FIG. 15)).

In a number of embodiments, receiving participant 1060 (FIGS. 10-17) can select whether it prefers clearing and settlement for each individual item or in groups. Once the debit call process occurs, funds can be taken out of sender account 1041 (FIGS. 10-17) to pay the bill. These funds are then moved for the credit push notification. In some embodiments, the funds can be made available within a few seconds. The actual transfer of funds between the financial institutions can occur through the day, multiple times a day, such as every minute, every 5 seconds, every 3 seconds, every second, and/or for every transaction. This can occur within a few seconds up to multiple times throughout the day. Unlike conventional methods and system, in which transactions are done in batch and net settled, transaction can be individually settled. In some embodiments, the payment/settlement system of transaction system 1050 (FIGS. 10-17) can allow for single transactions to be settled in real-time. In other embodiments, debit networks or other suitable settlement rails can be used. There can be settlement instructions provided by the biller and/or receiving participant 1060 (FIGS. 10-17), indicating how they prefer the transaction to be settled.

In some embodiments, transaction system 1050 (FIGS. 10-17) can allow for a sending participant 1040 (FIGS. 10-17) or receiving participant 1060 (FIGS. 10-17) to receive a debit call success for a promise-to-pay, send a promise-to-pay, and/or transfer funds (e.g., settle funds) to or from a financial institution that is not a participant (e.g., not a sending participant 1040 (FIGS. 10-17) or receiving participant 1060 (FIGS. 10-17)). For example, transaction system 1050 (FIGS. 10-17) can convert messages to one or more other protocols for real-time funds transfer or real-time promise-to-pay, such as Visa Original Credit Transaction (OCT) transactions to push funds to a non-participating financial institution, or a Visa Account Funding Transaction (AFT) transaction to pull funds from a non-participating financial institution, or a debit transaction message, or other suitable protocols. In some embodiments, transaction system 1050 (FIGS. 10-17) can include a directory for non-participating financial institutions, which can provide transaction system 1050 (FIGS. 10-17) with information on how to connect to the non-participating financial institution. In a number of embodiments, transaction system 1050 (FIGS. 10-17) can allow for international payment in a similar manner, such as by using a suitable protocol, such as the SWIFT (Society for Worldwide Interbank Financial Telecommunication) wire network, Visa, MasterCard, PayPal, Alibaba Secure Payment, etc.

Figure 18:
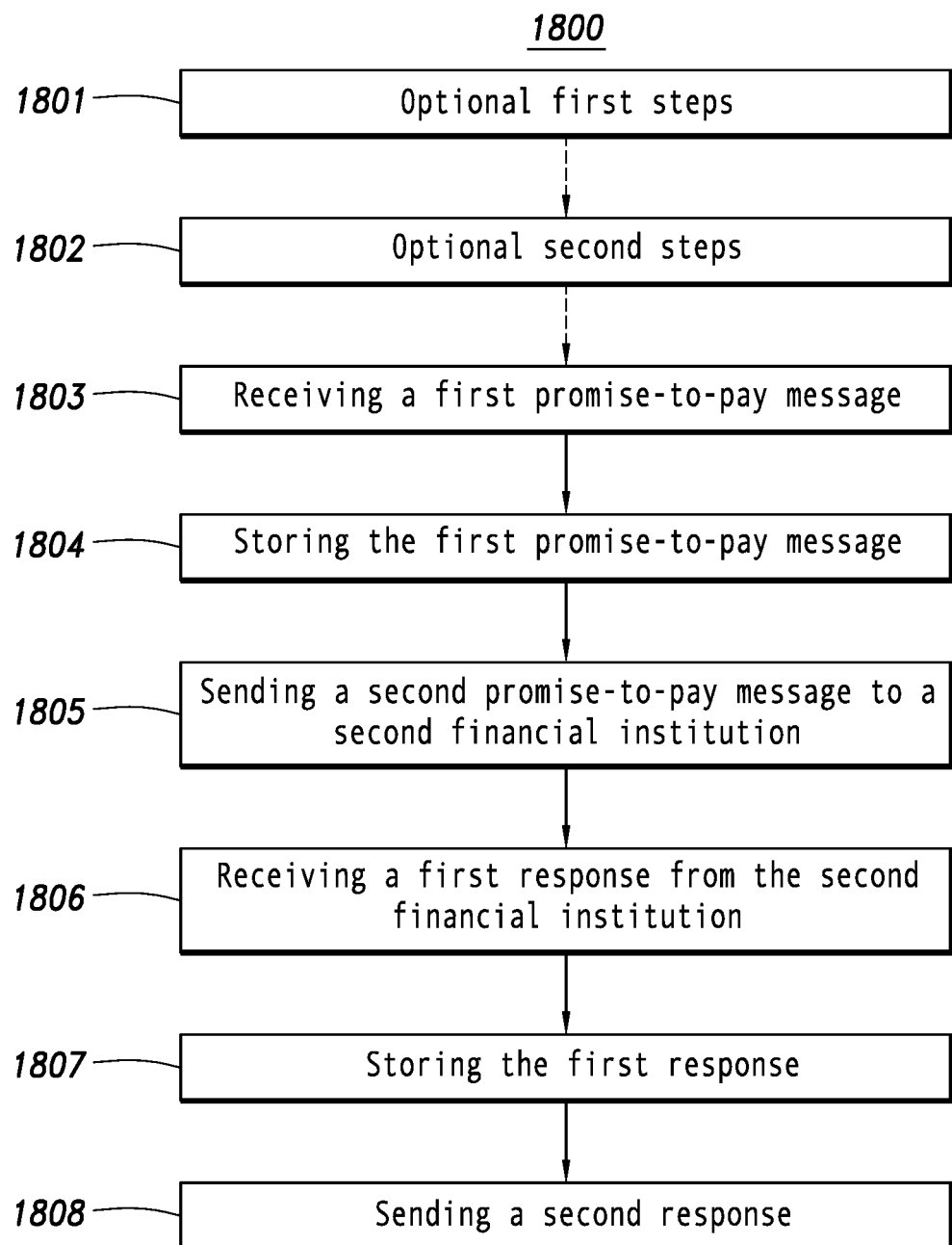
FIG. 18 illustrates a flow chart for a method to facilitate a real-time funds availability bill-pay transaction, according to an embodiment.

Turning ahead in the drawings, FIG. 18 illustrates a flow chart for a method 1800 to facilitate a real-time funds availability bill-pay transaction, according to an embodiment. Method 1800 is merely exemplary and is not limited to the embodiments presented herein. Method 1800 can be employed in many different embodiments or examples not specifically depicted or described herein. In some embodiments, the procedures, the processes, and/or the activities of method 1800 can be performed in the order presented. In other embodiments, the procedures, the processes, and/or the activities of method 1800 can be performed in any suitable order. In still other embodiments, one or more of the procedures, the processes, and/or the activities of method 1800 can be combined or skipped. In some embodiments, method 1800 can be performed by transaction system 1050 (FIGS. 10-17).

Figure 19:
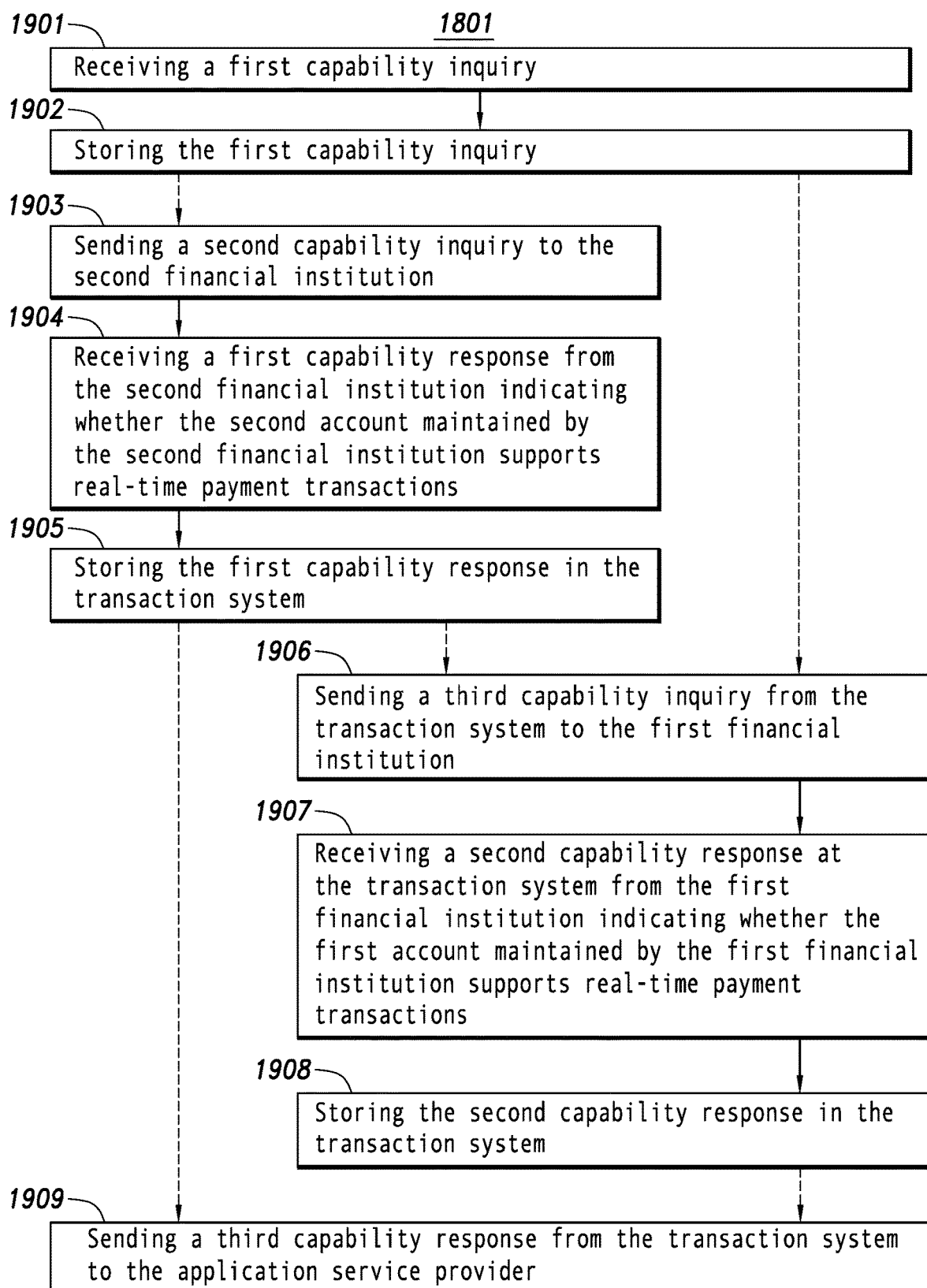
FIG. 19 illustrates a block of optional first steps, according to the embodiment of FIG. 18.

Referring to FIG. 18, method 1800 can include a block 1801 of optional first steps, as shown in FIG. 19 and described below. In some embodiments, method 1800 can skip block 1801 of optional first steps.

Figure 20:
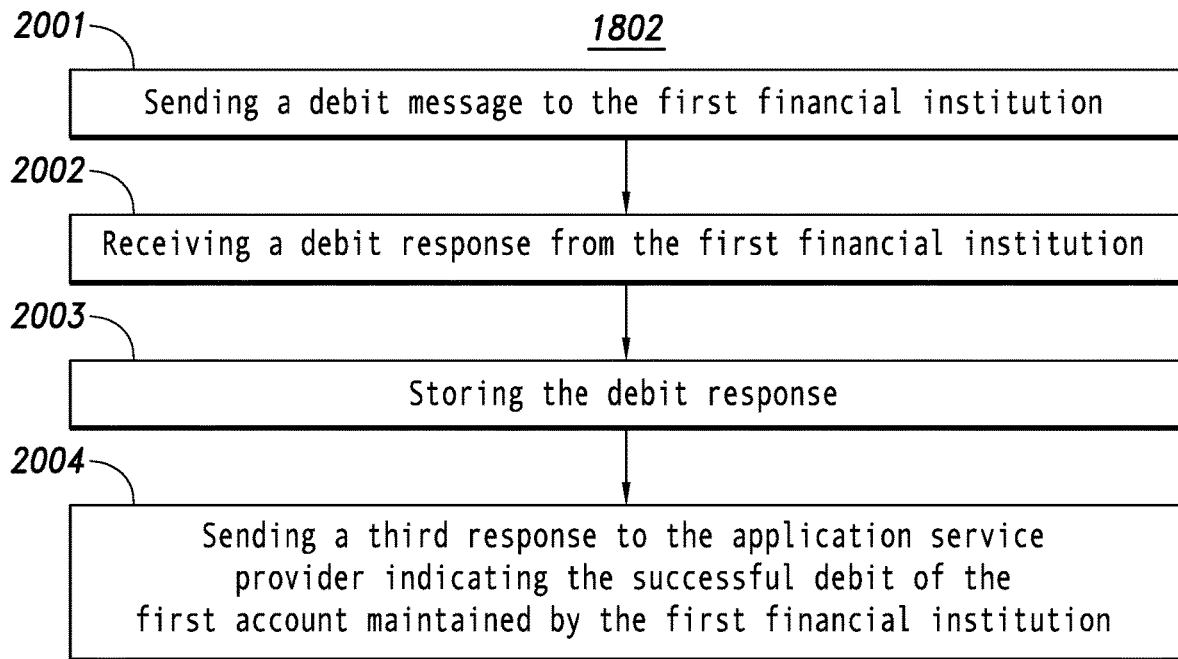
FIG. 20 illustrates a block of optional second steps, according to the embodiment of FIG. 18.

In a number of embodiments, method 1800 also can include a block 1802 of optional second steps, as shown in FIG. 20 and described below. In some embodiments, method 1800 can skip block 1802 of optional second steps.

In several embodiments, method 1800 additionally can include a block 1803 of receiving a first promise-to-pay message at a transaction system. The first promise-to-pay message can be similar or identical to messages 1176 (FIG. 11), 1274 (FIG. 12), 1474 (FIG. 14), and/or 1676 (FIG. 16). The transaction system can be similar or identical to transaction system 1050 (FIGS. 10-17). In some embodiments, the first promise-to-pay message can be based on a successful debit of a first account maintained by a first financial institution. The first financial institution can be similar or identical to sending participant 1040 (FIGS. 10-17). The first account can be similar or identical to sender account 1041 (FIGS. 10-17). The successful debit can be similar or identical to activity 1145 (FIGS. 11-12, 14, 16-17). In many embodiments, the successful debit of the first account can be based on a payment authorization made by a sender at a payment authorization time. The payment authorization can be to authorize the payment of one or more bills and/or other financial obligations. The payment authorization time can be the time in which the sender authorized the bill payment transaction. The sender can be similar or identical to sender 1010 (FIGS. 10-17), who can use sender system 1020 (FIGS. 10-17). The payment authorization can be communicated from sender system 1020 (FIGS. 10-17) in messages 1171 (FIG. 11), 1271 (FIG. 12), 1471 (FIG. 14), and/or 1671 (FIG. 16). In several embodiments, the first account can be held by the sender, such that the sender is the account holder of the first account.

In some embodiments, the first promise-to-pay message can be sent to the transaction system from an application service provider. The application service provider can be similar or identical to application service provider 1030 (FIGS. 10-12), application service provider 1330 (FIGS. 13-14), and/or application service provider 1530 (FIGS. 15-17). In many embodiments, the application service provider can host a payment application that can be accessed by the sender to perform the payment authorization. The payment application can be similar or identical to payment application 1031 (FIGS. 10-12), payment application 1331 (FIGS. 13-14), and/or payment application 1531 (FIGS. 15-17).

In a number of embodiments, method 1800 further can include a block 1804 of storing the first promise-to-pay message in the transaction system.

In several embodiments, method 1800 additionally can include a block 1805 of sending a second promise-to-pay message from the transaction system to a second financial institution. The second promise-to-pay message can be similar or identical to messages 1177 (FIG. 11), 1275 (FIG. 12), 1475 (FIG. 14), and/or 1677 (FIG. 16). The second financial institution can be similar or identical to receiving participant 1060 (FIGS. 10-17). In some embodiments, the second promise-to-pay message can be based on the first promise-to-pay message, such that the second financial institution can credit a second account maintained by the second financial institution to make funds available in the second account in real-time after the payment authorization time. The second account can be similar or identical to billing account 1061 (FIGS. 10-17) and/or recipient account 1062 (FIGS. 10-17). In various embodiments, the sender can be financially liable for the second account. In some embodiments, the first financial institution can be different from the second financial institution.

In a number of embodiments, method 1800 further can include a block 1806 of receiving a first response at the transaction system from the second financial institution indicating a successful credit of the second account maintained by the second financial institution. The first response can be similar or identical to 1178 (FIG. 11), 1276 (FIG. 12), 1476 (FIG. 14), and/or 1678 (FIG. 16). The successful credit can be similar or identical to activity 1165 (FIGS. 11-12, 14, 16-17) and/or activity 1167 (FIGS. 11-12, 14, 16-17).

In several embodiments, method 1800 additionally can include a block 1807 of storing the first response in the transaction system.

In a number of embodiments, method 1800 further can include a block 1808 of sending a second response from the transaction system indicating the successful credit of the second account maintained by the second financial institution to inform at least the sender in real-time after the payment authorization time of the successful credit of the second account maintained by the second financial institution. The second response can be similar or identical to messages 1179 (FIG. 11), 1277 (FIG. 12), 1477 (FIG. 14), and/or 1679 (FIG. 16). The sender can be informed by messages 1180 (FIG. 11), 1278 (FIG. 12), 1478 (FIG. 14), and/or 1680 (FIG. 16).

In some embodiments, the application service provider can be a different entity from the first and second financial institutions, such as application service provider 1030 (FIGS. 10-12). In other embodiments, the application service provider can be the same entity as the first financial institution, such as application service provider 1330 (FIGS. 13-14). In yet other embodiments, the application service provider can be the same entity as the second financial institution, such as application service provider 1530 (FIGS. 15-17).

In various embodiments, the first promise-to-pay message received at the transaction system from the application service provider can be based on the application service provider having sent a debit message to the first financial institution to debit the first account maintained by the first financial institution and having received a debit response from the first financial institution in real-time after the payment authorization time. The debit message can be similar or identical to message 1272 (FIG. 12) and/or 1472 (FIG. 14). The debit response can be similar or identical to message 1273 (FIG. 12) and/or message 1473 (FIG. 14). In some embodiments, the debit response can indicate the successful debit of the first account maintained by the first financial institution.

In many embodiments, the first financial institution can maintain a first settlement account. The first settlement account can be similar or identical to sending participant settlement account 1042 (FIGS. 10-17). In a number of embodiments, the first settlement account can be credited to account for the successful debit of the first account maintained by the first financial institution, such as in activity 1146 (FIGS. 11-12, 14, 16-17).

In several embodiments, the second financial institution can maintain a second settlement account. The second settlement account can be similar or identical to receiving participant settlement account 1063 (FIGS. 10-17). The second settlement account can be debited to account for the successful credit of the second account maintained by the second financial institution, such as in activity 1166 (FIGS. 11-12, 14, 16-17).

In several embodiments, funds can be transferred from the first settlement account to the second settlement account in a settlement completion. The settlement completion can be similar or identical to activities 1191 (FIGS. 11-12), 1192 (FIGS. 11-12), and/or 1491 (FIGS. 14, 16-17). In some embodiments, the settlement completion can be part of a net settlement as a single item ACH. In other embodiments, the settlement completion can be part of a net settlement as part of a batch ACH. In yet other embodiments, the settlement completion can be part of a net settlement as part of a wire advice file. In some embodiments, the successful credit of the second account maintained by the second financial institution can involve a hard credit to the second account in real-time after the payment authorization time. In various embodiments, the settlement completion can involve the funds being transferred through a third settlement account of a payment processor. The third settlement account can be similar or identical to payment processor settlement account 1033 (FIGS. 10-12). In some embodiments, the settlement completion can occur in real-time after the payment authorization time.

Turning ahead in the drawings, FIG. 19 illustrates a block 1801 of optional first steps, according to an embodiment. Block 1801 is merely exemplary and is not limited to the embodiments presented herein. Block 1801 can be employed in many different embodiments or examples not specifically depicted or described herein. In some embodiments, the procedures, the processes, and/or the activities of block 1801 can be performed in the order presented. In other embodiments, the procedures, the processes, and/or the activities of block 1801 can be performed in any suitable order. In still other embodiments, one or more of the procedures, the processes, and/or the activities of block 1801 can be combined or skipped. In many embodiments, block 1801 can be performed before the payment authorization time.

Referring to FIG. 19, block 1801 can include a block 1901 of receiving a first capability inquiry at the transaction system from the application service provider. The first capability inquiry can be similar or identical to messages 1072 (FIG. 10), 1372 (FIG. 13), and/or 1572 (FIG. 15).

In a number of embodiments, block 1801 also can include a block 1902 of storing the first capability inquiry in the transaction system.

In several embodiments, block 1801 optionally can include a block 1903 of sending a second capability inquiry from the transaction system to the second financial institution to determine whether the second account maintained by the second financial institution supports real-time payment transactions. The second capability inquiry can be similar or identical to messages 1073 (FIG. 10) and/or 1373 (FIG. 13).

In a number of embodiments, block 1801 also can include, after block 1903, a block 1904 of receiving a first capability response at the transaction system from the second financial institution indicating whether the second account maintained by the second financial institution supports real-time payment transactions. The first capability response can be similar or identical to messages 1074 (FIG. 10) and/or 1374 (FIG. 13).

In several embodiments, block 1801 additionally can include, after block 1904, a block 1905 of storing the first capability response in the transaction system.

In a number of embodiments, block 1801 optionally can include, after block 1902 or block 1905, a block 1906 of sending a third capability inquiry from the transaction system to the first financial institution to determine whether the first account maintained by the first financial institution supports real-time payment transactions. The third capability inquiry can be similar or identical to messages 1075 (FIG. 10) and/or 1573 (FIG. 15).

In several embodiments, block 1801 also can include, after block 1906, a block 1907 of receiving a second capability response at the transaction system from the first financial institution indicating whether the first account maintained by the first financial institution supports real-time payment transactions. The second capability response can be similar or identical to messages 1076 (FIG. 10) and/or 1574 (FIG. 15).

In a number of embodiments, block 1801 further can include, after block 1907, a block 1908 of storing the second capability response in the transaction system.

In several embodiments, block 1801 additionally can include, after block 1905 or block 1908, a block 1909 of sending a third capability response from the transaction system to the application service provider. In some embodiments, the third capability response can indicate whether the first and second accounts support real-time payment transactions, such as in message 1077 (FIG. 11). In other embodiments, the third capability response can indicate whether the second account supports real-time payment transactions, such as in message 1375 (FIG. 13). In yet other embodiments, the third capability response can indicate whether the first account supports real-time payment transactions, such as in message 1575 (FIG. 15).

Turning ahead in the drawings, FIG. 20 illustrates a block 1802 of optional second steps, according to an embodiment. Block 1802 is merely exemplary and is not limited to the embodiments presented herein. Block 1802 can be employed in many different embodiments or examples not specifically depicted or described herein. In some embodiments, the procedures, the processes, and/or the activities of block 1802 can be performed in the order presented. In other embodiments, the procedures, the processes, and/or the activities of block 1802 can be performed in any suitable order. In still other embodiments, one or more of the procedures, the processes, and/or the activities of block 1802 can be combined or skipped. In many embodiments, block 1802 can occur before the payment authorization time. In many embodiments, block 1802 can be performed before receiving the first promise-to-pay message in block 1803 (FIG. 18).

Referring to FIG. 20, block 1802 can include a block 2001 of sending a debit message from the transaction system to the first financial institution to debit the first account maintained by the first financial institution. The debit message can be similar or identical to messages 1173 (FIG. 11) and/or 1673 (FIG. 16).

In a number of embodiments, block 1802 also can include a block 2002 of receiving a debit response at the transaction system from the first financial institution in real-time after the payment authorization time. The debit response can be similar or identical to messages 1174 (FIG. 11) and/or 1674 (FIG. 16). In some embodiments, the debit response can indicate the successful debit of the first account maintained by the first financial institution.

In several embodiments, block 1802 additionally can include a block 2003 of storing the debit response in the transaction system.

In a number of embodiments, block 1802 further can include a block 2004 of sending a third response from the transaction system to the application service provider indicating the successful debit of the first account maintained by the first financial institution. The third response can be similar or identical to messages 1175 (FIG. 11) and/or FIG. 1675 (FIG. 16).

Figure 21:
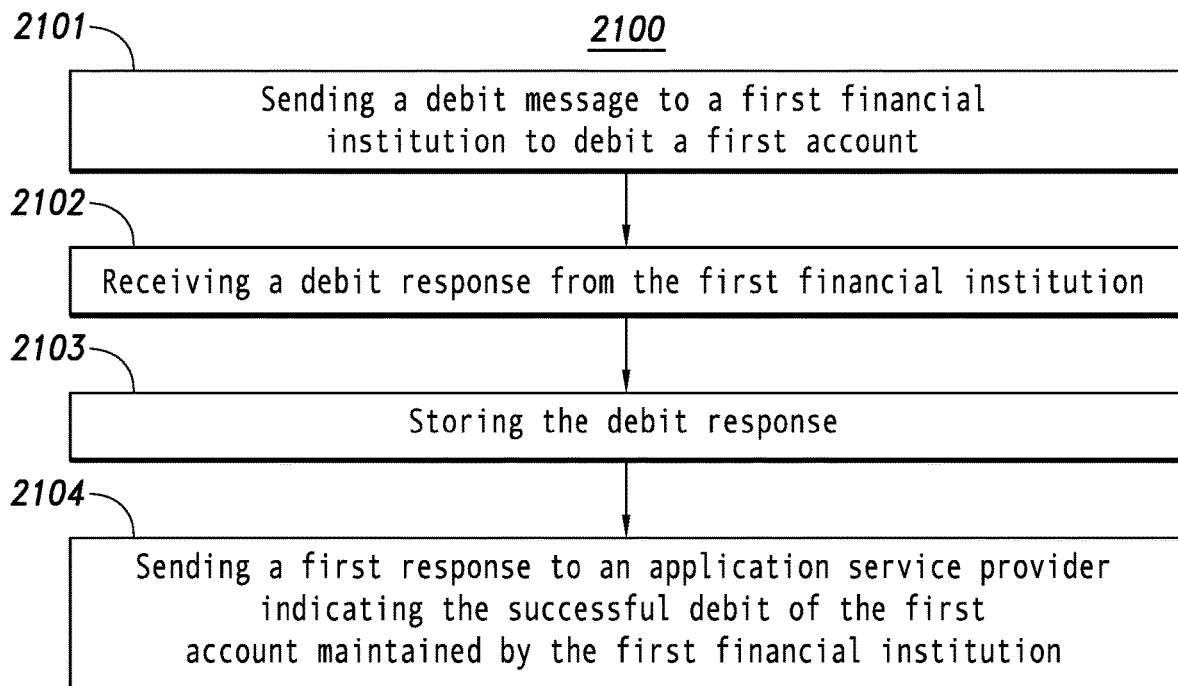
FIG. 21 illustrates a flow chart for a method to facilitate a real-time funds availability bill-pay transaction, according to another embodiment.

Proceeding to the next drawing, FIG. 21 illustrates a flow chart for a method 2100 to facilitate a real-time funds availability bill-pay transaction, according to an embodiment. Method 2100 is merely exemplary and is not limited to the embodiments presented herein. Method 2100 can be employed in many different embodiments or examples not specifically depicted or described herein. In some embodiments, the procedures, the processes, and/or the activities of method 2100 can be performed in the order presented. In other embodiments, the procedures, the processes, and/or the activities of method 2100 can be performed in any suitable order. In still other embodiments, one or more of the procedures, the processes, and/or the activities of method 2100 can be combined or skipped. In some embodiments, method 2100 can be performed by transaction system 1050 (FIGS. 10-17).

Referring to FIG. 21, method 2100 can include a block 2101 of sending a debit message from a transaction system to a first financial institution to debit a first account maintained by the first financial institution based on a payment authorization made by a sender at a payment authorization time. The debit message can be similar or identical to message 1773 (FIG. 17). The transaction system can be similar or identical to transaction system 1050 (FIGS. 10-17). The first financial institution can be similar or identical to sending participant 1040 (FIGS. 10-17). The first account can be similar or identical to sender account 1041 (FIGS. 10-17). The payment authorization time can be the time in which the sender authorized the bill payment transaction. The sender can be similar or identical to sender 1010 (FIGS. 10-17), who can use sender system 1020 (FIGS. 10-17). The payment authorization can be communicated from sender system 1020 (FIGS. 10-17) in message 1771 (FIG. 17). In many embodiments, the first account can be held by the sender, such that the sender is the account holder of the first account.

In a number of embodiments, method 2100 also can include a block 2102 of receiving a debit response at the transaction system from the first financial institution in real-time after the payment authorization time. The debit response can be similar or identical to debit response 1774 (FIG. 17). In some embodiments, the debit response can indicate a successful debit of the first account maintained by the first financial institution. The successful debit can be similar or identical to activity 1145 (FIGS. 11-12, 14, 16-17).

In several embodiments, method 2100 additionally can include a block 2103 of storing the debit response in the transaction system.

In a number of embodiments, method 2100 further can include a block 2104 of sending a first response to an application service provider indicating the successful debit of the first account maintained by the first financial institution, such that the application service provider sends a promise-to-pay message to a second financial institution to credit a second account maintained by the second financial institution to make funds available in the second account in real-time after the payment authorization time, and such that the application service provider informs the sender in real-time after the payment authorization time of a successful credit of the second account maintained by the second financial institution. The first response can be similar or identical to message 1775 (FIG. 17). The application service provider can be similar or identical to application service provider 1530 (FIGS. 15-17). The successful credit can be similar or identical to activity 1165 (FIGS. 11-12, 14, 16-17) and/or activity 1167 (FIGS. 11-12, 14, 16-17). In many embodiments, the application service provider can be the same entity as the second financial institution. The promise-to-pay message can be similar or identical to message 1776 (FIG. 17). The second financial institution can be similar or identical to receiving participant 1060 (FIGS. 10-17). The second account can be similar or identical to billing account 1061 (FIGS. 10-17) and/or recipient account 1062 (FIGS. 10-17). In various embodiments, the sender can be financially liable for the second account. In some embodiments, the first financial institution can be different from the second financial institution.

In many embodiments, the application service provider can host a payment application that is accessed by the sender to perform the payment authorization. The payment application can be similar or identical to payment application 1531 (FIGS. 15-17).

In many embodiments, the first financial institution can maintain a first settlement account. The first settlement account can be similar or identical to sending participant settlement account 1042 (FIGS. 10-17). In a number of embodiments, the first settlement account can be credited to account for the successful debit of the first account maintained by the first financial institution, such as in activity 1146 (FIGS. 11-12, 14, 16-17).

In several embodiments, the second financial institution can maintain a second settlement account. The second settlement account can be similar or identical to receiving participant settlement account 1063 (FIGS. 10-17). The second settlement account can be debited to account for the successful credit of the second account maintained by the second financial institution, such as in activity 1166 (FIGS. 11-12, 14, 16-17).

In several embodiments, funds can be transferred from the first settlement account to the second settlement account in a settlement completion. The settlement completion can be similar or identical to activities 1191 (FIGS. 11-12), 1192 (FIGS. 11-12), and/or 1491 (FIGS. 14, 16-17). In some embodiments, the settlement completion can be part of a net settlement as a single item ACH. In other embodiments, the settlement completion can be part of a net settlement as part of a batch ACH. In yet other embodiments, the settlement completion can be part of a net settlement as part of a wire advice file. In some embodiments, the successful credit of the second account maintained by the second financial institution can involve a hard credit to the second account in real-time after the payment authorization time. In some embodiments, the settlement completion can occur in real-time after the payment authorization time.

Figure 22:
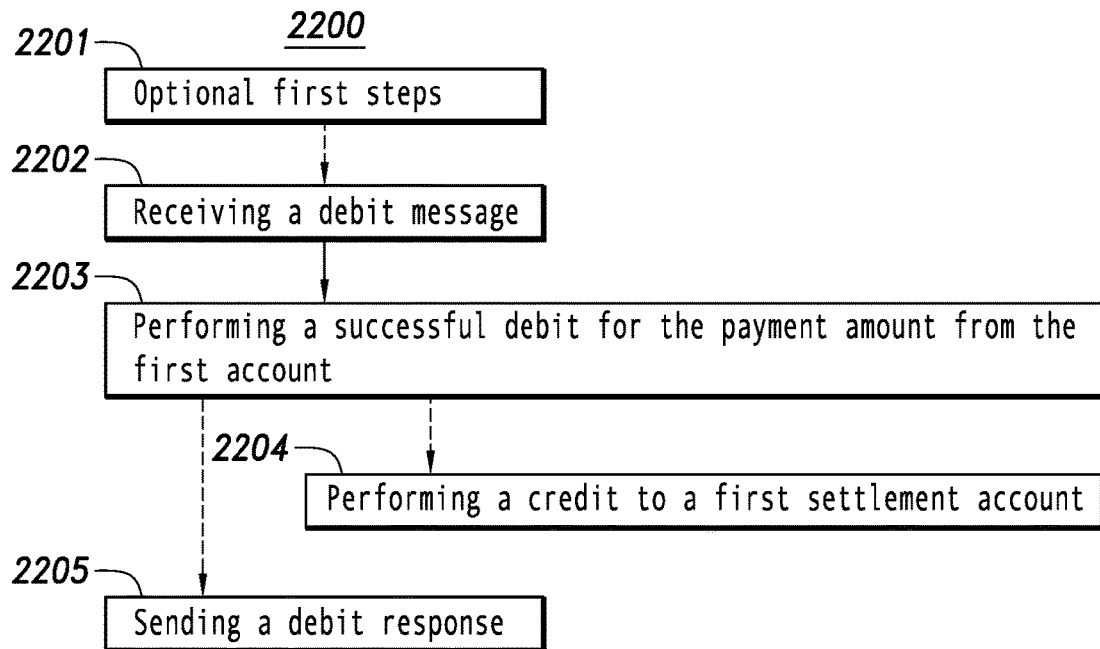
FIG. 22 illustrates a flow chart for a method to facilitate a real-time funds availability bill-pay transaction, according to another embodiment.

Turning ahead in the drawings, FIG. 22 illustrates a flow chart for a method 2200 to facilitate a real-time funds availability bill-pay transaction, according to an embodiment. Method 2200 is merely exemplary and is not limited to the embodiments presented herein. Method 2200 can be employed in many different embodiments or examples not specifically depicted or described herein. In some embodiments, the procedures, the processes, and/or the activities of method 2200 can be performed in the order presented. In other embodiments, the procedures, the processes, and/or the activities of method 2200 can be performed in any suitable order. In still other embodiments, one or more of the procedures, the processes, and/or the activities of method 2200 can be combined or skipped. In some embodiments, method 2200 can be performed by first financial institution 1040 (FIGS. 10-17).

Figure 23:
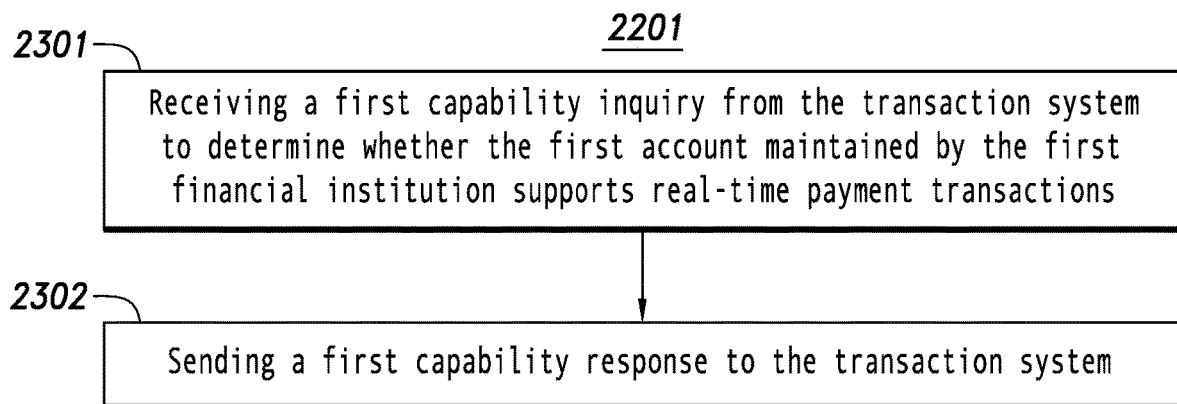
FIG. 23 illustrates a block of optional first steps, according to the embodiment of FIG. 22.

Referring to FIG. 22, method 2200 can include a block 2201 of optional first steps, as shown in FIG. 23 and described below. In some embodiments, method 2200 can skip block 2201 of optional first steps.

In a number of embodiments, method 2200 also can include a block 2202 of receiving a debit message at a first financial institution to debit a first account maintained by the first financial institution based on a payment authorization for a payment amount made by a sender at a payment authorization time. The debit message can be similar or identical to messages 1173 (FIG. 11), 1272 (FIG. 12), 1472 (FIG. 14), 1673 (FIG. 16), and/or 1773 (FIG. 17). The first financial institution can be similar or identical to sending participant 1040 (FIGS. 10-17). The first account can be similar or identical to sender account 1041 (FIGS. 10-17). The payment authorization time can be the time in which the sender authorized the bill payment transaction. The sender can be similar or identical to sender 1010 (FIGS. 10-17), who can use sender system 1020 (FIGS. 10-17). The payment authorization can be communicated from sender system 1020 (FIGS. 10-17) in messages 1171 (FIG. 11), 1271 (FIG. 12), 1471 (FIG. 14), 1671 (FIG. 16), and/or 1771 (FIG. 17). In several embodiments, the first account can be held by the sender, such that the sender is the account holder of the first account.

In several embodiments, method 2200 additionally can include a block 2203 of performing a successful debit for the payment amount from the first account maintained by the first financial institution in real-time after the payment authorization time. The successful debit can be similar or identical to activity 1145 (FIGS. 11-12, 14, 16-17).

In a number of embodiments, method 2200 optionally can include a block 2204 of performing a credit for the payment amount to a first settlement account maintained by the first financial institution to account for the successful debit of the first account maintained by the first financial institution. The first settlement account can be similar or identical to sending participant settlement account 1042 (FIGS. 10-17). The credit can be similar or identical to activity 1146 (FIGS. 11-12, 14, 16-17).

In a several embodiments, method 2200 further can include, after block 2203 or block 2204, a block 2205 of sending a debit response from the first financial institution in real-time after the payment authorization time. The debit response can be similar or identical to messages 1174 (FIG. 11), 1273 (FIG. 12), 1473 (FIG. 14), 1674 (FIG. 16), and/or 1774 (FIG. 17). In many embodiments, the debit response can indicate the successful debit of the first account maintained by the first financial institution, such that an application service provider sends a first promise-to-pay message for a second financial institution to credit a second account maintained by the second financial institution to make funds available in real-time after the second account in real-time after the payment authorization time, and such that the application service provider informs the sender in real-time after the payment authorization time of a successful credit of the second account maintained by the second financial institution.

The application service provider can be similar or identical to application service provider 1030 (FIGS. 10-12), application service provider 1330 (FIGS. 13-14), and/or application service provider 1530 (FIGS. 15-17). The first promise-to-pay messages can be similar or identical to messages 1176 (FIG. 11), 1274 (FIG. 12), 1474 (FIG. 14), 1676 (FIG. 16), and/or 1776 (FIG. 17). The second financial institution can be similar or identical to receiving participant 1060 (FIGS. 10-17). The second account can be similar or identical to billing account 1061 (FIGS. 10-17) and/or recipient account 1062 (FIGS. 10-17). The successful credit can be similar or identical to activity 1165 (FIGS. 11-12, 14, 16-17) and/or activity 1167 (FIGS. 11-12, 14, 16-17). The sender can be informed by messages 1180 (FIG. 11), 1278 (FIG. 12), 1478 (FIG. 14), 1680 (FIG. 16), and/or 1778 (FIG. 17). In various embodiments, the sender can be financially liable for the second account. In some embodiments, the first financial institution can be different from the second financial institution.

In some embodiments, the first promise-to-pay message can be sent to a transaction system from the application service provider. The transaction system can be similar or identical to transaction system 1050 (FIGS. 10-17). In many embodiments, the transaction system can send a second promise-to-pay message to the second financial institution based on the first promise-to-pay message. The second promise-to-pay message can be similar or identical to messages 1176 (FIG. 11), 1274 (FIG. 12), 1474 (FIG. 14), and/or 1676 (FIG. 16).

In other embodiments, the first promise-to-pay message can be sent from the application service provider to the second financial institution after the application service provider receives a second debit response indicating the successful debit of the first account maintained by the first financial institution. The second debit response can be similar or identical to message 1775 (FIG. 17).

In many embodiments, the application service provider can host a payment application that can be accessed by the sender to perform the payment authorization. The payment application can be similar or identical to payment application 1031 (FIGS. 10-12), payment application 1331 (FIGS. 13-14), and/or payment application 1531 (FIGS. 15-17).

In some embodiments, the application service provider can be a different entity from the first and second financial institutions, such as application service provider 1030 (FIGS. 10-12). In other embodiments, the application service provider can be the same entity as the first financial institution, such as application service provider 1330 (FIGS. 13-14). In yet other embodiments, the application service provider can be the same entity as the second financial institution, such as application service provider 1530 (FIGS. 15-17).

In some embodiments, the debit message can be received from the transaction system, such as in messages 1173 (FIG. 11), 1673 (FIG. 16), and/or 1773 (FIG. 17), and the debit response can be sent to the transaction system, such as in messages 1174 (FIG. 11), 1674 (FIG. 16), and/or 1774 (FIG. 17). In other embodiments, the debit message can be received from the application service provider, such as in messages 1272 (FIG. 12) and/or 1472 (FIG. 14), and the debit response can be sent to the transaction system, such as in messages 1273 (FIG. 12) and/or 1473 (FIG. 14).

In many embodiments, the first financial institution can maintain a first settlement account. The first settlement account can be similar or identical to sending participant settlement account 1042 (FIGS. 10-17). In a number of embodiments, the first settlement account can be credited to account for the successful debit of the first account maintained by the first financial institution, such as in activity 1146 (FIGS. 11-12, 14, 16-17).

In several embodiments, the second financial institution can maintain a second settlement account. The second settlement account can be similar or identical to receiving participant settlement account 1063 (FIGS. 10-17). The second settlement account can be debited to account for the successful credit of the second account maintained by the second financial institution, such as in activity 1166 (FIGS. 11-12, 14, 16-17).

In many embodiments, funds can be transferred from the first settlement account to the second settlement account in a settlement completion. The settlement completion can be similar or identical to activities 1191 (FIGS. 11-12), 1192 (FIGS. 11-12), and/or 1491 (FIGS. 14, 16-17). In some embodiments, the settlement completion can be part of a net settlement as a single item ACH. In other embodiments, the settlement completion can be part of a net settlement as part of a batch ACH. In yet other embodiments, the settlement completion can be part of a net settlement as part of a wire advice file. In some embodiments, the successful credit of the second account maintained by the second financial institution can involve a hard credit to the second account in real-time after the payment authorization time. In various embodiments, the settlement completion can involve the funds being transferred through a third settlement account of a payment processor. The third settlement account can be similar or identical to payment processor settlement account 1033 (FIGS. 10-12). In some embodiments, the settlement completion can occur in real-time after the payment authorization time.

Proceeding to the next drawing, FIG. 23 illustrates a block 2201 of optional first steps, according to an embodiment. Block 2201 is merely exemplary and is not limited to the embodiments presented herein. Block 2201 can be employed in many different embodiments or examples not specifically depicted or described herein. In some embodiments, the procedures, the processes, and/or the activities of block 2201 can be performed in the order presented. In other embodiments, the procedures, the processes, and/or the activities of block 2201 can be performed in any suitable order. In still other embodiments, one or more of the procedures, the processes, and/or the activities of block 2201 can be combined or skipped. In many embodiments, block 2201 can be performed before the payment authorization time.

Referring to FIG. 23, block 2201 can include a block 2301 of receiving a first capability inquiry at receiving a first capability inquiry at the first financial institution from the transaction system to determine whether the first account maintained by the first financial institution supports real-time payment transactions. The first capability inquiry can be similar or identical to messages 1075 (FIG. 10) and/or 1573 (FIG. 15).

In a number of embodiments, block 2201 also can include a block 2302 of sending a first capability response from the first financial institution to the transaction system indicating whether the first account maintained by the first financial institution supports real-time payment transactions, such that the transaction system sends a second capability response to the application service provider indicating whether the first account supports real-time payment transactions. The first capability response can be similar or identical to messages 1076 (FIG. 10) and/or 1574 (FIG. 15). The second capability response can be similar or identical to messages 1077 (FIG. 10) and/or 1575 (FIG. 15).

Figure 24:
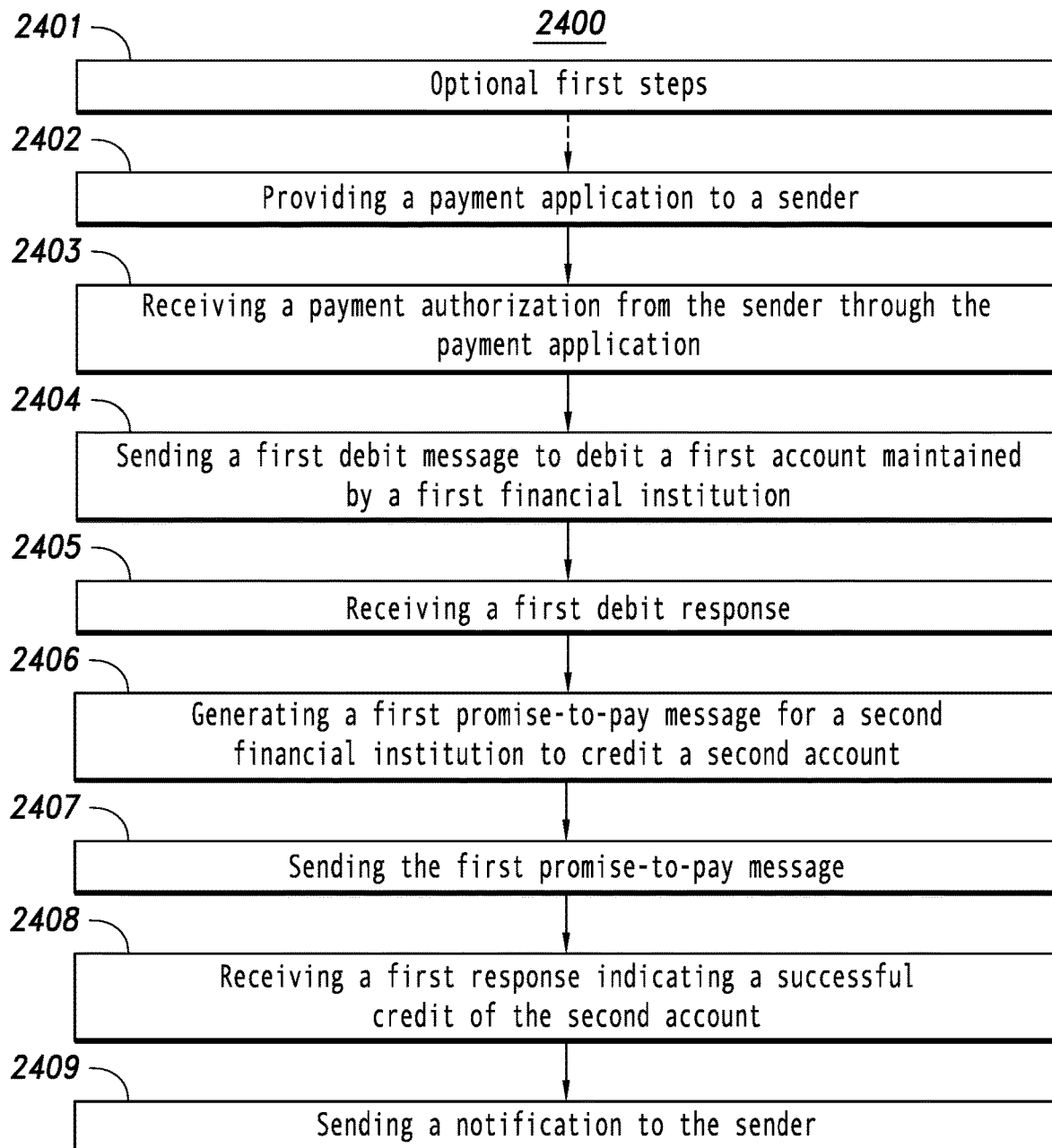
FIG. 24 illustrates a flow chart for a method to facilitate a real-time funds availability bill-pay transaction, according to another embodiment.

Turning ahead in the drawings, FIG. 24 illustrates a flow chart for a method 2400 to facilitate a real-time funds availability bill-pay transaction, according to an embodiment. Method 2400 is merely exemplary and is not limited to the embodiments presented herein. Method 2400 can be employed in many different embodiments or examples not specifically depicted or described herein. In some embodiments, the procedures, the processes, and/or the activities of method 2400 can be performed in the order presented. In other embodiments, the procedures, the processes, and/or the activities of method 2400 can be performed in any suitable order. In still other embodiments, one or more of the procedures, the processes, and/or the activities of method 2400 can be combined or skipped. In some embodiments, method 2400 can be performed by application service provider 1030 (FIGS. 10-12), application service provider 1330 (FIGS. 13-14), and/or application service provider 1530 (FIGS. 15-17).

Figure 25:
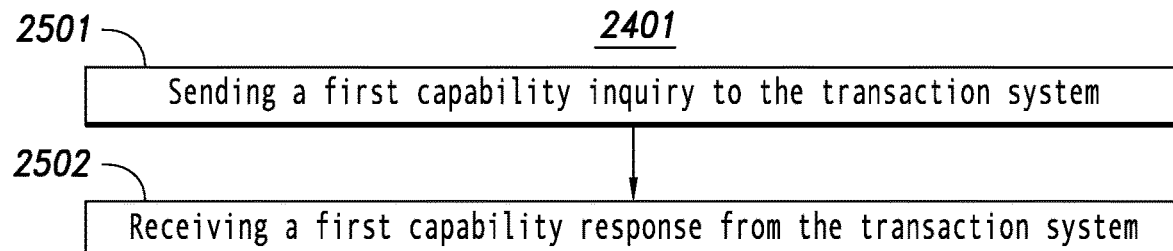
FIG. 25 illustrates a block of optional first steps, according to the embodiment of FIG. 24.

Referring to FIG. 24, method 2400 can include a block 2401 of optional first steps, as shown in FIG. 25 and described below. In some embodiments, method 2400 can skip block 2401 of optional first steps.

In a number of embodiments, method 2400 also can include a block 2402 of providing a payment application to a sender from an application service provider. The payment application can be similar or identical to payment application 1031 (FIGS. 10-12), payment application 1331 (FIGS. 13-14), and/or payment application 1531 (FIGS. 15-17). The sender can be similar or identical to sender 1010 (FIGS. 10-17), who can use sender system 1020 (FIGS. 10-17).

In several embodiments, method 2400 additionally can include a block 2403 of receiving a bill payment authorization from the sender through the payment application. The payment authorization can be communicated from sender system 1020 (FIGS. 10-17) in messages 1171 (FIG. 11), 1271 (FIG. 12), 1471 (FIG. 14), 1671 (FIG. 16), and/or 1771 (FIG. 17). In many embodiments, the bill payment authorization can be made by the sender at a payment authorization time. The payment authorization time can be the time in which the sender authorized the bill payment transaction.

In a number of embodiments, method 2400 further can include a block 2404 of sending a first debit message from the application service provider to debit a first account maintained by a first financial institution based on the bill payment authorization. The first debit message can be similar or identical to messages 1172 (FIG. 11), 1272 (FIG. 12), 1472 (FIG. 14), 1672 (FIG. 16), and/or 1772 (FIG. 17). The first account can be similar or identical to sender account 1041 (FIGS. 10-17). The first financial institution can be similar or identical to sending participant 1040 (FIGS. 10-17). In many embodiments, the first account can be held by the sender, such that the sender is the account holder of the first account.

In a several embodiments, method 2400 further can include a block 2405 of receiving a first debit response at the application service provider in real-time after the payment authorization time. The first debit response can be similar or identical to messages 1175 (FIG. 11), 1273 (FIG. 12), 1473 (FIG. 14), 1675 (FIG. 16), and/or 1775 (FIG. 17). In many embodiments, the debit response can indicate a successful debit of the first account maintained by the first financial institution. The successful debit can be similar or identical to activity 1145 (FIGS. 11-12, 14, 16-17).

In a number of embodiments, method 2400 further can include a block 2406 of generating a first promise-to-pay message for a second financial institution to credit a second account maintained by the second financial institution to make funds available in the second account in real-time after the payment authorization time. The first promise-to-pay message can be similar or identical to messages 1176 (FIG. 11), 1274 (FIG. 12), 1474 (FIG. 14), 1676 (FIG. 16), and/or 1776 (FIG. 17). The second financial institution can be similar or identical to receiving participant 1060 (FIGS. 10-17). The second account can be similar or identical to billing account 1061 (FIGS. 10-17) and/or recipient account 1062 (FIGS. 10-17). In various embodiments, the sender can be financially liable for the second account. In many embodiments, the first promise-to-pay message can be based on the successful debit of the first account maintained by the first financial institution. In many embodiments, the first financial institution can be different from the second financial institution.

In a several embodiments, method 2400 further can include a block 2407 of sending the first promise-to-pay message. In some embodiments, the first promise-to-pay message can be sent from the application service provider to a transaction system, such as in messages 1176 (FIG. 11), 1274 (FIG. 12), 1474 (FIG. 14), and/or 1676 (FIG. 16). In many embodiments, a second promise-to-pay message can be sent by the transaction system to the second financial institution based on the first promise-to-pay message. The second promise-to-pay message can be similar or identical to 1177 (FIG. 11), 1275 (FIG. 12), 1475 (FIG. 14), and/or 1677 (FIG. 16). In other embodiments, the first promise-to-pay message can be sent from the application service provider to the second financial institution, such as in message 1776 (FIG. 17).

In a number of embodiments, method 2400 further can include a block 2408 of receiving a first response at the application service provider indicating a successful credit of the second account maintained by the second financial institution. The first response can be similar or identical to messages 1179 (FIG. 11), 1277 (FIG. 12), 1477 (FIG. 14), 1679 (FIG. 16), and/or 1777 (FIG. 17). The successful credit can be similar or identical to activity 1165 (FIGS. 11-12, 14, 16-17) and/or activity 1167 (FIGS. 11-12, 14, 16-17).

In some embodiments, the first response, such a messages 1179 (FIG. 11), 1277 (FIG. 12), 1477 (FIG. 14), 1679 (FIG. 16), can be received at the application service provider from the transaction system based on a second response that was received at the transaction system from the second financial institution indicating the successful credit of the second account maintained by the second financial institution. The second response can be similar or identical to messages 1177 (FIG. 11), 1276 (FIG. 12), 1476 (FIG. 14), and/or 1678 (FIG. 16). In other embodiments, the first response can be received at the application service provider from the second financial institution, such as in message 1777 (FIG. 17).

In a several embodiments, method 2400 further can include a block 2409 of sending a notification to the sender from the application service provider in real-time after the payment authorization time of the successful credit of the second account maintained by the second financial institution. The notification can be similar or identical to messages 1180 (FIG. 11), 1278 (FIG. 12), 1478 (FIG. 14), 1680 (FIG. 16), and/or 1778 (FIG. 17).

In some embodiments, the application service provider can be a different entity from the first and second financial institutions, such as application service provider 1030 (FIGS. 10-12). In other embodiments, the application service provider can be the same entity as the first financial institution, such as application service provider 1330 (FIGS. 13-14). In yet other embodiments, the application service provider can be the same entity as the second financial institution, such as application service provider 1530 (FIGS. 15-17).

In some embodiments, the first debit message, such as messages 1172 (FIG. 11), 1672 (FIG. 16), and/or 1772 (FIG. 17), can be sent from the application service provider to the transaction system to be forwarded by the transaction system to the first financial institution as a second debit message that is based on the first debit message. The second debit message can be similar or identical to messages 1173 (FIG. 11), 1673 (FIG. 16), and/or 1773 (FIG. 17). The first debit response, such as messages 1175 (FIG. 11), 1675 (FIG. 16), and/or 1775 (FIG. 17), can be received at the application service provider from the transaction system based on a second debit response that was received at the transaction system from the first financial institution indicating the successful debit of the first account maintained by the first financial institution. The second debit response can be similar or identical to messages 1174 (FIG. 11), 1674 (FIG. 16), and/or 1774 (FIG. 17).

In other embodiments, the first debit message, such as messages 1272 (FIG. 12 and/or 1472 (FIG. 14), can be sent from the application service provider to the first financial institution. The first debit response, such as messages 1273 (FIG. 12) and/or 1473 (FIG. 14) can be received at the application service provider from the first financial institution.

In many embodiments, the first financial institution can maintain a first settlement account. The first settlement account can be similar or identical to sending participant settlement account 1042 (FIGS. 10-17). In a number of embodiments, the first settlement account can be credited to account for the successful debit of the first account maintained by the first financial institution, such as in activity 1146 (FIGS. 11-12, 14, 16-17).

In several embodiments, the second financial institution can maintain a second settlement account. The second settlement account can be similar or identical to receiving participant settlement account 1063 (FIGS. 10-17). The second settlement account can be debited to account for the successful credit of the second account maintained by the second financial institution, such as in activity 1166 (FIGS. 11-12, 14, 16-17).

In several embodiments, funds can be transferred from the first settlement account to the second settlement account in a settlement completion. The settlement completion can be similar or identical to activities 1191 (FIGS. 11-12), 1192 (FIGS. 11-12), and/or 1491 (FIGS. 14, 16-17). In some embodiments, the settlement completion can be part of a net settlement as a single item ACH. In other embodiments, the settlement completion can be part of a net settlement as part of a batch ACH. In yet other embodiments, the settlement completion can be part of a net settlement as part of a wire advice file. In some embodiments, the successful credit of the second account maintained by the second financial institution can involve a hard credit to the second account in real-time after the payment authorization time. In various embodiments, the settlement completion can involve the funds being transferred through a third settlement account of a payment processor. The third settlement account can be similar or identical to payment processor settlement account 1033 (FIGS. 10-12). In some embodiments, the settlement completion can occur in real-time after the payment authorization time.

Proceeding to the next drawing, FIG. 25 illustrates a block 2401 of optional first steps, according to an embodiment. Block 2401 is merely exemplary and is not limited to the embodiments presented herein. Block 2401 can be employed in many different embodiments or examples not specifically depicted or described herein. In some embodiments, the procedures, the processes, and/or the activities of block 2401 can be performed in the order presented. In other embodiments, the procedures, the processes, and/or the activities of block 2401 can be performed in any suitable order. In still other embodiments, one or more of the procedures, the processes, and/or the activities of block 2401 can be combined or skipped. In many embodiments, block 2401 can be performed before the payment authorization time.

Referring to FIG. 25, block 2401 can include a block 2501 of sending a first capability inquiry from the application service provider to the transaction system. The first capability inquiry can be similar or identical to messages 1072 (FIG. 10), 1372 (FIG. 13), and/or 1572 (FIG. 15).

In a number of embodiments, block 2401 also can include a block 2502 of receiving a second capability response at the application service provider from the transaction system. The second capability response can be similar or identical to messages 1077 (FIG. 10), 1375 (FIG. 13), and/or 1575 (FIG. 15). In some embodiments, the second capability response can indicate whether the first and second accounts support real-time payment transactions, such as in message 1077 (FIG. 10). In other embodiments, the second capability response can indicate whether the second account supports real-time payment transactions, such as in message 1375 (FIG. 13). In yet other embodiments, the second capability response can indicate whether the first account supports real-time payment transactions, such as in message 1575 (FIG. 15).

Turning ahead in the drawings, FIG. 26 illustrates a flow chart for a method 2600 to facilitate a real-time funds availability bill-pay transaction, according to an embodiment. Method 2600 is merely exemplary and is not limited to the embodiments presented herein. Method 2600 can be employed in many different embodiments or examples not specifically depicted or described herein. In some embodiments, the procedures, the processes, and/or the activities of method 2600 can be performed in the order presented. In other embodiments, the procedures, the processes, and/or the activities of method 2600 can be performed in any suitable order. In still other embodiments, one or more of the procedures, the processes, and/or the activities of method 2600 can be combined or skipped. In some embodiments, method 2600 can be performed by second financial institution 1060 (FIGS. 10-17).

Referring to FIG. 26, method 2600 can include a block 2601 of optional first steps, as shown in FIG. 27 and described below. In some embodiments, method 2600 can skip block 2601 of optional first steps.

In a number of embodiments, method 2600 also can include a block 2602 of receiving a first promise-to-pay message at a second financial institution. The first promise-to-pay messages can be similar or identical to messages 1177 (FIG. 11), 1275 (FIG. 12), 1475 (FIG. 14), 1677 (FIG.

16), and/or 1776 (FIG. 17). The second financial institution can be similar or identical to receiving participant 1060 (FIGS. 10-17). In many embodiments, the first promise-to-pay message can be based on a successful debit of a first account maintained by a first financial institution. The successful debit can be similar or identical to activity 1145 (FIGS. 11-12, 14, 16-17). The first financial institution can be similar or identical to sending participant 1040 (FIGS. 10-17). The first account can be similar or identical to sender account 1041 (FIGS. 10-17). In many embodiments, the successful debit of the first account can be based on a bill payment authorization for a payment amount made by a sender at a payment authorization time. The payment authorization can be communicated from sender system 1020 (FIGS. 10-17) in messages 1171 (FIG. 11), 1271 (FIG. 12), 1471 (FIG. 14), 1671 (FIG. 16), and/or 1771 (FIG. 17). The sender can be similar or identical to sender 1010 (FIGS. 10-17), who can use sender system 1020 (FIGS. 10-17). The payment authorization time can be the time in which the sender authorized the bill payment transaction. In several embodiments, the first account can be held by the sender, such that the sender is the account holder of the first account. In some embodiments, the first financial institution can be different from the second financial institution.

In several embodiments, method 2600 additionally can include a block 2603 of performing a successful credit for the payment amount to a second account maintained by the second financial institution to make funds available in the second account in real-time after the payment authorization time. The successful credit can be similar or identical to activity 1165 (FIGS. 11-12, 14, 16-17) and/or activity 1167 (FIGS. 11-12, 14, 16-17). The second account can be similar or identical to billing account 1061 (FIGS. 10-17) and/or recipient account 1062 (FIGS. 10-17). In various embodiments, the sender can be financially liable for the second account.

In a number of embodiments, method 2600 optionally can include a block 2604 of performing a debit for the payment amount from a second settlement account maintained by the second financial institution to account for the successful credit of the second account maintained by the second financial institution. The second settlement account can be similar or identical to receiving participant settlement account 1063 (FIGS. 10-17). The debit can be similar or identical to activity 1166 (FIGS. 11-12, 14, 16-17).

In a several embodiments, method 2600 further can include, after block 2603 or block 2604, a block 2605 of sending a first response from the second financial institution indicating the successful credit of the second account maintained by the second financial institution to inform at least the sender in real-time after the payment authorization time of the successful credit of the second account maintained by the second financial institution. The first response can be similar or identical to messages 1178 (FIG. 11), 1276 (FIG. 12), 1476 (FIG. 14), 1678 (FIG. 16), and/or 1777 (FIG. 17). The sender can be informed by messages 1180 (FIG. 11), 1278 (FIG. 12), 1478 (FIG. 14), 1680 (FIG. 16), and/or 1778 (FIG. 17).

In some embodiments, the first promise-to-pay message, such as messages 1177 (FIG. 11), 1275 (FIG. 12), 1475 (FIG. 14), and/or 1677 (FIG. 16), can be received at the second financial institution from a transaction system based on a second promise-to-pay message sent from an application service provider to the transaction system. The transaction system can be similar or identical to transaction system 1050 (FIGS. 10-17). The second promise-to-pay message can be similar or identical to 1176 (FIG. 11), 1274 (FIG. 12), 1474 (FIG. 14), and/or 1676 (FIG. 16). The application service provider can be similar or identical to application service provider 1030 (FIGS. 10-12), application service provider 1330 (FIGS. 13-14), and/or application service provider 1530 (FIGS. 15-17). In other embodiments, the first promise-to-pay message, such as message 1776 (FIG. 17), can be sent from the application service provider to the second financial institution after the application service provider receives a first debit response from the transaction system indicating the successful debit of the first account maintained by the first financial institution. The first debit response can be similar or identical to message 1775 (FIG. 17).

In some embodiments, the first response, such as messages 1178 (FIG. 11), 1276 (FIG. 12), 1476 (FIG. 14), and/or 1678 (FIG. 16) can be sent from the second financial institution to the transaction system from the transaction system, such that a second response is sent from the transaction system to the application service provider indicating the successful credit of the second account maintained by the second financial institution, and such that the application service provider informs the sender in real-time after the payment authorization time of the successful credit of the second account maintained by the second financial institution. The second response can be similar or identical to 1179 (FIG. 11), 1277 (FIG. 12), 1477 (FIG. 14), and/or 1679 (FIG. 16). In other embodiments, the first response can be sent from the second financial institution to the application service provider, such as in message 1777 (FIG. 17). In some embodiments, the second response can be essentially the same as the first response, such as a forward of the first response. In other embodiments, the second response can include information from the first response, and/or can include additional information.

In some embodiments, the application service provider can be a different entity from the first and second financial institutions, such as application service provider 1030 (FIGS. 10-12). In other embodiments, the application service provider can be the same entity as the first financial institution, such as application service provider 1330 (FIGS. 13-14). In yet other embodiments, the application service provider can be the same entity as the second financial institution, such as application service provider 1530 (FIGS. 15-17).

In a number of embodiments, the second promise-to-pay message, such as messages 1176 (FIG. 11) and/or 1676 (FIG. 16), can be sent from the application service provider to the transaction system after the application service provider receives a first debit response from the transaction system indicating the successful debit of the first account maintained by the first financial institution. The first debit response can be similar or identical to messages 1175 (FIG. 11) and/or 1675. In other embodiments, the second promise-to-pay message, such as messages 1274 (FIG. 12) and/or 1474 (FIG. 14), can be sent from the application service provider to the transaction system after the application service provider receives a first debit response from the first financial institution indicating the successful debit of the first account maintained by the first financial institution. The first debit response can be similar or identical to messages 1273 (FIG. 12) and/or 1473 (FIG. 14).

In some embodiments, the first debit response, such as messages 1175 (FIG. 11), 1675 (FIG. 16), and/or 1775 (FIG. 17), received at the application service provider can be based on a second debit response that was received at the transaction system from the first financial institution indicating the successful debit of the first account maintained by the first financial institution. The second debit response can be similar or identical to messages 1174 (FIG. 11), 1674 (FIG. 16), and/or 1774 (FIG. 17). In some embodiments, the first debit response can be essentially the same as the second debit response, such as a forward of the second debit response. In other embodiments, the first debit response can include information from the second debit response, and/or can include additional information.

In many embodiments, the first financial institution can maintain a first settlement account. The first settlement account can be similar or identical to sending participant settlement account 1042 (FIGS. 10-17). In a number of embodiments, the first settlement account can be credited to account for the successful debit of the first account maintained by the first financial institution, such as in activity 1146 (FIGS. 11-12, 14, 16-17).

In several embodiments, the second financial institution can maintain a second settlement account. The second settlement account can be similar or identical to receiving participant settlement account 1063 (FIGS. 10-17). The second settlement account can be debited to account for the successful credit of the second account maintained by the second financial institution, such as in activity 1166 (FIGS. 11-12, 14, 16-17).

In many embodiments, funds can be transferred from the first settlement account to the second settlement account in a settlement completion. The settlement completion can be similar or identical to activities 1191 (FIGS. 11-12), 1192 (FIGS. 11-12), and/or 1491 (FIGS. 14, 16-17). In some embodiments, the settlement completion can be part of a net settlement as a single item ACH. In other embodiments, the settlement completion can be part of a net settlement as part of a batch ACH. In yet other embodiments, the settlement completion can be part of a net settlement as part of a wire advice file. In some embodiments, the successful credit of the second account maintained by the second financial institution can involve a hard credit to the second account in real-time after the payment authorization time. In various embodiments, the settlement completion can involve the funds being transferred through a third settlement account of a payment processor. The third settlement account can be similar or identical to payment processor settlement account 1033 (FIGS. 10-12). In some embodiments, the settlement completion can occur in real-time after the payment authorization time.

Proceeding to the next drawing, FIG. 27 illustrates a block 2601 of optional first steps, according to an embodiment. Block 2601 is merely exemplary and is not limited to the embodiments presented herein. Block 2601 can be employed in many different embodiments or examples not specifically depicted or described herein. In some embodiments, the procedures, the processes, and/or the activities of block 2601 can be performed in the order presented. In other embodiments, the procedures, the processes, and/or the activities of block 2601 can be performed in any suitable order. In still other embodiments, one or more of the procedures, the processes, and/or the activities of block 2601 can be combined or skipped. In many embodiments, block 2601 can be performed before the payment authorization time.

Referring to FIG. 27, block 2601 can include a block 2701 of receiving a first capability inquiry at the second financial institution from the transaction system to determine whether the second account maintained by the second financial institution supports real-time payment transactions. The first capability inquiry can be similar or identical to messages 1073 (FIG. 10) and/or 1373 (FIG. 13).

In a number of embodiments, block 2601 also can include a block 2702 of sending a first capability response from the second financial institution to the transaction system indicating whether the second account maintained by the second financial institution supports real-time payment transactions, such that the transaction system sends a second capability response to the application service provider indicating whether the first and second accounts support real-time payment transactions. The first capability response can be similar or identical to 1074 (FIG. 10) and/or 1374 (FIG. 15). The second capability response can be similar or identical to messages 1077 (FIG. 10) and/or 1375 (FIG. 15). In some embodiments, the second capability response can be essentially the same as the first capability response, such as a forward of the first capability response. In other embodiments, the second capability response can include information from the first capability response, and/or can include additional information.

Figure 28:
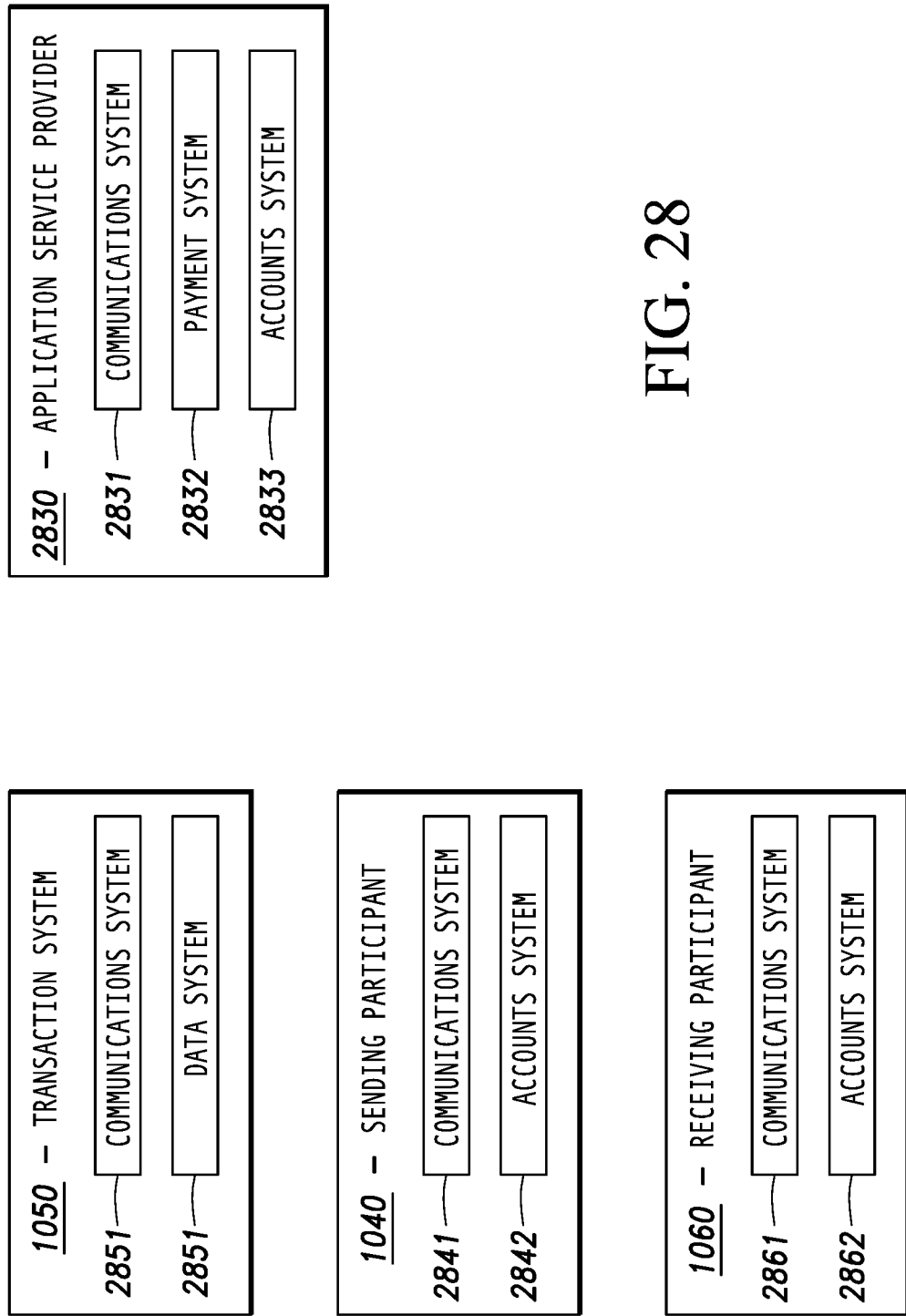
FIG. 28 illustrates a block diagram of systems that can be employed for facilitating a real-time funds availability bill-pay transaction.

Turning ahead in the drawings, FIG. 28 illustrates a block diagram of systems that can be employed for facilitating a real-time funds availability bill-pay transaction, according to an embodiment. The systems shown in FIG. 28, which include transaction system 1050, sending participant 1040, receiving participant 1060, and an application service provider, 2830, are merely exemplary and embodiments of the system are not limited to the embodiments presented herein. The system can be employed in many different embodiments or examples not specifically depicted or described herein. In some embodiments, certain elements or modules of the systems shown in FIG. 28 can perform various procedures, processes, and/or activities. In other embodiments, the procedures, processes, and/or activities can be performed by other suitable elements or modules of the systems shown in FIG. 28.

In several embodiments, transaction system 1050 can include one or more systems, such as a communications system 2851, and/or a data system 2852.

In many embodiments, communications system 2851 can at least partially perform block 1803 (FIG. 18) of receiving a first promise-to-pay message at a transaction system; block 1805 (FIG. 18) of sending a second promise-to-pay message from the transaction system to a second financial institution; block 1806 (FIG. 18) of receiving a first response at the transaction system from the second financial institution indicating a successful credit of the second account maintained by the second financial institution; block 1807 (FIG. 18) of storing the first response in the transaction system; block 1808 (FIG. 18) of sending a second response from the transaction system indicating the successful credit of the second account maintained by the second financial institution to inform at least the sender in real-time after the payment authorization time of the successful credit of the second account maintained by the second financial institution; block 1901 (FIG. 19) of receiving a first capability inquiry at the transaction system from the application service provider; block 1903 (FIG. 19) of sending a second capability inquiry from the transaction system to the second financial institution to determine whether the second account maintained by the second financial institution supports real-time payment transactions; block 1904 (FIG. 19) of receiving a first capability response at the transaction system from the second financial institution indicating whether the second account maintained by the second financial institution supports real-time payment transactions; block 1906 (FIG. 19) of sending a third capability inquiry from the transaction system to the first financial institution to determine whether the first account maintained by the first financial institution supports real-time payment transactions; block 1907 (FIG. 19) of receiving a second capability response at the transaction system from the first financial institution indicating whether the first account maintained by the first financial institution supports real-time payment transactions; block 1909 (FIG. 19) of sending a third capability response from the transaction system to the application service provider; block 2001 (FIG. 20) of sending a debit message from the transaction system to the first financial institution to debit the first account maintained by the first financial institution; block 2002 (FIG. 20) of receiving a debit response at the transaction system from the first financial institution in real-time after the payment authorization time; block 2004 (FIG. 20) of sending a third response from the transaction system to the application service provider indicating the successful debit of the first account maintained by the first financial institution; a block 2101 (FIG. 21) of sending a debit message from a transaction system to a first financial institution to debit a first account maintained by the first financial institution based on a bill payment authorization made by a sender at a payment authorization time; block 2102 (FIG. 21) of receiving a debit response at the transaction system from the first financial institution in real-time after the payment authorization time; and/or block 2104 (FIG. 21) of sending a first response to an application service provider indicating the successful debit of the first account maintained by the first financial institution.

In a number of embodiments, data system 2852 can at least partially perform block 1804 (FIG. 18) of storing the first promise-to-pay message in the transaction system; block 1902 (FIG. 19) of storing the first capability inquiry in the transaction system; block 1905 (FIG. 19) of storing the first capability response in the transaction system; block 1908 (FIG. 19) of storing the second capability response in the transaction system; block 2003 (FIG. 20) of storing the debit response in the transaction system; and/or block 2103 (FIG. 21) of storing the debit response in the transaction system.

In several embodiments, sending participant system 1040 can include one or more systems, such as a communications system 2841, and/or an accounts system 2842.

In many embodiments, communications system 2841 can at least partially perform block 2202 (FIG. 22) of receiving a debit message at a first financial institution to debit a first account maintained by the first financial institution based on a bill payment authorization for a payment amount made by a sender at a payment authorization time; block 2205 (FIG. 22) of sending a debit response from the first financial institution in real-time after the payment authorization time; block 2301 (FIG. 23) of receiving a first capability inquiry at receiving a first capability inquiry at the first financial institution from the transaction system to determine whether the first account maintained by the first financial institution supports real-time payment transactions; and/or block 2302 (FIG. 23) of sending a first capability response from the first financial institution to the transaction system indicating whether the first account maintained by the first financial institution supports real-time payment transactions.

In a number of embodiments, accounts system 2842 can at least partially perform activity 1145 (FIGS. 11-12, 14, 16-17); activity 1146 (FIGS. 11-12, 14, 16-17); activity 1191 (FIGS. 11-12); activity 1491 (FIGS. 14, 16-17); block 2203 (FIG. 22) of performing a successful debit for the payment amount from the first account maintained by the first financial institution in real-time after the payment authorization time; and/or block 2204 (FIG. 22) of performing a credit for the payment amount to a first settlement account maintained by the first financial institution to account for the successful debit of the first account maintained by the first financial institution.

In several embodiments, receiving participant system 1060 can include one or more systems, such as a communications system 2861, and/or an accounts system 2862.

In many embodiments, communications system 2861 can at least partially perform block 2602 (FIG. 26) of receiving a first promise-to-pay message at a second financial institution; block 2605 (FIG. 26) of sending a first response from the second financial institution indicating the successful credit of the second account maintained by the second financial institution to inform at least the sender in real-time after the payment authorization time of the successful credit of the second account maintained by the second financial institution; block 2701 (FIG. 27) of receiving a first capability inquiry at the second financial institution from the transaction system to determine whether the second account maintained by the second financial institution supports real-time payment transactions; and/or block 2702 (FIG. 27) of sending a first capability response from the second financial institution to the transaction system indicating whether the second account maintained by the second financial institution supports real-time payment transactions.

In a number of embodiments, accounts system 2862 can at least partially perform activity 1165 (FIGS. 11-12, 14, 16-17); activity 1166 (FIGS. 11-12, 14, 16-17); activity 1167 (FIGS. 11-12, 14, 16-17); activity 1192 (FIGS. 11-12); activity 1491 (FIGS. 14, 16-17); block 2603 (FIG. 26) of performing a successful credit for the payment amount to a second account maintained by the second financial institution to make funds available in the second account in real-time after the payment authorization time; and/or block 2604 (FIG. 26) of performing a debit for the payment amount from a second settlement account maintained by the second financial institution to account for the successful credit of the second account maintained by the second financial institution.

In several embodiments, application service provider 2830 can be similar or identical to application service provider 1030 (FIGS. 10-12, application service provider 1330 (FIGS. 13-14), and/or application service provider 1530 (FIGS. 15-17). In a number of embodiments, application service provider 2830 can include one or more systems, such as a communications system 2831 and/or a payment system 2832. In some embodiments, such as when application service provider 2830 is similar or identical to application service provider 1030 (FIGS. 10-12), application service provider 2830 can include an accounts system 2833. In other embodiments, such as when application service provider 2830 is similar or identical to application service provider 1330 (FIGS. 13-14) and/or application service provider 1530 (FIGS. 15-17), application service provider 2830 can be devoid of accounts system 2833. In a number of embodiments, accounts system 2863 can at least partially perform activities 1191 (FIGS. 11-12) and/or 1192 (FIGS. 11-12). Similar to other payment systems described above, payment system 2832 can be used to pay one or more bills and/or other financial obligations.

In many embodiments, communications system 2861 can at least partially perform block 2403 (FIG. 24) of receiving a bill payment authorization from the sender through the payment application; block 2404 (FIG. 24) of sending a first debit message from the application service provider to debit a first account maintained by a first financial institution based on the bill payment authorization; block 2405 (FIG. 24) of receiving a first debit response at the application service provider in real-time after the payment authorization time; block 2407 (FIG. 24) of sending the first promise-to-pay message; block 2408 (FIG. 24) of receiving a first response at the application service provider indicating a successful credit of the second account maintained by the second financial institution; block 2409 (FIG. 24) of sending a notification to the sender from the application service provider in real-time after the payment authorization time of the successful credit of the second account maintained by the second financial institution; block 2501 (FIG. 25) of sending a first capability inquiry from the application service provider to the transaction system; and/or block 2502 (FIG. 25) of receiving a second capability response at the application service provider from the transaction system.

In a number of embodiments, payment system 2832 can at least partially perform block 2402 (FIG. 24) of providing a payment application to a sender from an application service provider; and/or block 2406 (FIG. 24) of generating a first promise-to-pay message for a second financial institution to credit a second account maintained by the second financial institution to make funds available in the second account in real-time after the payment authorization time.

Although payment real-time funds availability has been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-28 may be modified, and that the foregoing discussion of certain of these embodiments does not necessarily represent a complete description of all possible embodiments. For example, one or more of the procedures, processes, or activities of FIGS. 2-7 and 10-27 may include different procedures, processes, and/or activities and be performed by many different modules, in many different orders, and/or one or more of the procedures, processes, or activities of FIGS. 2-7 and 10-27 may include one or more of the procedures, processes, or activities of another different one of FIGS. 2-7 and 10-27.

Replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
   one or more processors; and
   one or more non-transitory computer-readable media storing computing instructions configured to run on the one or more processors and perform:
   automatically adjusting, based on a configuration of one or more other systems, a messaging algorithm comprising one or more real-time capability calls to the one or more other systems;
   automatically performing the messaging algorithm, as adjusted, based on the configuration of the one or more other systems, wherein the messaging algorithm comprises:
     receiving a first capability inquiry at a transaction system from an application service provider;
     storing the first capability inquiry in the transaction system;
     sending the one or more real-time capability calls to the one or more other systems, as adjusted based on the configuration of the one or more other systems;
     receiving one or more capability responses from the one or more other systems;
     storing the one or more capability responses in the transaction system; and
     sending an overall capability response from the transaction system to the application service provider indicating whether the one or more other systems support real-time payment transactions;
   receiving a first promise-to-pay message at the transaction system, the first promise-to-pay message being based on a successful debit of a first account maintained by a first financial institution, the successful debit of the first account being based on a payment authorization made by a sender at a payment authorization time, the first account being held by the sender;
   storing the first promise-to-pay message in the transaction system;
   sending a second promise-to-pay message from the transaction system to a second financial institution, the second promise-to-pay message being based on the first promise-to-pay message, such that the second financial institution credits a second account maintained by the second financial institution to make funds available in the second account in real-time after the payment authorization time, the sender being financially liable for the second account;
   receiving a first response at the transaction system from the second financial institution indicating a successful credit of the second account maintained by the second financial institution;
   storing the first response in the transaction system; and
   sending a second response from the transaction system indicating the successful credit of the second account maintained by the second financial institution to inform at least the sender in real-time after the payment authorization time of the successful credit of the second account maintained by the second financial institution,
   wherein:
     the first financial institution is different from the second financial institution;
     the first financial institution maintains a first settlement account;
     the first settlement account is credited after the successful debit of the first account maintained by the first financial institution to account for the successful debit of the first account maintained by the first financial institution;
     the second financial institution maintains a second settlement account;
     the second settlement account is debited before the successful credit of the second account maintained by the second financial institution to account for the successful credit of the second account maintained by the second financial institution;

the successful credit of the second account maintained by the second financial institution involves a hard credit to the second account in real-time after the payment authorization time;

settlement funds are transferred from the first settlement account to the second settlement account in a settlement completion after the payment authorization time, after receiving the first response, and after the hard credit to the second account;

the first promise-to-pay message is sent to the transaction system from the application service provider;

the application service provider is in data communication with the transaction system;

the transaction system is in data communication with the second financial institution; and the transaction system is maintained by an entity that is different from the application service provider, the first financial institution, and the second financial institution.

2. The system of claim 1, wherein:
the application service provider hosts a payment application that is accessed by the sender to perform the payment authorization.

3. The system of claim 1, wherein:
the application service provider is a different entity from the first and second financial institutions.

4. The system of claim 3, wherein the computing instructions are further configured to perform, before the payment authorization time:

sending a second capability inquiry from the transaction system to the second financial institution to determine whether the second account maintained by the second financial institution supports the real-time payment transactions;

receiving a first capability response at the transaction system from the second financial institution indicating whether the second account maintained by the second financial institution supports the real-time payment transactions;

storing the first capability response in the transaction system;

sending a third capability inquiry from the transaction system to the first financial institution to determine whether the first account maintained by the first financial institution supports the real-time payment transactions;

receiving a second capability response at the transaction system from the first financial institution indicating whether the first account maintained by the first financial institution supports the real-time payment transactions; and storing the second capability response in the transaction system, wherein:
the overall capability response indicates whether the first and second accounts support the real-time payment transactions;

the one or more other systems comprise the second financial institution and the first financial institution;

the one or more real-time capability calls of the messaging algorithm, as adjusted, comprise the second capability inquiry and the third capability inquiry; and the one or more capability responses comprise the first capability response and the second capability response.

5. The system of claim 3, wherein the computing instructions are further configured to perform, before receiving the first promise-to-pay message:

sending a debit message from the transaction system to the first financial institution to debit the first account maintained by the first financial institution;

receiving a debit response at the transaction system from the first financial institution in real-time after the payment authorization time, the debit response indicating the successful debit of the first account maintained by the first financial institution;

storing the debit response in the transaction system; and sending a third response from the transaction system to the application service provider indicating the successful debit of the first account maintained by the first financial institution.

6. The system of claim 3, wherein:
the first promise-to-pay message received at the transaction system from the application service provider is based on the application service provider having sent a debit message to the first financial institution to debit the first account maintained by the first financial institution and having received a debit response from the first financial institution in real-time after the payment authorization time, the debit response indicating the successful debit of the first account maintained by the first financial institution.

7. The system of claim 1, wherein:
the application service provider is the same entity as the first financial institution.

8. The system of claim 7, wherein the computing instructions are further configured to perform, before the payment authorization time:

sending a second capability inquiry from the transaction system to the second financial institution to determine whether the second account maintained by the second financial institution supports the real-time payment transactions;

receiving a first capability response at the transaction system from the second financial institution indicating whether the second account maintained by the second financial institution supports the real-time payment transactions; and storing the first capability response in the transaction system, wherein:
the overall capability response indicates whether the second account supports the real-time payment transactions;

the one or more other systems comprise the second financial institution;

the one or more real-time capability calls of the messaging algorithm, as adjusted, comprise the second capability inquiry; and the one or more capability responses comprise the first capability response.

9. The system of claim 7, wherein:
the first promise-to-pay message received at the transaction system from the application service provider is based on the application service provider having sent a debit message to the first financial institution to debit the first account maintained by the first financial institution and having received a debit response from the first financial institution in real-time after the payment authorization time, the debit response indicating the successful debit of the first account maintained by the first financial institution.

10. The system of claim 1, wherein:
the application service provider is the same entity as the second financial institution.

11. The system of claim 10, wherein the computing instructions are further configured to perform, before the payment authorization time:
sending a second capability inquiry from the transaction system to the first financial institution to determine whether the first account maintained by the first financial institution supports the real-time payment transactions;
receiving a first capability response at the transaction system from the first financial institution indicating whether the first account maintained by the first financial institution supports the real-time payment transactions; and
storing the first capability response in the transaction system,
wherein:
the overall capability response indicates whether the first account supports real-time payment transactions;
the one or more other systems comprise the first financial institution;
the one or more real-time capability calls of the messaging algorithm, as adjusted, comprise the second capability inquiry; and
the one or more capability responses comprise the first capability response.

12. The system of claim 10, wherein the computing instructions are further configured to perform, before receiving the first promise-to-pay message:
sending a debit message from the transaction system to the first financial institution to debit the first account maintained by the first financial institution;
receiving a debit response at the transaction system from the first financial institution in real-time after the payment authorization time, the debit response indicating the successful debit of the first account maintained by the first financial institution;
storing the debit response in the transaction system; and
sending a third response from the transaction system to the application service provider indicating the successful debit of the first account maintained by the first financial institution.

13. The system of claim 1, wherein:
the settlement completion is part of a net settlement as a single item ACH.

14. The system of claim 1, wherein:
the settlement completion is part of a net settlement as part of a batch ACH.

15. The system of claim 1, wherein:
the settlement completion is part of a net settlement as part of a wire advice file.

16. The system of claim 1, wherein:
the settlement completion involves the funds being transferred through a third settlement account of a payment processor.

17. The system of claim 1, wherein:
the application service provider hosts a payment application that is accessed by the sender to perform the payment authorization; and
the settlement completion is part of a net settlement as a single item ACH.

18. The system of claim 1, wherein:
the application service provider hosts a payment application that is accessed by the sender to perform the payment authorization; and
the settlement completion is part of a net settlement as part of a batch ACH.

19. The system of claim 1, wherein:
the application service provider hosts a payment application that is accessed by the sender to perform the payment authorization; and
the settlement completion is part of a net settlement as part of a wire advice file.

20. A method being implemented via execution of computer instructions configured to run at one or more processors and configured to be stored at one or more non-transitory computer-readable media, the method comprising:
automatically adjusting, based on a configuration of one or more other systems, a messaging algorithm comprising one or more real-time capability calls to the one or more other systems;
automatically performing the messaging algorithm, as adjusted, based on the configuration of the one or more other systems, wherein the messaging algorithm comprises:
receiving a first capability inquiry at a transaction system from an application service provider;
storing the first capability inquiry in the transaction system;
sending the one or more real-time capability calls to the one or more other systems, as adjusted based on the configuration of the one or more other systems;
receiving one or more capability responses from the one or more other systems;
storing the one or more capability responses in the transaction system; and
sending an overall capability response from the transaction system to the application service provider indicating whether the one or more other systems support real-time payment transactions;
receiving a first promise-to-pay message at the transaction system, the first promise-to-pay message being based on a successful debit of a first account maintained by a first financial institution, the successful debit of the first account being based on a payment authorization made by a sender at a payment authorization time, the first account being held by the sender;
storing the first promise-to-pay message in the transaction system;
sending a second promise-to-pay message from the transaction system to a second financial institution, the second promise-to-pay message being based on the first promise-to-pay message, such that the second financial institution credits a second account maintained by the second financial institution to make funds available in the second account in real-time after the payment authorization time, the sender being financially liable for the second account;
receiving a first response at the transaction system from the second financial institution indicating a successful credit of the second account maintained by the second financial institution;
storing the first response in the transaction system; and
sending a second response from the transaction system indicating the successful credit of the second account maintained by the second financial institution to inform at least the sender in real-time after the payment authorization time of the successful credit of the second account maintained by the second financial institution, wherein:

the first financial institution is different from the second financial institution;

the first financial institution maintains a first settlement account;

the first settlement account is credited after the successful debit of the first account maintained by the first financial institution to account for the successful debit of the first account maintained by the first financial institution;

the second financial institution maintains a second settlement account;

the second settlement account is debited before the successful credit of the second account maintained by the second financial institution to account for the successful credit of the second account maintained by the second financial institution;

the successful credit of the second account maintained by the second financial institution involves a hard credit to the second account in real-time after the payment authorization time;

settlement funds are transferred from the first settlement account to the second settlement account in a settlement completion after the payment authorization time, after receiving the first response, and after the hard credit to the second account;

the first promise-to-pay message is sent to the transaction system from the application service provider;

the application service provider is in data communication with the transaction system;

the transaction system is in data communication with the second financial institution; and the transaction system is maintained by an entity that is different from the application service provider, the first financial institution, and the second financial institution.

21. The method of claim 20, wherein:
the application service provider hosts a payment application that is accessed by the sender to perform the payment authorization.

22. The method of claim 20, wherein:
the application service provider is a different entity from the first and second financial institutions.

23. The method of claim 22 further comprising, before the payment authorization time:

sending a second capability inquiry from the transaction system to the second financial institution to determine whether the second account maintained by the second financial institution supports the real-time payment transactions;

receiving a first capability response at the transaction system from the second financial institution indicating whether the second account maintained by the second financial institution supports the real-time payment transactions;

storing the first capability response in the transaction system;

sending a third capability inquiry from the transaction system to the first financial institution to determine whether the first account maintained by the first financial institution supports the real-time payment transactions;

receiving a second capability response at the transaction system from the first financial institution indicating whether the first account maintained by the first financial institution supports the real-time payment transactions; and storing the second capability response in the transaction system, wherein:
the overall capability response indicates whether the first and second accounts support the real-time payment transactions;

the one or more other systems comprise the second financial institution and the first financial institution;

the one or more real-time capability calls of the messaging algorithm, as adjusted, comprise the second capability inquiry and the third capability inquiry; and the one or more capability responses comprise the first capability response and the second capability response.

24. The method of claim 22 further comprising, before receiving the first promise-to-pay message:

sending a debit message from the transaction system to the first financial institution to debit the first account maintained by the first financial institution;

receiving a debit response at the transaction system from the first financial institution in real-time after the payment authorization time, the debit response indicating the successful debit of the first account maintained by the first financial institution;

storing the debit response in the transaction system; and sending a third response to the application service provider indicating the successful debit of the first account maintained by the first financial institution.

25. The method of claim 22, wherein:
the first promise-to-pay message received at the transaction system from the application service provider is based on the application service provider having sent a debit message to the first financial institution to debit the first account maintained by the first financial institution and having received a debit response from the first financial institution in real-time after the payment authorization time, the debit response indicating the successful debit of the first account maintained by the first financial institution.

26. The method of claim 20, wherein:
the application service provider is the same entity as the first financial institution.

27. The method of claim 26 further comprising, before the payment authorization time:

sending a second capability inquiry from the transaction system to the second financial institution to determine whether the second account maintained by the second financial institution supports the real-time payment transactions;

receiving a first capability response at the transaction system from the second financial institution indicating whether the second account maintained by the second financial institution supports the real-time payment transactions; and storing the first capability response in the transaction system, wherein:
the overall capability response indicates whether the second account supports the real-time payment transactions;

the one or more other systems comprise the second financial institution;

the one or more real-time capability calls of the messaging algorithm, as adjusted, comprise the second capability inquiry; and the one or more capability responses comprise the first capability response.

28. The method of claim 26, wherein:

the first promise-to-pay message received at the transaction system from the application service provider is based on the application service provider having sent a debit message to the first financial institution to debit the first account maintained by the first financial institution and having received a debit response from the first financial institution in real-time after the payment authorization time, the debit response indicating the successful debit of the first account maintained by the first financial institution.

29. The method of claim 20, wherein:

the application service provider is the same entity as the second financial institution.

30. The method of claim 29 further comprising, before the payment authorization time:

sending a second capability inquiry from the transaction system to the first financial institution to determine whether the first account maintained by the first financial institution supports the real-time payment transactions;

receiving a first capability response at the transaction system from the first financial institution indicating whether the first account maintained by the first financial institution supports the real-time payment transactions; and storing the first capability response in the transaction system, wherein:

the overall capability response indicates whether the first account supports the real-time payment transactions;

the one or more other systems comprise the first financial institution;

the one or more real-time capability calls of the messaging algorithm, as adjusted, comprise the second capability inquiry; and the one or more capability responses comprise the first capability response.

31. The method of claim 29 further comprising, before receiving the first promise-to-pay message:

sending a debit message from the transaction system to the first financial institution to debit the first account maintained by the first financial institution;

receiving a debit response at the transaction system from the first financial institution in real-time after the payment authorization time, the debit response indicating the successful debit of the first account maintained by the first financial institution;

storing the debit response in the transaction system; and sending a third response to the application service provider indicating the successful debit of the first account maintained by the first financial institution.

32. The method of claim 20, wherein:

the settlement completion is part of a net settlement as a single item ACH.

33. The method of claim 20, wherein:

the settlement completion is part of a net settlement as part of a batch ACH.

34. The method of claim 20, wherein:

the settlement completion is part of a net settlement as part of a wire advice file.

35. The method of claim 20, wherein:

the settlement completion involves the funds being transferred through a third settlement account of a payment processor.

36. The method of claim 20, wherein:

the application service provider hosts a payment application that is accessed by the sender to perform the payment authorization; and the settlement completion is part of a net settlement as a single item ACH.

37. The method of claim 20, wherein:

the application service provider hosts a payment application that is accessed by the sender to perform the payment authorization; and the settlement completion is part of a net settlement as part of a batch ACH.

38. The method of claim 20, wherein:

the application service provider hosts a payment application that is accessed by the sender to perform the payment authorization; and the settlement completion is part of a net settlement as part of a wire advice file.

39. A system comprising:

one or more processors; and one or more non-transitory computer-readable media storing computing instructions configured to run on the one or more processors and perform:

automatically adjusting, based on a configuration of one or more other systems, a messaging algorithm comprising one or more real-time capability calls to the one or more other systems;

automatically performing the messaging algorithm, as adjusted, based on the configuration of the one or more other systems, wherein the messaging algorithm comprises:

receiving a first capability inquiry at a transaction system from an application service provider;

storing the first capability inquiry in the transaction system;

sending the one or more real-time capability calls to the one or more other systems, as adjusted based on the configuration of the one or more other systems;

receiving one or more capability responses from the one or more other systems;

storing the one or more capability responses in the transaction system; and sending an overall capability response from the transaction system to the application service provider indicating whether the one or more other systems support real-time payment transactions;

sending a debit message from the transaction system to a first financial institution to debit a first account maintained by the first financial institution based on a payment authorization made by a sender at a payment authorization time, the first account being held by the sender;

receiving a debit response at the transaction system from the first financial institution in real-time after the payment authorization time, the debit response indicating a successful debit of the first account maintained by the first financial institution;

storing the debit response in the transaction system; and sending a first response from the transaction system to the application service provider indicating the successful debit of the first account maintained by the first financial institution, such that the application service provider sends a promise-to-pay message to a second financial institution to credit a second account maintained by the second financial institution to make funds available in the second account in real-time after the payment authorization time, and such that the application service provider informs the sender in real-time after the payment authorization time of a successful credit of the second account maintained by the second financial institution, the sender being financially liable for the second account, wherein:
the first financial institution is different from the second financial institution;
the application service provider is the same entity as the second financial institution;
the first financial institution maintains a first settlement account;
the first settlement account is credited after the successful debit of the first account maintained by the first financial institution to account for the successful debit of the first account maintained by the first financial institution;
the second financial institution maintains a second settlement account;
the second settlement account is debited before the successful credit of the second account maintained by the second financial institution to account for the successful credit of the second account maintained by the second financial institution;
the successful credit of the second account maintained by the second financial institution involves a hard credit to the second account in real-time after the payment authorization time;
settlement funds are transferred from the first settlement account to the second settlement account in a settlement completion after the payment authorization time, after sending the first response, and after the hard credit to the second account;
the application service provider is in data communication with the transaction system;
the transaction system is in data communication with the first financial institution; and
the transaction system is maintained by an entity that is different from the application service provider, the first financial institution, and the second financial institution.

40. The system of claim 39, wherein:
the application service provider hosts a payment application that is accessed by the sender to perform the payment authorization.

41. The system of claim 39, wherein:
the settlement completion is part of a net settlement as a single item ACH.

42. The system of claim 39, wherein:
the settlement completion is part of a net settlement as part of a batch ACH.

43. The system of claim 39, wherein:
the settlement completion is part of a net settlement as part of a wire advice file.

44. The system of claim 39, wherein:
the application service provider hosts a payment application that is accessed by the sender to perform the payment authorization; and
the settlement completion is part of a net settlement as a single item ACH.

45. The system of claim 39, wherein:
the application service provider hosts a payment application that is accessed by the sender to perform the payment authorization; and
the settlement completion is part of a net settlement as part of a batch ACH.

46. The system of claim 39, wherein:
the application service provider hosts a payment application that is accessed by the sender to perform the payment authorization; and
the settlement completion is part of a net settlement as part of a wire advice file.

47. A method being implemented via execution of computer instructions configured to run at one or more processors and configured to be stored at one or more non-transitory computer-readable media, the method comprising:
automatically adjusting, based on a configuration of one or more other systems, a messaging algorithm comprising one or more real-time capability calls to the one or more other systems;
automatically performing the messaging algorithm, as adjusted, based on the configuration of the one or more other systems, wherein the messaging algorithm comprises:
receiving a first capability inquiry at a transaction system from an application service provider;
storing the first capability inquiry in the transaction system;
sending the one or more real-time capability calls to the one or more other systems, as adjusted based on the configuration of the one or more other systems;
receiving one or more capability responses from the one or more other systems;
storing the one or more capability responses in the transaction system; and
sending an overall capability response from the transaction system to the application service provider indicating whether the one or more other systems support real-time payment transactions;
sending a debit message from the transaction system to a first financial institution to debit a first account maintained by the first financial institution based on a payment authorization made by a sender at a payment authorization time, the first account being held by the sender;
receiving a debit response at the transaction system from the first financial institution in real-time after the payment authorization time, the debit response indicating a successful debit of the first account maintained by the first financial institution;
storing the debit response in the transaction system; and
sending a first response from the transaction system to the application service provider indicating the successful debit of the first account maintained by the first financial institution, such that the application service provider sends a promise-to-pay message to a second financial institution to credit a second account maintained by the second financial institution to make funds available in the second account in real-time after the payment authorization time, and such that the application service provider informs the sender in real-time after the payment authorization time of a successful credit of the second account maintained by the second financial institution, the sender being financially liable for the second account, wherein:

the first financial institution is different from the second financial institution;

the application service provider is the same entity as the second financial institution;

the first financial institution maintains a first settlement account;

the first settlement account is credited after the successful debit of the first account maintained by the first financial institution to account for the successful debit of the first account maintained by the first financial institution;

the second financial institution maintains a second settlement account;

the second settlement account is debited before the successful credit of the second account maintained by the second financial institution to account for the successful credit of the second account maintained by the second financial institution;

the successful credit of the second account maintained by the second financial institution involves a hard credit to the second account in real-time after the payment authorization time; and settlement funds are transferred from the first settlement account to the second settlement account in a settlement completion after the payment authorization time, after sending the first response, and after the hard credit to the second account.

48. The method of claim 47, wherein:
the application service provider hosts a payment application that is accessed by the sender to perform the payment authorization.

49. The method of claim 47, wherein:
the settlement completion is part of a net settlement as a single item ACH.

50. The method of claim 47, wherein:
the settlement completion is part of a net settlement as part of a batch ACH.

51. The method of claim 47, wherein:
the settlement completion is part of a net settlement as part of a wire advice file.

52. The method of claim 47, wherein:
the application service provider hosts a payment application that is accessed by the sender to perform the payment authorization; and
the settlement completion is part of a net settlement as a single item ACH.

53. The method of claim 47, wherein:
the application service provider hosts a payment application that is accessed by the sender to perform the payment authorization; and
the settlement completion is part of a net settlement as part of a batch ACH.

54. The method of claim 47, wherein:
the application service provider hosts a payment application that is accessed by the sender to perform the payment authorization; and
the settlement completion is part of a net settlement as part of a wire advice file.

* * * * *